(12) United States Patent
Yamada et al.

(10) Patent No.: US 6,268,977 B1
(45) Date of Patent: Jul. 31, 2001

(54) DISK CARTRIDGE LOADING APPARATUS AND DISK STORAGE APPARATUS INCLUDING SUCH DISK CARTRIDGE LOADING APPARATUS

(75) Inventors: Takashi Yamada, Tokyo; Kazuyuki Yamamoto, Kanagawa; Kazuo Takahashi; Toshio Mamiya, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/299,498

(22) Filed: Apr. 26, 1999

(30) Foreign Application Priority Data

Apr. 28, 1998 (JP) .................................................. 10-118858

(51) Int. Cl.[7] .................................................. G11B 17/04
(52) U.S. Cl. .......................................................... 360/99.06
(58) Field of Search .................................. 369/34, 36, 38, 369/75.1, 75.2, 77.1, 77.2, 191, 192, 178; 360/99.02, 99.06, 92

(56) References Cited

U.S. PATENT DOCUMENTS

| 5,485,329 | * | 1/1996 | Lee | 360/99.06 |
| 5,488,522 | * | 1/1996 | Peace et al. | 360/99.02 |
| 5,657,081 | * | 8/1997 | Kurahashi | 360/99.06 |

* cited by examiner

*Primary Examiner*—Allen Y. Cao
(74) *Attorney, Agent, or Firm*—Frommer Lawrence & Haug, LLP.; William S. Frommer; Matthew K. Ryan

(57) ABSTRACT

A door operable in unison with a cartridge holder is provided at the entrance of the apparatus, whereby a movement amount of a cartridge holder (23) is set to be an amount made smaller than a thickness of a disk cartridge (1) and also to be an amount in which the disk cartridge (1) can be prevented from interfering with a spindle motor (3) when the disk cartridge (1) is loaded and unloaded. The thickness of the disk storage apparatus can be reduced, and hence the whole of the disk storage apparatus can be reduced in thickness.

19 Claims, 26 Drawing Sheets

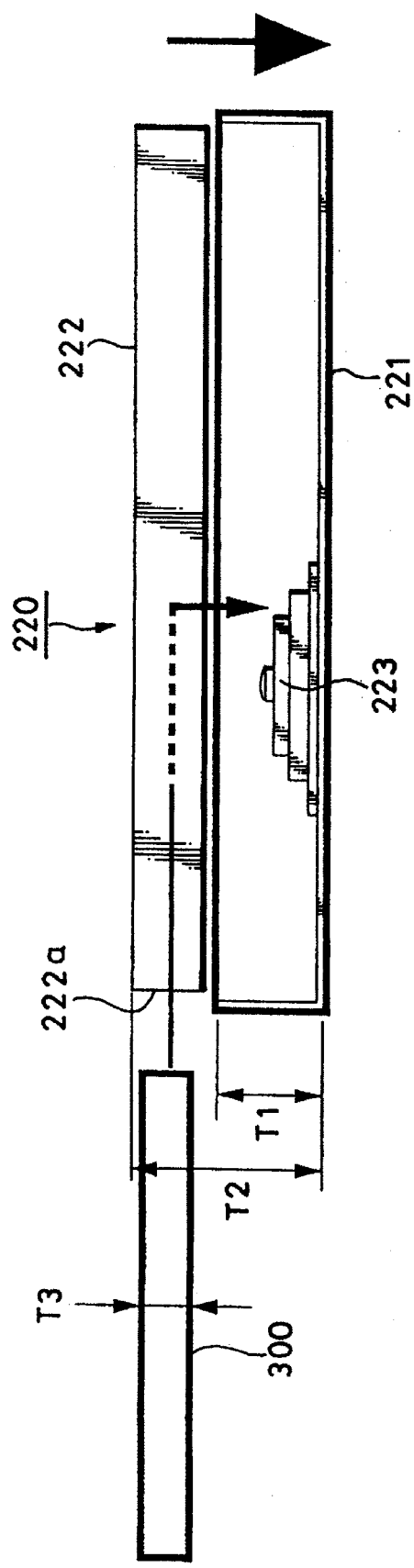
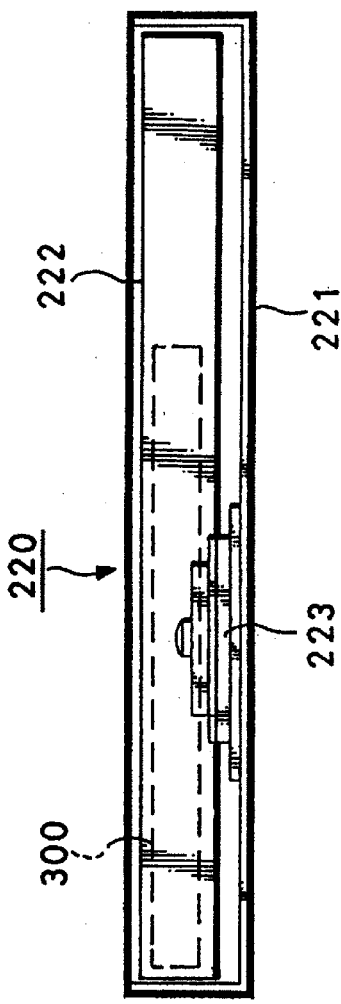
FIG. 3A (PRIOR ART)
FIG. 3B (PRIOR ART)

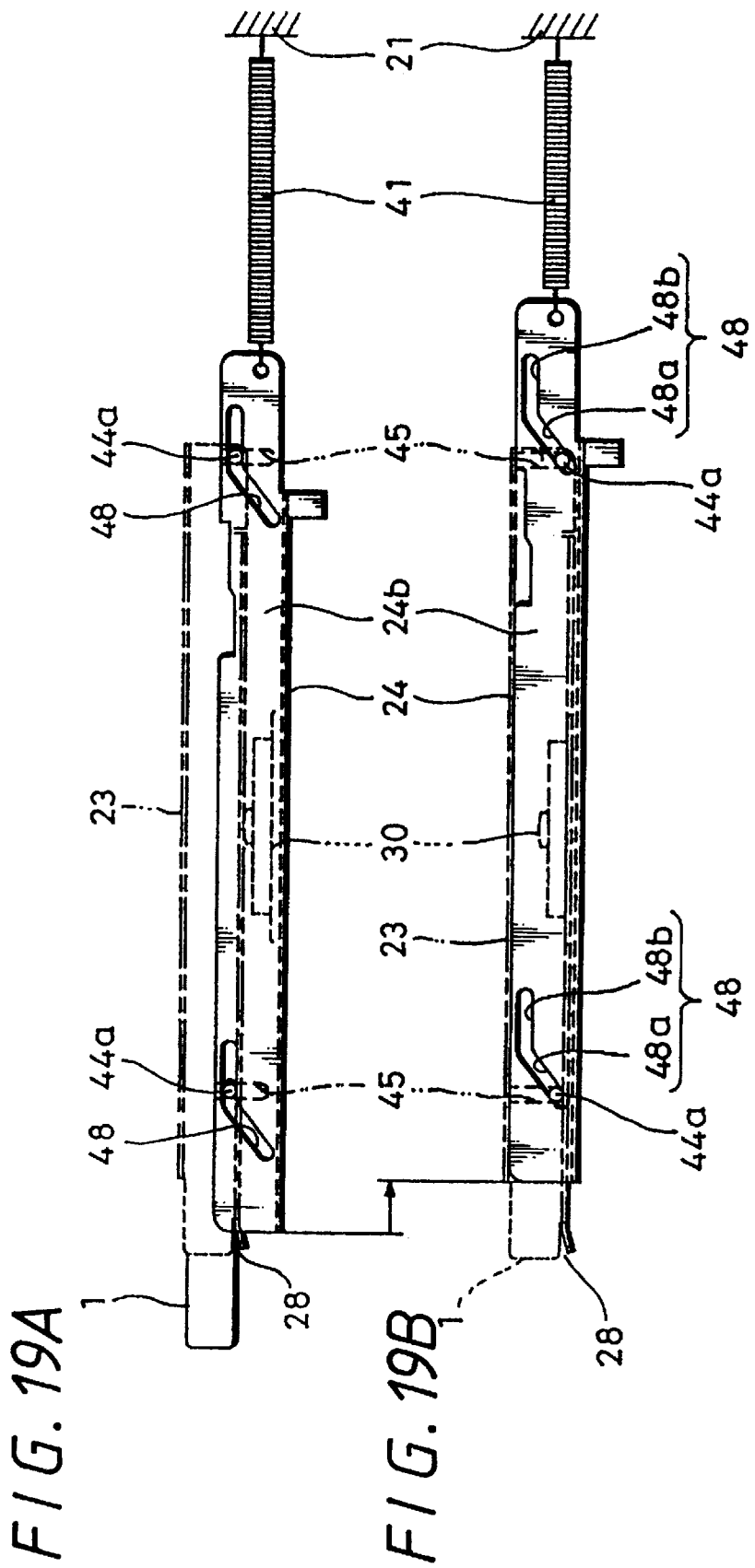

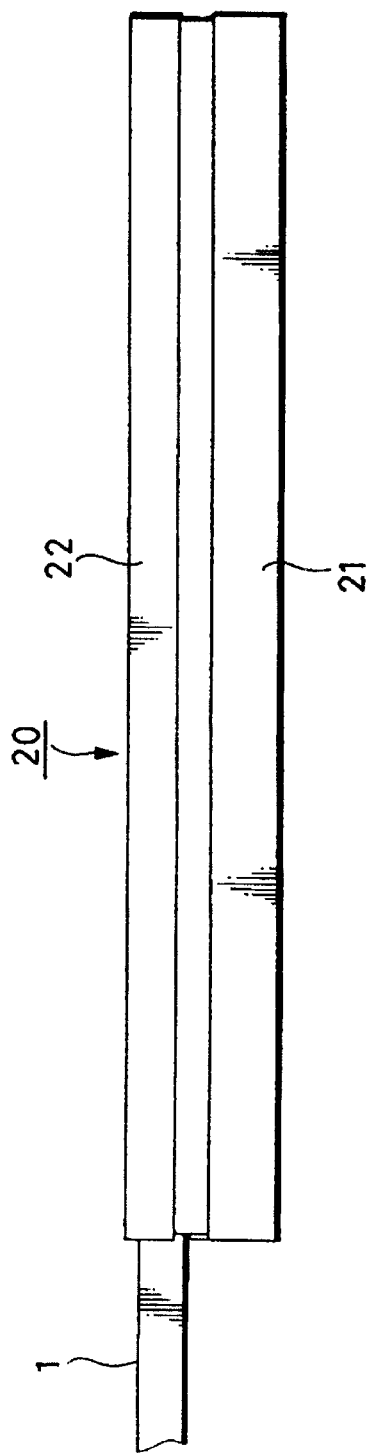
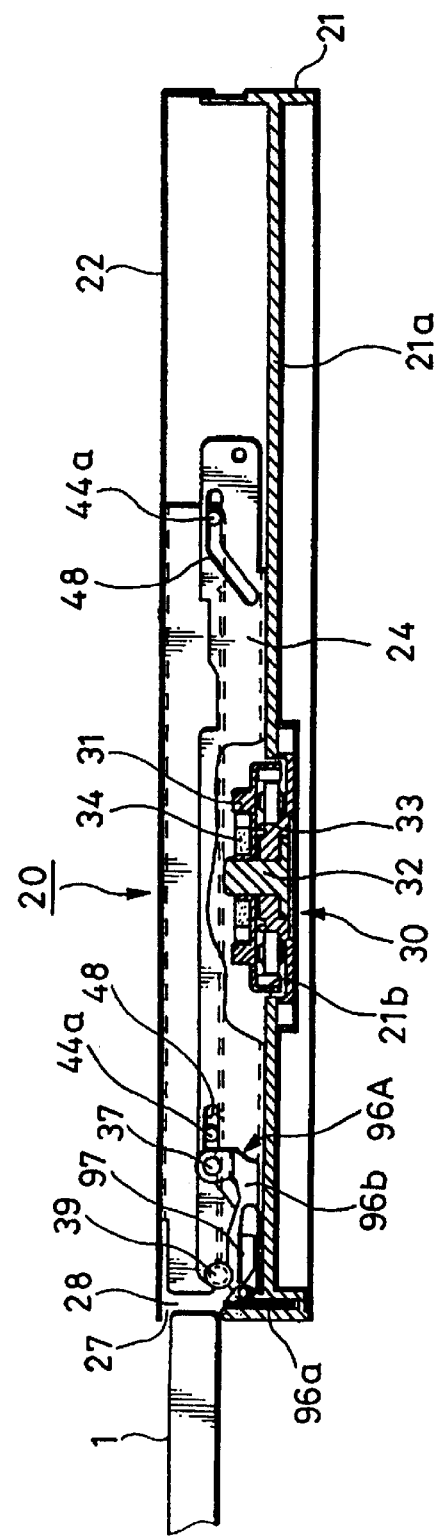
FIG. 21A
FIG. 21B

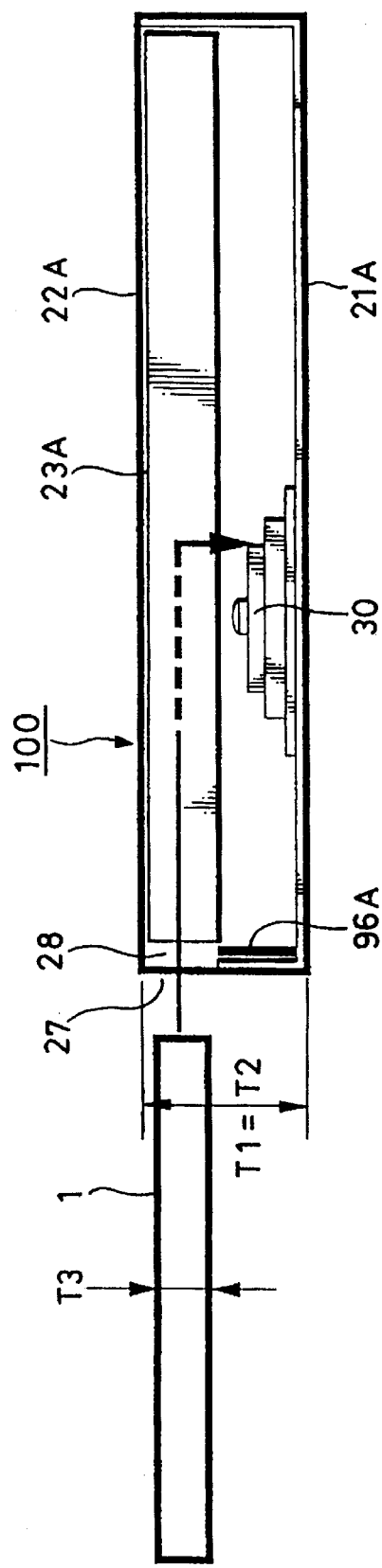
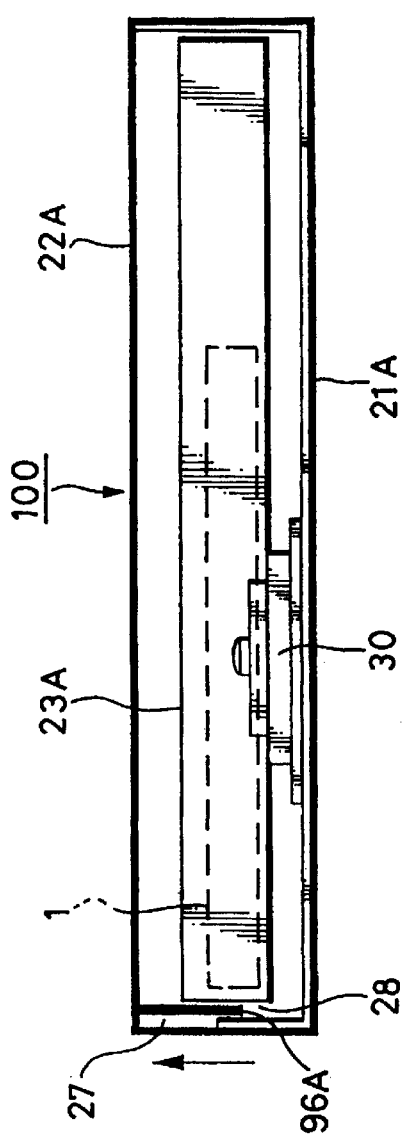
FIG. 23A
FIG. 23B

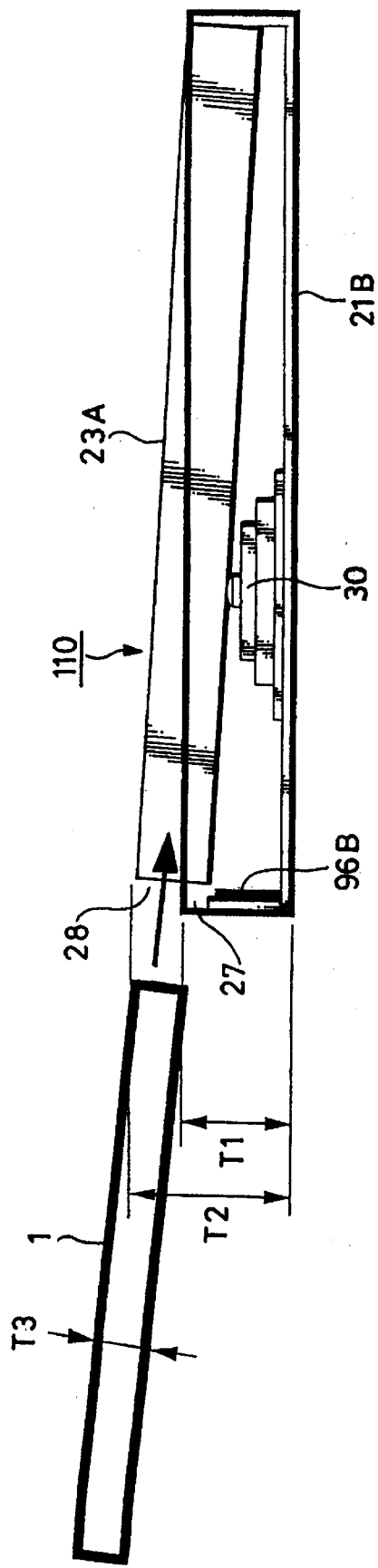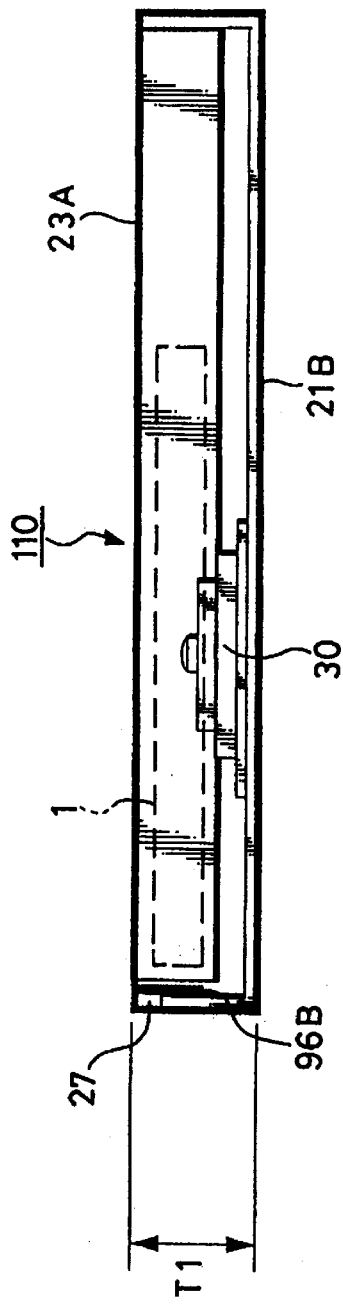
FIG. 26A
FIG. 26B

DISK CARTRIDGE LOADING APPARATUS AND DISK STORAGE APPARATUS INCLUDING SUCH DISK CARTRIDGE LOADING APPARATUS

BACKGROUND OF THE INVENTION

1. Field of the Invention

The present invention relates to a large-capacity disk storage apparatus for use with an information processing apparatus, and particularly to a disk cartridge loading apparatus for loading a disk cartridge in which a disk-like information storage medium is housed into a storage apparatus body or unloading the disk cartridge from the storage apparatus body and a disk storage apparatus including such disk cartridge loading apparatus.

2. Description of the Prior Art

As a high-speed and large-capacity disk storage apparatus typically represented by a removable disk storage apparatus, there are roughly classified based on a disk cartridge loading method two kinds of disk storage apparatus which are referred to as a pop-up type and a slot-in type. FIGS. 1 and 2 schematically show such prior-art disk storage apparatus.

A disk storage apparatus 200 shown in FIG. 1 is a pop-up type disk storage apparatus in which a disk cartridge is loaded or unloaded by tilting a cartridge holder. As shown in FIG. 1, this pop-up type disk storage apparatus 200 comprises a box-like mechanical chassis 201 whose upper surface is opened and a cartridge holder 202 housed within this mechanical chassis 201 so as to become inclined and whose front cartridge insertion slot 202a can be opened and closed.

The mechanical chassis 201 incorporates therein a spindle motor 203 serving as a rotation drive mechanism for rotating a disk-like information storage medium housed within a disk cartridge 300 held on a cartridge holder 202 and a recording and reproducing apparatus (not shown) for recording and/or reproducing an information signal in and/or from an information recording surface of an information storage medium rotated by this spindle motor 203. This mechanical chassis 201 has at its deep respective side portions provided a pair of left and right supporting brackets for supporting respective ends of the rear portion of the cartridge holder 202.

Through this pair of supporting brackets, the cartridge holder 202 can take the unloading state in which the front side thereof is lifted to project the cartridge insertion slot 202a onto the mechanical chassis 201 and the loading state in which the cartridge holder 202 is lowered and accommodated in the mechanical chassis 201 in the horizontal state.

In this pop-up type disk storage apparatus 200, when a disk cartridge 300 is inserted into the cartridge holder 202 or the disk cartridge 300 is ejected from the cartridge holder 202, at least the front side of the cartridge holder 202 should be tilted in the upper direction by an amount larger than the thickness of the disk cartridge 300 so that the cartridge insertion slot 202a should be completely projected from the mechanical chassis 202. If this cartridge holder 202 is not tilted, that is, if the tilted amount of the front side of the cartridge holder 202 is less than the thickness of the disk cartridge 300, then the disk cartridge 300 collides with the mechanical chassis 201 so that the disk cartridge 300 cannot be inserted into the cartridge holder 202 or that the disk cartridge holder 300 cannot be ejected from the cartridge holder 202.

In FIG. 1, assuming now that T1 is the thickness of the disk storage apparatus 200 obtained when the disk cartridge is loaded, T2 is the thickness of the disk storage apparatus 200 obtained when the disk cartridge is inserted (ejected) and that T3 is the thickness of the disk cartridge 300, the following relation is established among the above-mentioned thicknesses T1, T2, T3.

$$T2-T1>T3$$

As described above, in the pop-up type disk storage apparatus 200, the minimum tilting amount of the cartridge holder 202 is automatically determined based on the thickness of the inserted disk cartridge 300 and restricted by such thickness. Accordingly, as the features of the function of the pop-up type disk storage apparatus 200, the thickness of the disk storage apparatus 200 obtained upon loading can be reduced once the disk cartridge 300 is inserted into the storage apparatus body.

On the other hand, in the loading operation of the disk cartridge 300, initially, the disk cartridge 300 is inserted into the cartridge holder 200. Then, the cartridge holder 200 is tilted and the information storage medium is loaded on to a spindle motor, which then requires a two-stage operation. Therefore, there should be executed a plurality of loading procedures, which is not convenient for the operator.

Also, a disk storage apparatus 210 shown in FIG. 2, is a slot-in type disk storage apparatus typically represented by a floppy disk drive (FDD) in which a disk cartridge is inserted or ejected from a slot serving as an opening window defined in the storage apparatus body. As shown in FIG. 2, this slot-in type disk storage apparatus 210 comprises a rectangular box-like storage apparatus body 211 and a cartridge holder 212 accommodated within this storage apparatus body 211 and which can be horizontally elevated and lowered.

This storage apparatus body 211 incorporates therein the spindle motor 213 serving as a rotation drive mechanism and a recording and reproducing apparatus (not shown) for recording and/or reproducing an information signal in and/or from an information recording medium rotated by this spindle motor 213 similarly to the above-mentioned pop-up type. This storage apparatus body 211 has on its front surface defined an opening window 211a into or from which a disk cartridge 300 is inserted or ejected. To the inside of this opening window 211a is opposed a cartridge insertion slot 212a of the cartridge holder 212 moved to the upper position. Then, the cartridge holder 212 is lowered by a holder elevating mechanism (not shown) and moved to the lower position, whereby the information recording medium is loaded onto the spindle motor 213.

The feature of this slot-in type disk storage apparatus 210 lies in that, once the disk cartridge 300 is inserted into the storage apparatus body 211, the loading operation can be automatically executed and then completed. Then, when an eject mechanism is operated by pressing an eject button, for example, the disk cartridge 300 can be ejected automatically. Accordingly, this slot-in type disk storage apparatus 210 has the greatest advantage that its operation property is excellent and thus it is easy to handle for the operator.

On the other hand, in the slot-in type disk storage apparatus 210, since the cartridge holder 212 is elevated and lowered within the storage apparatus body 211, the thickness of the storage apparatus body 211 increases from a mechanism standpoint so that the thickness of the storage apparatus body 211 increases considerably as compared with that of the pop-up type disk storage apparatus 200.

At that time, the thickness T1 of the disk storage apparatus 210 obtained when the disk cartridge is loaded and the thickness T2 of the disk storage apparatus 210 obtained when the disk cartridge is inserted (or ejected) become equal to each other.

That is, a relation of T1=T2 is established.

In view of the problems encountered with the first and second prior-art examples, the assignee of the present application has proposed a removable disk loading apparatus of the new type in which the merits of the cartridge loading systems of the above-mentioned two kinds are fused, and has filed a patent application (Japanese patent application No. 9-334341). FIGS. 3A, 3B show a schematic arrangement of a disk storage apparatus having this cartridge loading system (hereinafter referred to as a pop-slot type).

As shown in FIGS. 3A, 3B, this pop-slot type disk storage apparatus 220 includes a mechanical chassis 221 similar to the mechanical chassis 201 of the above-mentioned pop-up type disk storage apparatus 200 and a cartridge holder 222 similar to the cartridge holder 212 of the slot-in type disk storage apparatus 210. The mechanical chassis 221 incorporates therein the same spindle motor 223 and the recording and reproducing apparatus (not shown). Then, when the cartridge holder 222 is elevated and lowered by a holder elevating mechanism (not shown), this pop-slot type disk storage apparatus 220 can selectively take the upper position at which the whole of the cartridge holder 222 is projected on the mechanical chassis 221 as shown in FIG. 3A and the lower position at which the cartridge holder 222 is wholly accommodated within the mechanical chassis 221 as shown in FIG. 3B.

In this pop-slot type disk storage apparatus 220, as shown in FIG. 3A, when the disk cartridge is inserted (or ejected), the cartridge holder 222 is placed in the standby mode at the upper position shown by a narrow line while it is kept in the horizontal state. Thereafter, the disk cartridge 300 is inserted into the cartridge holder 222 by a predetermined amount, whereby the holder elevating mechanism is energized to urge the cartridge holder 222 with the disk cartridge 300 accommodated therein to start the lowering operation automatically. Then, when the cartridge holder 222 is lowered to the lower position (FIG. 3B), the information recording medium accommodated within the disk cartridge 300 is loaded onto the spindle motor 223.

In FIGS. 3A, 3B, let it be assumed that T1 is the thickness of the disk storage apparatus 220 obtained when the disk cartridge is loaded, T2 is the thickness of the disk storage apparatus 220 obtained when the disk cartridge is inserted (or ejected) and T3 is the thickness of the disk cartridge 300. The following relation is established among the thicknesses T1, T2, T3:

$$T2-T1>T3.$$

As described above, in the pop-slot type disk storage apparatus 220, by executing the simple operation in which the disk cartridge 300 is inserted into the cartridge holder 222 similarly to the slot-in type, the loading operation can be automatically executed and the disk cartridge 300 can be automatically loaded onto the spindle motor 223. At the same time, in the loading state, similarly to the pop-up type, the thickness of the storage apparatus body can be reduced, i.e. only the thickness of the mechanical chassis 221 is required. Accordingly, when an information signal is recorded and/or reproduced or the apparatus is transported, the disk storage apparatus can be handled in the state that it has the thickness of only the storage apparatus body.

Further, according to the pop-slot type disk storage apparatus 200, the whole surrounding of the mechanism is covered with a housing and can be developed to the slot-in type disk storage apparatus in which the thickness of the disk storage apparatus is constantly made constant. Thus, by using the same assemblies for the disk storage apparatus, it is possible to easily realize a variety of merchandise such as a pop-slot type and a slot-in type.

However, in the prior-art disk storage apparatus, according to the slot-in disk storage apparatus 210, only by executing the single operation in which "insert the disk cartridge 300 into the cartridge holder 212", the loading operation can be automatically executed and the automatic loading of the disk cartridge 300 can be completed. There are then the advantages that if the disk cartridge 300 can be exchanged with ease and this slot-in type disk storage apparatus 210 is easy to handle. However, from a structure standpoint, the thickness of the whole of the disk storage apparatus 220 increases so that the whole of the apparatus cannot be made thin.

On the other hand, according to the pop-up type disk storage apparatus 200 and the pop-slot type disk storage apparatus 220, after the disk cartridge 300 was loaded, the overall thickness of the disk storage apparatus 200, 220 becomes only the thickness of the mechanical chassises 201, 221. There is then no problem that the disk storage apparatus 200, 220 are reduced in thickness after the disk cartridge 300 was loaded thereon. However, when the disk cartridge 300 is inserted and ejected, the cartridge holders 202, 222 are tilted or elevated or lowered so that the overall thickness of the disk storage apparatus 200, 220 increases temporarily. In addition, since the tilted amount or the elevated or lowered amount of the cartridge holders 202, 222 is greater than at least the thickness T3 of the disk cartridge 300, the thickness of the disk storage apparatus 200, 220 obtained when the disk cartridge 300 is inserted or ejected increases temporarily, thereby hindering the whole apparatus from being reduced in thickness.

SUMMARY OF THE INVENTION

In view of the aforesaid aspect, it is an object of the present invention to provide a disk cartridge loading apparatus in which a movement amount of a cartridge holder required when a disk cartridge is inserted or ejected can be made smaller than the thickness of the disk cartridge and the movement amount of the cartridge holder can be reduced as much as possible to thereby reducing the thickness of a disk storage apparatus upon change of the disk cartridge and a disk storage apparatus including such disk cartridge loading apparatus.

In order to solve the above-mentioned problems and to attain the above-mentioned object, in a disk cartridge loading apparatus claimed in claim 1 of the present invention comprising a cartridge holder in which a disk cartridge in which a disk-like information recording medium at least one surface of which can be read and/or written is rotatably housed can be loaded and unloaded and a rotation drive mechanism mounted on a memory apparatus body for movably supporting the cartridge holder and to which the disk cartridge information recording medium housed in the cartridge holder can be detachably loaded in accordance with a movement of the cartridge holder, a disk cartridge loading apparatus is characterized in that a movement amount of the cartridge holder is set to be smaller than the thickness of the disk cartridge and also to be an amount in which the cartridge holder can be prevented from interfering with the rotation drive mechanism when the disk cartridge is loaded and unloaded.

In a disk cartridge loading apparatus according to claim 2 of the present invention, the disk cartridge loading apparatus further comprises a movable door which is moved along a movement locus of the disk cartridge and out of the movement locus of the disk cartridge in unison with a movement operation of the cartridge holder.

In a disk cartridge loading apparatus according to claim 3 of the present invention, the movable door comprises a door body for opening and closing an opening window defined in the storage apparatus body and a pair of arm members integrally formed with respective ends of the door body and respective end portions can be rotatably supported to the storage apparatus body.

In a disk cartridge loading apparatus according to claim 4 of the present invention, wherein the movable door comprises a door body for opening and closing an opening window defined in the storage apparatus body and a pair of supporting arms integrally formed with respective ends of the door body and respective end portions can be rotatably supported to the storage apparatus body.

In a disk cartridge loading apparatus as claimed in claim 5 of the present invention, the movable door is spring-biased in the direction closing an opening window defined in the storage apparatus body by a resilient member interposed between it and the storage apparatus body.

In a disk cartridge loading apparatus as claimed in claim 6 of the present invention, the cartridge holder is supported to the storage apparatus body so as to be elevated and lowered by a holder elevating mechanism for elevating and lowering the cartridge holder while the horizontal state of the cartridge holder is maintained.

In a disk cartridge loading apparatus as claimed in claim 7 of the present invention, the holder elevating mechanism includes a slide plate supported to the storage apparatus body so as to become slidable in the horizontal direction and which elevates and lowers the cartridge holder when it is slid in the horizontal direction and the slide plate includes an angle restriction pin for restricting a movement amount of the movable door.

In a disk cartridge loading apparatus as claimed in claim 8 of the present invention, the cartridge holder is supported to the storage apparatus body so as to become tiltable in such a manner that an inclination angle of the cartridge holder can be changed.

In a disk storage apparatus as claimed in claim 9 of the present invention, the disk storage apparatus comprises a cartridge holder in which a disk cartridge in which a disk-like information recording medium is rotatably housed can be loaded and unloaded, and a rotation drive mechanism mounted on a memory apparatus body for movably supporting the cartridge holder and to which the disk cartridge information recording medium housed in the cartridge holder can be detachably loaded in accordance with a movement of the cartridge holder, and a recording and reproducing apparatus having an information storage head disposed outside the rotation drive mechanism and which is opposed to the information storage medium rotated by the rotation drive mechanism and reading and/or writing information by inserting the information storage head into the disk cartridge, a disk storage apparatus is characterized in that a movement amount of the cartridge holder is set to be smaller than the thickness of the disk cartridge and also to be an amount in which the cartridge holder can be prevented from interfering with the rotation drive mechanism when the disk cartridge is loaded and unloaded.

In a disk storage apparatus according to claim 10 of the present invention, the disk storage apparatus further comprises a movable door which is moved along a movement locus of the disk cartridge and out of the movement locus of the disk cartridge in unison with a movement operation of the cartridge holder.

In a disk storage apparatus as claimed in claim 11 of the present invention, the movable door comprises a door body for opening and closing an opening window defined in the storage apparatus body and a pair of arm members integrally formed with respective ends of the door body and respective end portions can be rotatably supported to the storage apparatus body.

In a disk storage apparatus according to claim 12 of the present invention, the movable door comprises a door body for opening and closing an opening window defined in the storage apparatus body and a pair of supporting arms integrally formed with respective ends of the door body and respective end portions can be rotatably supported to the storage apparatus body.

In a disk storage apparatus as claimed in claim 13 of the present invention, the movable door is spring-biased in the direction closing an opening window defined in the storage apparatus body by a resilient member interposed between it and the storage apparatus body.

In a disk storage apparatus as claimed in claim 14 of the present invention, the cartridge holder is supported to the storage apparatus body so as to be elevated and lowered by a holder elevating mechanism for elevating and lowering the cartridge holder while the horizontal state of the cartridge holder is maintained.

In a disk storage apparatus as claimed in claim 15 of the present invention, the holder elevating mechanism includes a slide plate supported to the storage apparatus body so as to become slidable in the horizontal direction and which elevates and lowers the cartridge holder when it is slid in the horizontal direction and the slide plate includes an angle restriction pin for restricting a movement amount of the movable door.

In a disk storage apparatus as claimed in claim 16 of the present invention, the cartridge holder is supported to the storage apparatus body so as to become tiltable in such a manner that an inclination angle of the cartridge holder can be changed.

In a disk storage apparatus as claimed in claim 17 of the present invention, the cartridge holder has an outer cover fixed thereto so that, when the disk cartridge is loaded on and unloaded from the cartridge holder, the thickness of the storage apparatus body increases and that, when the disk cartridge is loaded onto the rotation drive mechanism, the thickness of the storage apparatus body decreases.

In a disk storage apparatus as claimed in claim 18 of the present invention, the cartridge holder has its periphery covered with an outer cover so that, when the disk cartridge is loaded and unloaded and loaded, the thickness of the storage apparatus body is made constant.

In a disk storage apparatus as claimed in claim 19 of the present invention, the movable door forms a labyrinth structure between it and the storage apparatus body when an opening window defined in the storage apparatus body is closed.

According to the above-mentioned arrangement, in the disk cartridge loading apparatus claimed in claim 1 of the present invention, since the movement amount of the cartridge holder obtained when the disk cartridge is inserted or ejected can be made smaller than the thickness of the disk cartridge and the movement amount of the cartridge holder can be decreased as much as possible, the apparatus can be reduced in thickness when the disk cartridge is loaded and unloaded (inserted or ejected).

In the disk cartridge loading apparatus according to claim 2 of the present invention, since the movable door is moved along the movement locus of the disk cartridge and out of the movement locus of the disk cartridge in unison with the movement operation of the cartridge holder, this movable door can be prevented from becoming a trouble when the disk cartridge is inserted or ejected. Thus, it is possible to prevent or suppress dusts from entering into the apparatus from the outside.

In the disk cartridge loading apparatus according to claim 3 of the present invention, since the movable door comprises the door body for opening and closing the opening window defined in the storage apparatus body and a pair of arm members, it is possible to provide a door having a high rigidity inexpensively.

In the disk cartridge loading apparatus according to claim 4 of the present invention, since the movable door comprises the door body for opening and closing an opening window defined in the storage apparatus body and a pair of supporting arms for rotatably supporting the door body, the door can be prevented from interfering with other assemblies such as in a contact so that the door can be operated smoothly. At the same time, an accommodating space required when the door is lowered can be reduced.

In the disk cartridge loading apparatus as claimed in claim 5 of the present invention, since the movable door is spring-biased in the direction closing an opening window defined in the storage apparatus body by a resilient member, the opening window can be closed tightly so that the airtight state of the apparatus can be maintained.

In the disk cartridge loading apparatus as claimed in claim 6 of the present invention, since the cartridge holder is reliably elevated and lowered while the horizontal state of the cartridge holder is maintained, the disk cartridge can be inserted or ejected reliably, and the thickness of the storage apparatus body required when the disk cartridge is loaded can be reduced as much as possible.

In the disk cartridge loading apparatus as claimed in claim 7 of the present invention, since the cartridge holder is elevated and lowered through the holder elevating mechanism as the slide plate is moved in the front and rear direction and the opening window is opened and closed when the angle restriction pin restricts the movement amount of the movable door in unison therewith, the movable door can be moved reliably.

In the disk cartridge loading apparatus as claimed in claim 8 of the present invention, the disk cartridge can be reliably inserted or ejected by tilting the cartridge holder, and the thickness of the storage apparatus body required when the disk cartridge is loaded can be reduced as much as possible.

Since the disk storage apparatus as claimed in claim 9 of the present invention is arranged as described above, the movement amount of the cartridge holder required when the disk cartridge is inserted or ejected can be made smaller than the thickness of the disk cartridge and the movement amount of the cartridge holder can be reduced as much as possible. Thus, the whole of the apparatus can be made thin, and the information signal can be recorded and reproduced with a high reliability.

In the disk storage apparatus as claimed in claim 10 of the present invention, since the movable door is moved along the movement locus of the disk cartridge and out of the movement locus of the disk cartridge in unison with the movement operation of the cartridge holder, this movable door can be prevented from becoming a trouble when the disk cartridge is inserted or ejected. Thus, it is possible to prevent or suppress dusts from entering into the apparatus from the outside.

In the disk storage apparatus as claimed in claim 11 of the present invention, since the movable door comprises the door body for opening and closing the opening window defined in the storage apparatus body and a pair of arm members, it is possible to provide a door having a high rigidity inexpensively.

In the disk storage apparatus as claimed in claim 12 of the present invention, since the movable door comprises the door body for opening and closing an opening window defined in the storage apparatus body and a pair of supporting arms for rotatably supporting the door body, the door can be prevented from interfering with other assemblies such as in a contact so that the door can be operated smoothly. At the same time, an accommodating space required when the door is lowered can be reduced.

In the disk storage apparatus as claimed in claim 13 of the present invention, since the movable door is spring-biased in the direction closing an opening window defined in the storage apparatus body by a resilient member, the opening window can be closed tightly so that the airtight state of the apparatus can be maintained.

In the disk storage apparatus as claimed in claim 14 of the present invention, since the cartridge holder is reliably elevated and lowered while the horizontal state of the cartridge holder is maintained, the disk cartridge can be inserted or ejected reliably, and the thickness of the storage apparatus body required when the disk cartridge is loaded can be reduced as much as possible.

In the disk storage apparatus as claimed in claim 15 of the present invention, since the cartridge holder is elevated and lowered through the holder elevating mechanism as the slide plate is moved in the front and rear direction and the opening window is opened and closed when the angle restriction pin restricts the movement amount of the movable door in unison therewith, the movable door can be moved reliably.

In the disk storage apparatus as claimed in claim 16 of the present invention, the disk cartridge can be reliably inserted or ejected by tilting the cartridge holder, and the thickness of the storage apparatus body required when the disk cartridge is loaded can be reduced as much as possible.

In the disk storage apparatus as claimed in claim 17 of the present invention, since the outer cover is moved together with the cartridge holder so that the thickness of the storage apparatus body can be reduced, when the disk cartridge is loaded or unloaded, the disk cartridge can be loaded or unloaded with ease by increasing the thickness of the storage apparatus body. When the disk cartridge is loaded, the thickness of the disk storage apparatus can be reduced by reducing the thickness of the storage apparatus body.

In the disk storage apparatus according to claim 18 of the present invention, since the storage apparatus body is covered with the outer cover and thereby made constant in thickness, the disk storage apparatus of the present invention can be developed to a pure slot-in type disk storage apparatus and hence there can be provided a variety of types of apparatus.

In the disk storage apparatus according to claim 19 of the present invention, since the labyrinth structure is formed in the opening window by the movable door and the storage apparatus body, a flow of air can be restricted by increasing a pressure load within the storage apparatus body and dusts or the like can be effectively suppressed from entering from the opening window into the storage apparatus body.

BRIEF DESCRIPTION OF THE DRAWINGS

FIGS. 3A and 3B are explanatory diagrams showing a pop-slot disk storage apparatus according to the prior art;

FIGS. 7A and 7B are perspective views showing movable doors of the pop-slot type disk recording and reproducing apparatus according to the first embodiment shown in FIG. 4, wherein FIG. 7A shows a fixed type movable door according to the first embodiment and FIG. 7B shows a rotary type movable door according to a second embodiment;

FIGS. 8A and 8B are perspective views showing the pop-slot type disk recording and reproducing apparatus according to the first embodiment shown in FIG. 4, wherein FIG. 8A is the perspective view showing an outward appearance presented before the disk cartridge is loaded and FIG. 8B is the perspective view showing the main portion of FIG. 8A in an enlarged-scale;

FIGS. 9A and 9B show the main portion of the disk cartridge loading apparatus shown in FIGS. 8A, 8B, wherein FIG. 9A is a plan view and FIG. 9B is a side view;

FIG. 10A and 10B are perspective views showing the pop-slot type disk recording and reproducing apparatus according to the first embodiment shown in FIG. 4, wherein FIG. 10A is the perspective view showing the outward appearance presented after the disk cartridge is loaded and FIG. 10B is the perspective view showing the main portion of FIG. 10A in an enlarged-scale;

FIGS. 11A and 11B are diagrams showing the main portion of the disk cartridge loading apparatus shown in FIGS. 10A, 10B, wherein FIG. 11A is a plan view and FIG. 11B is a side view;

FIGS. 19A and 19B are side views used to explain an operation of the disk cartridge loading apparatus of the pop-slot type disk recording and reproducing apparatus according to the first embodiment shown in FIG. 4 wherein FIG. 19A is the side view illustrating the state presented before the disk cartridge is loaded and FIG. 19B is the side view illustrating the state presented after the disk cartridge is loaded;

FIGS. 20A and 20B are explanatory diagrams showing a movable door of the disk storage apparatus according to other embodiment of the present invention wherein FIG. 20A is the explanatory diagram used to explain a fixed type movable door according to a third embodiment and FIG. 20B is the explanatory diagram used to explain a rotary type movable door according to a fourth embodiment;

FIGS. 21A and 21B are diagram showing the pop-slot type disk recording and reproducing apparatus using the movable door shown in FIG. 20B wherein FIG. 21A is a side view showing the state presented before the disk cartridge is loaded and FIG. 21B is a cross-sectional view illustrating the same;

FIGS. 22A and 22B are diagrams showing the pop-slot type disk recording and reproducing apparatus using the movable door shown in FIG. 20B wherein FIG. 22A is a side view showing the state presented after the disk cartridge is loaded and FIG. 22B is a cross-sectional view illustrating the same;

FIGS. 23A and 23B are explanatory diagrams schematically showing a slot-in type disk recording and reproducing apparatus of the disk storage apparatus according to a second embodiment of the present invention wherein FIG. 23A is the diagram used to explain the state presented before the disk cartridge is loaded and FIG. 23B is the diagram used to explain the state presented after the disk cartridge is loaded;

FIGS. 24A and 24B are diagram showing the concrete arrangement of the slot-in disk recording and reproducing apparatus of the disk storage apparatus according to the second embodiment of the present invention wherein FIG. 24A is a cross-sectional view showing the state presented before the disk cartridge is loaded and FIG. 24B is a cross-sectional view showing the state presented after the disk cartridge is loaded;

FIGS. 25A and 25B are explanatory diagrams used to explain a labyrinth structure of the slot-in disk recording and reproducing apparatus of the disk storage apparatus according to the second embodiment of the present invention wherein FIG. 25A is the diagram used to explain the state presented before the disk cartridge is loaded and FIG. 25B is the diagram used to explain the state presented after the disk cartridge is loaded; and FIGS. 26A and 26B are diagrams showing a pop-up type disk recording and reproducing apparatus of a disk storage apparatus according to a third embodiment of the present invention wherein FIG. 26A is the diagram used to explain the state presented before the disk cartridge is loaded and FIG. 26B is the diagram used to explain the state presented after the disk cartridge is loaded.

DESCRIPTION OF THE PREFERRED EMBODIMENTS

A disk cartridge loading apparatus and a disk storage apparatus including this disk cartridge loading apparatus according to embodiments of the present invention will hereinafter be described with reference to the drawings. FIGS. 4 to FIGS. 22A, 22B show a disk storage apparatus according to a first embodiment of the present invention in which the present invention is applied to a pop-slot type removable disk recording and reproducing apparatus.

Figure 1:
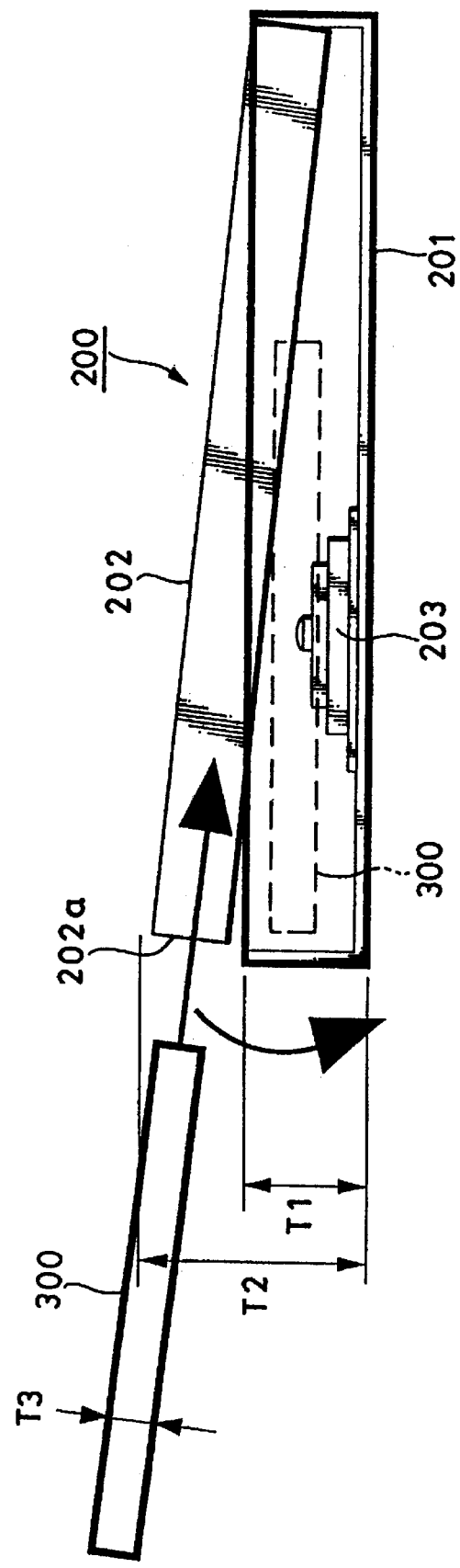
FIG. 1 is an explanatory diagram schematically showing a pop-up disk storage apparatus according to the prior art.
Figure 2:
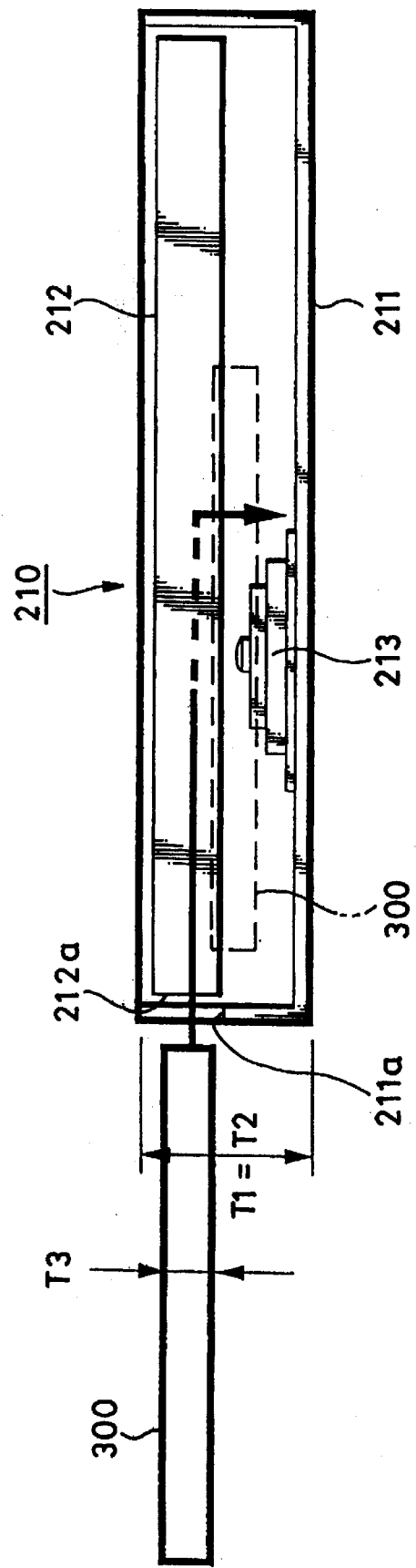
FIG. 2 is an explanatory diagram schematically showing a slot-in disk storage apparatus according to the prior art.
Figure 4:
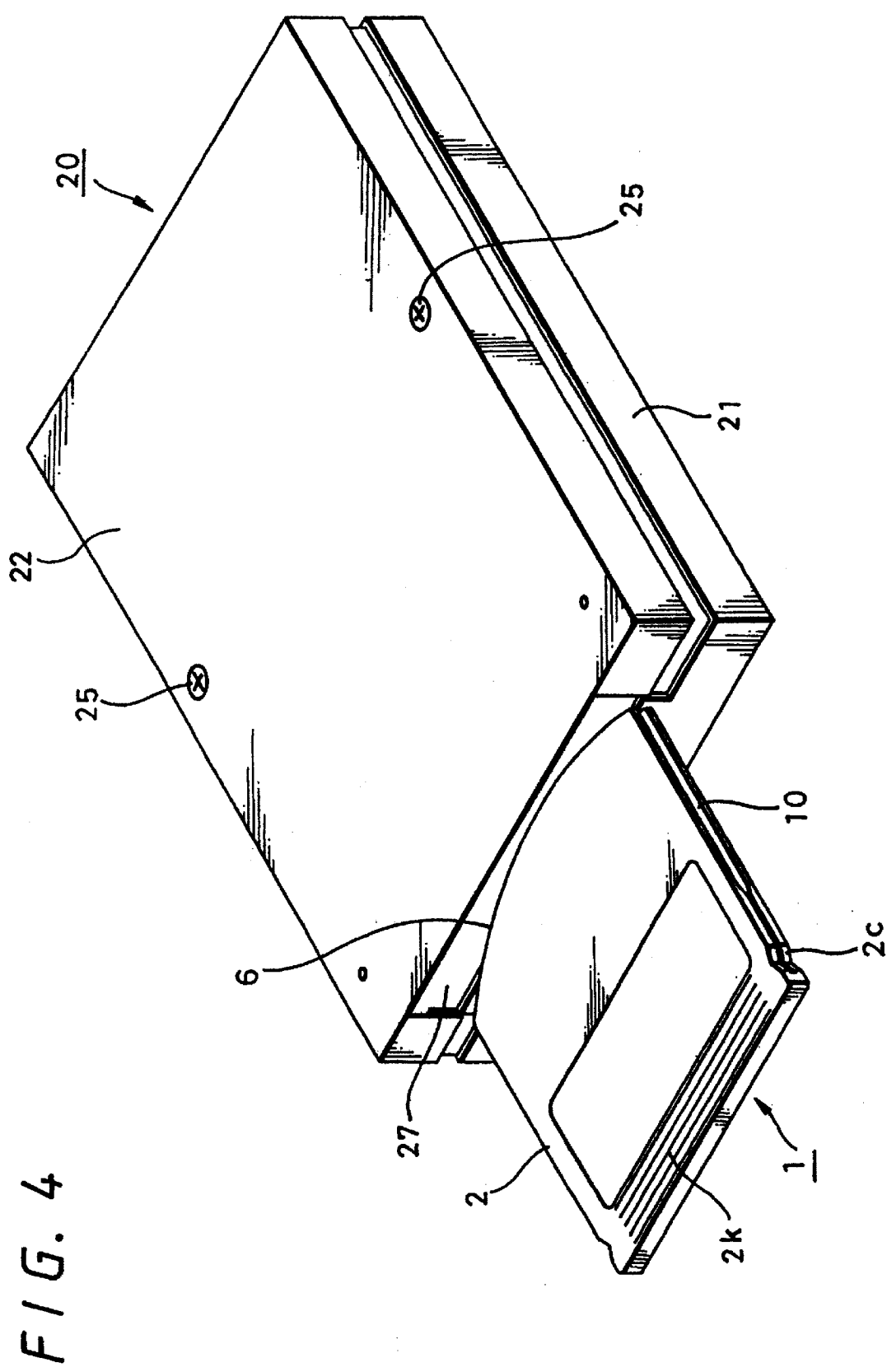
FIG. 4 is a perspective view showing a pop-slot type disk recording and reproducing apparatus of a disk storage apparatus according to a first embodiment of the present invention and shows an outward appearance presented before a disk cartridge is inserted.
Figure 5A:
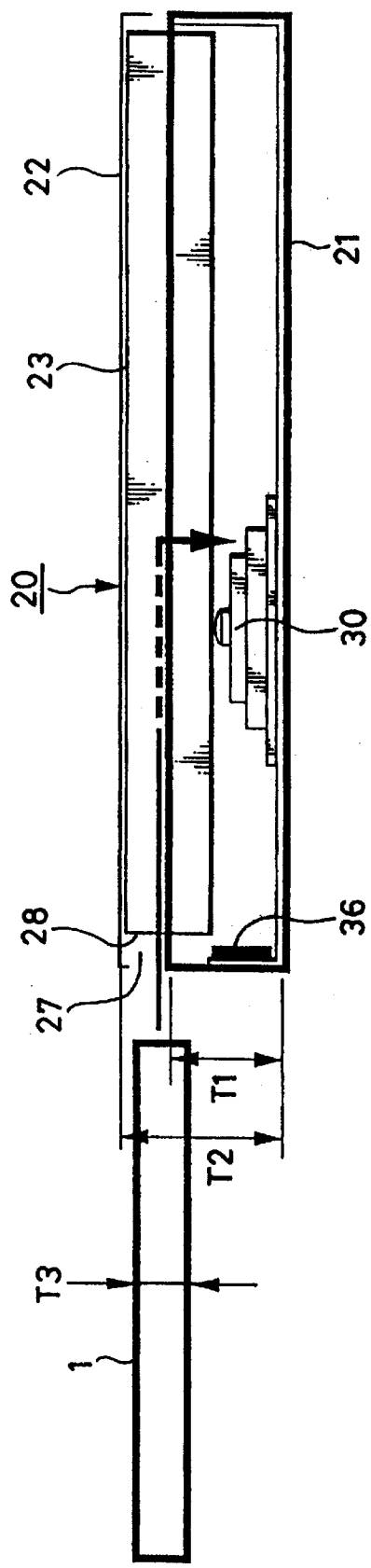
FIGS. 5A and 5B are explanatory diagrams showing the pop-slot type disk recording and reproducing apparatus according to the first embodiment shown in FIG. 4 and illustrating the state presented before the disk cartridge is loaded and the state presented after the disk cartridge is loaded.
Figure 5B:
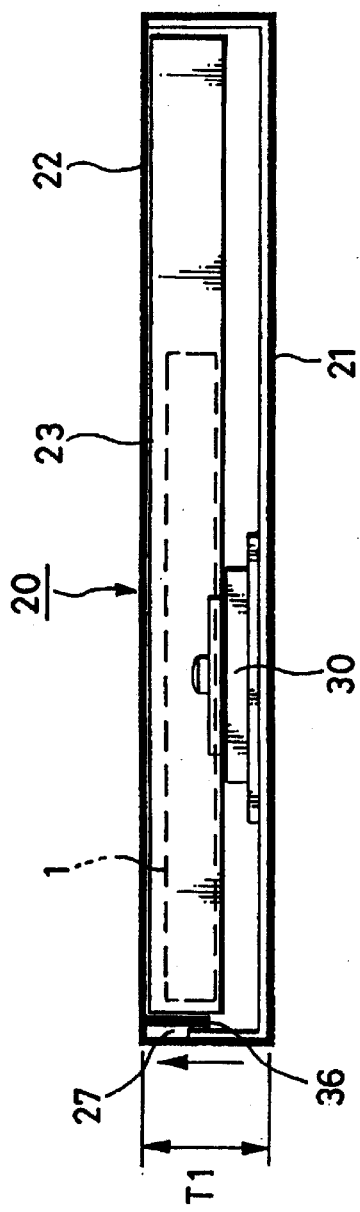
Figure 6:
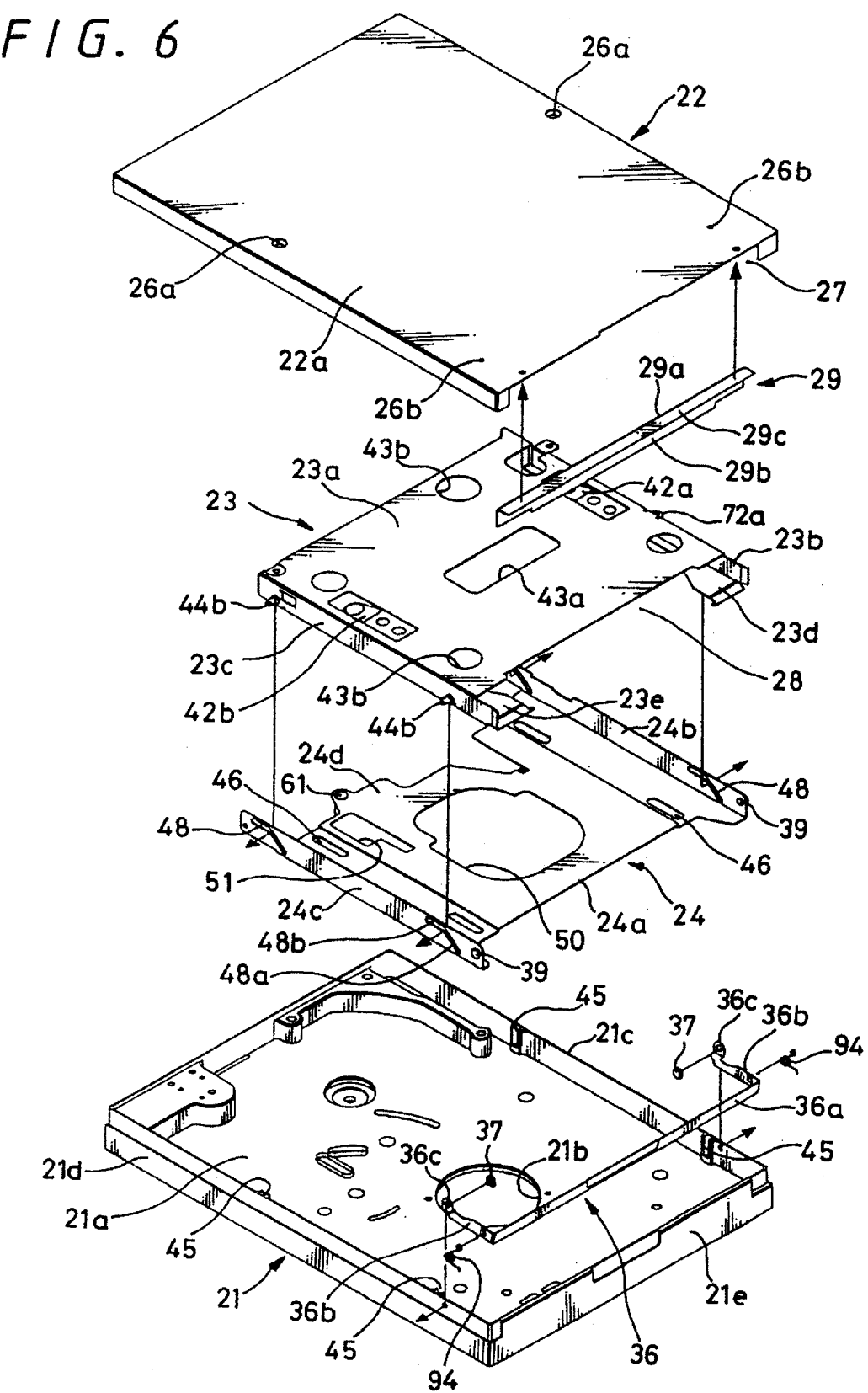
FIG. 6 is an exploded perspective view of major assemblies of the pop-slot type disk recording and reproducing apparatus according to the first embodiment shown in FIG. 4.
Figure 7A:
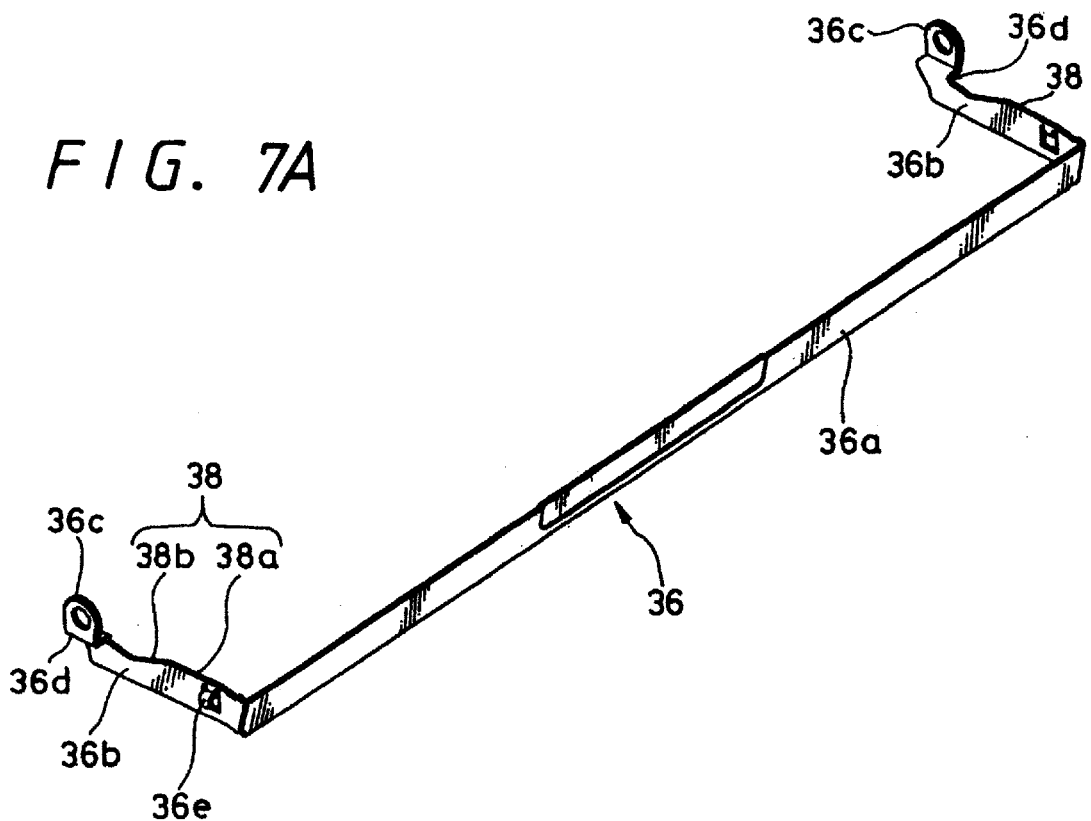
Figure 7B:
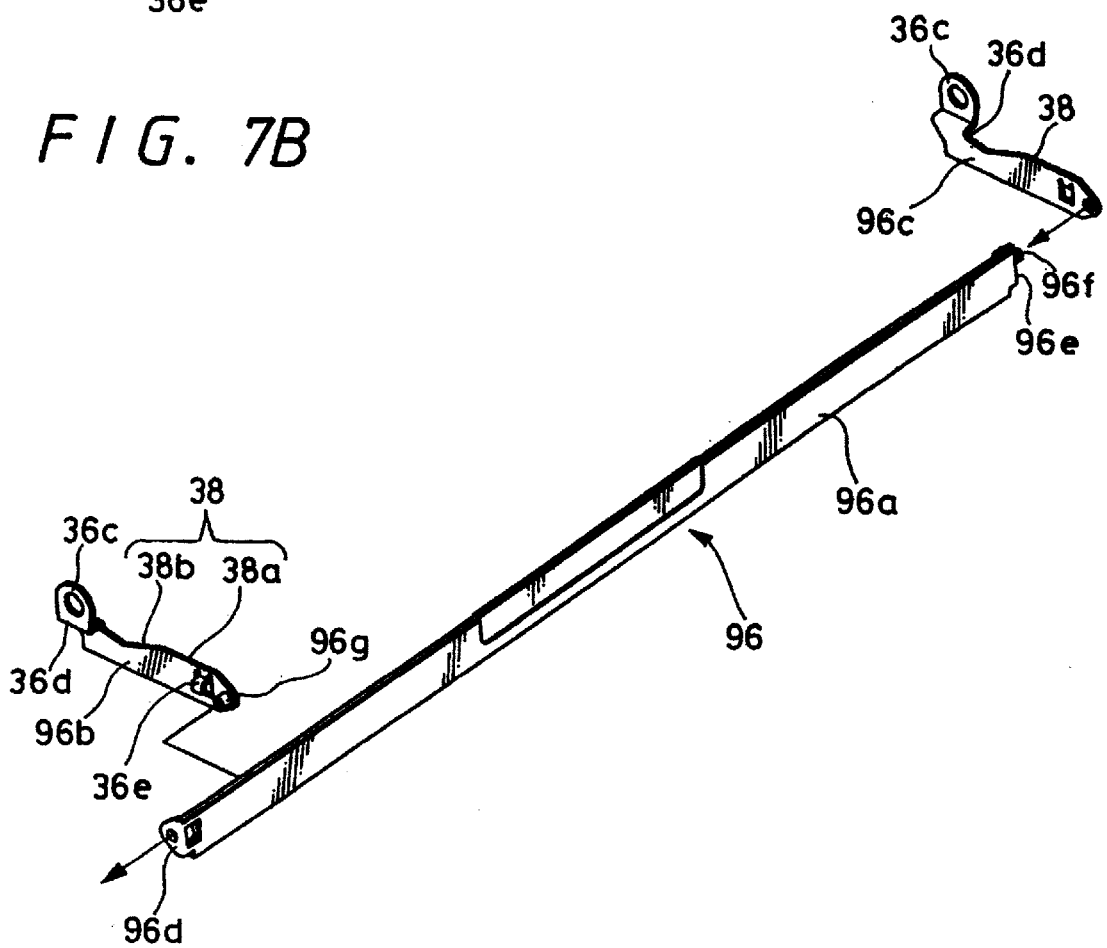
Figure 8A:
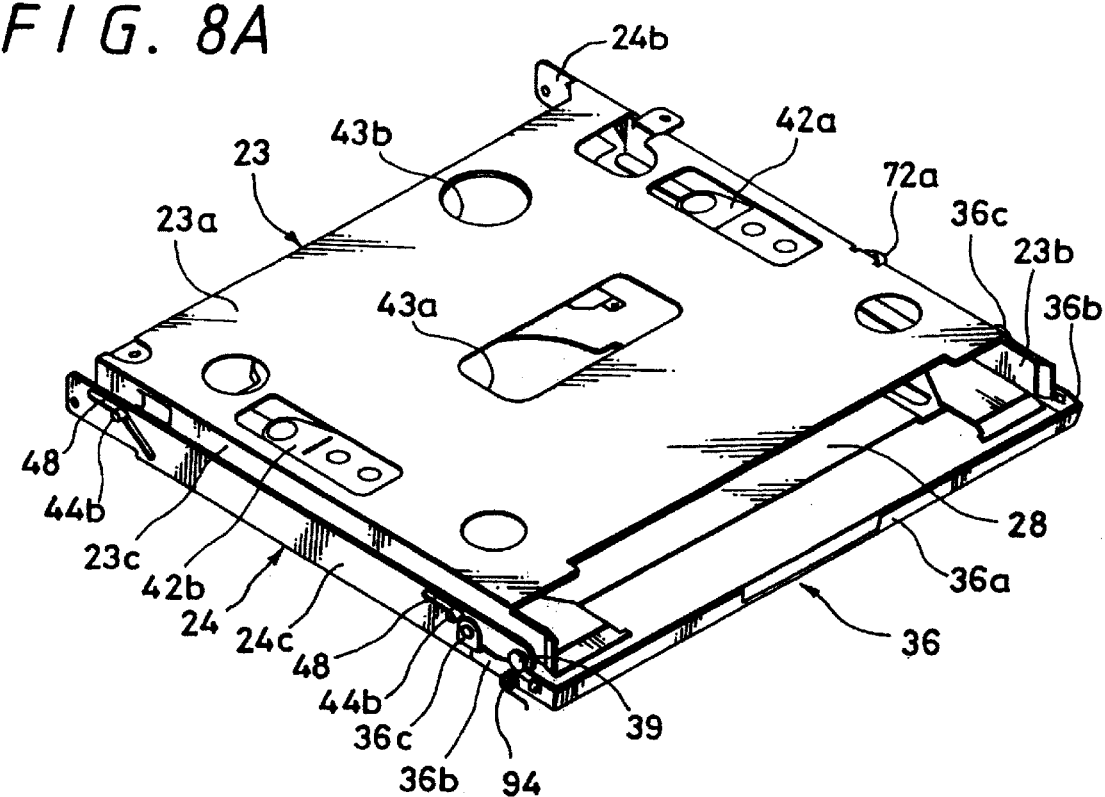
Figure 8B:
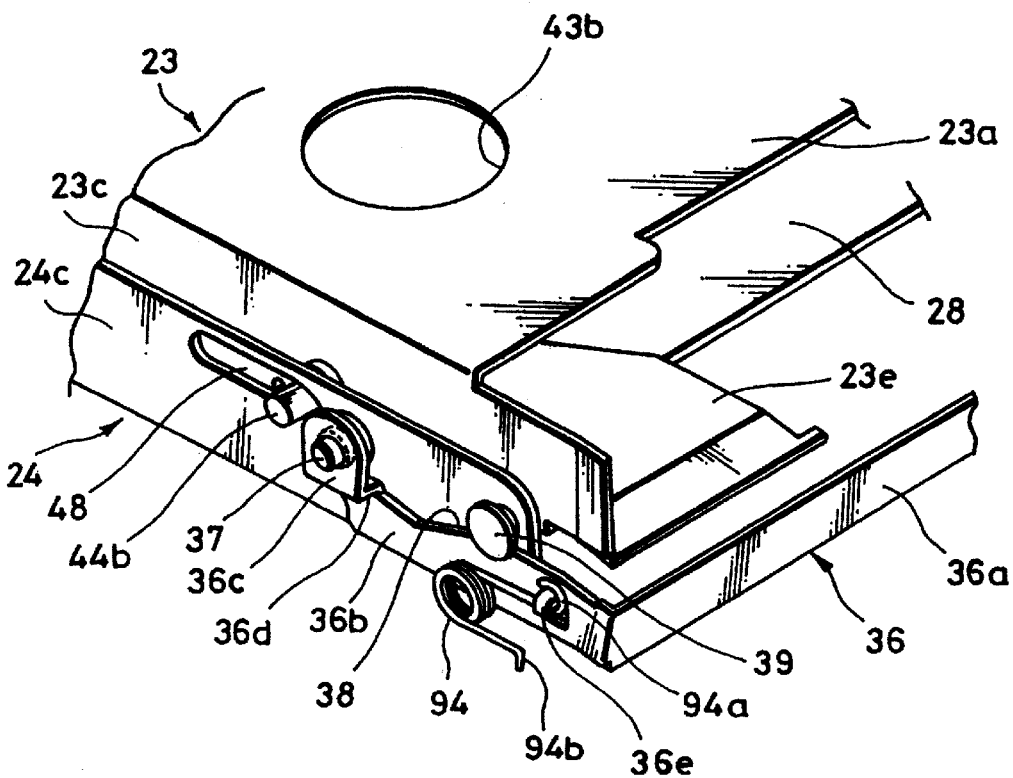
Figure 9A:
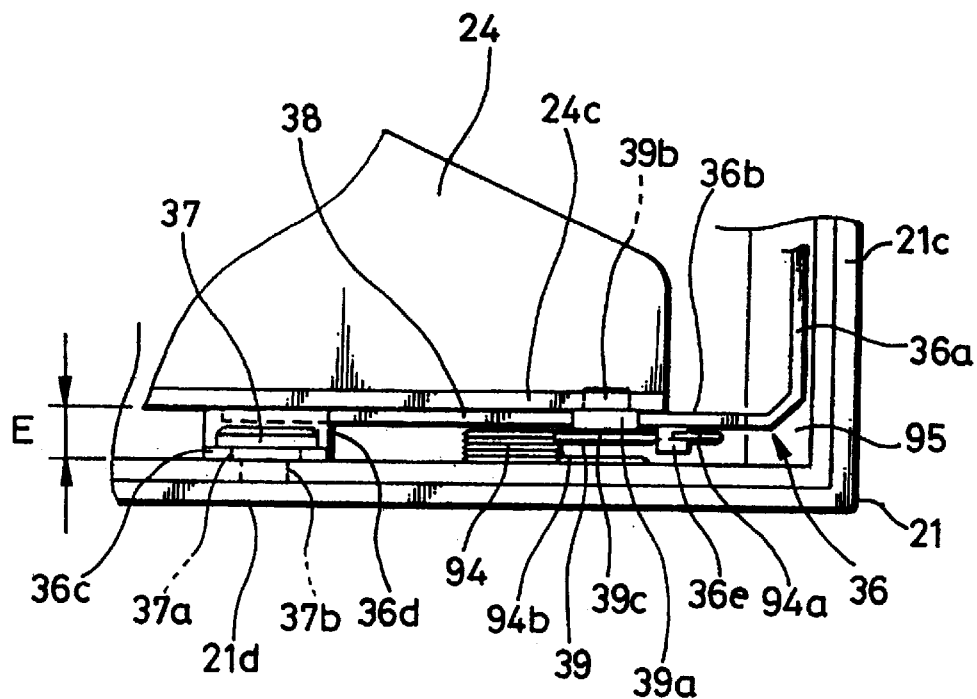
Figure 9B:
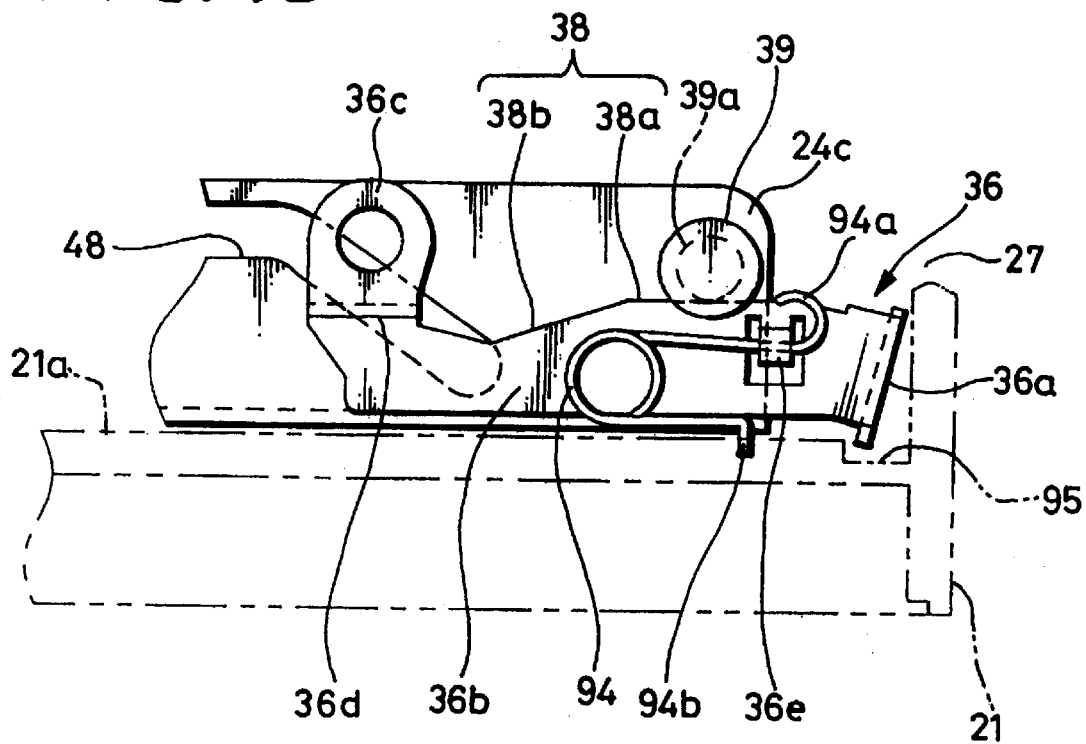
Figure 10A:
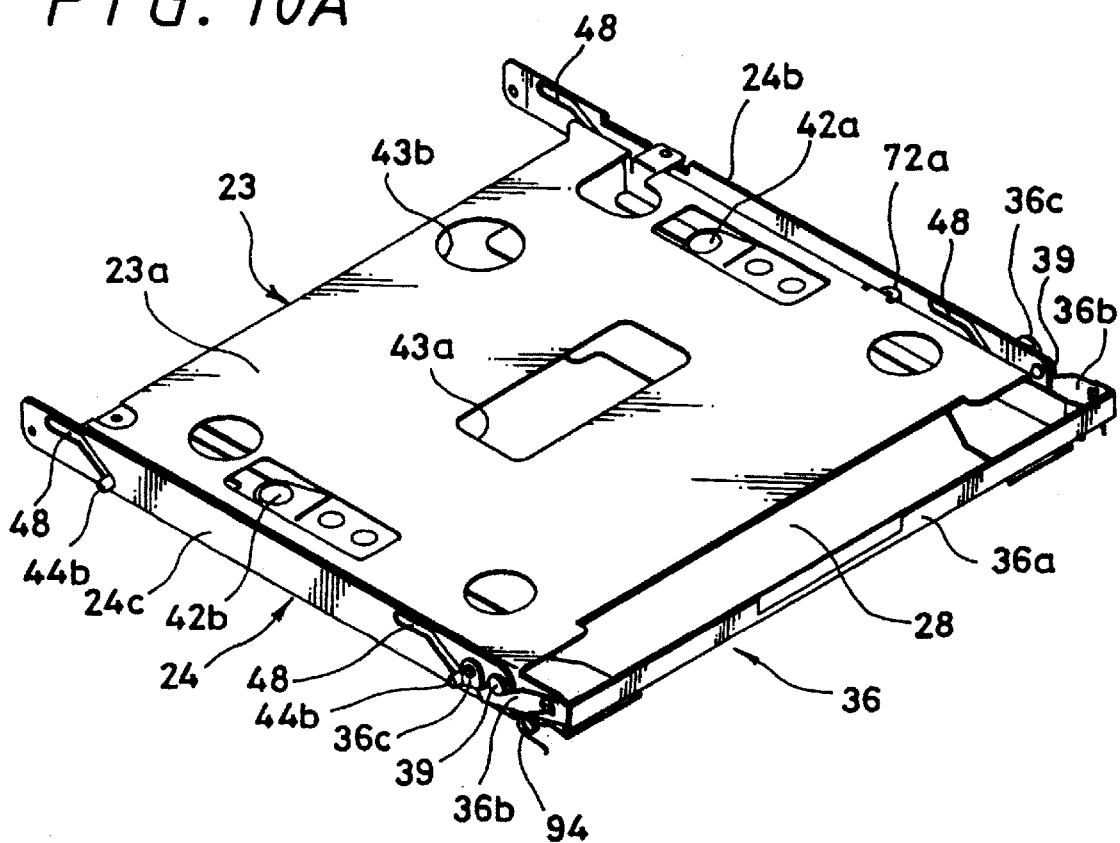
Figure 10B:
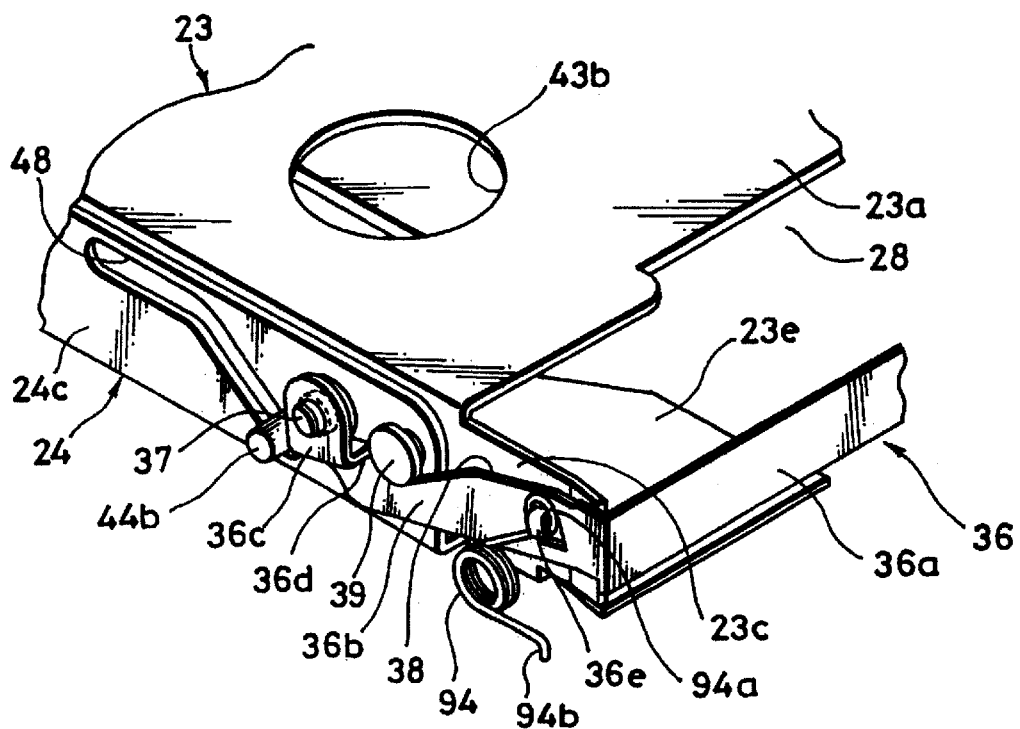
Figure 11A:
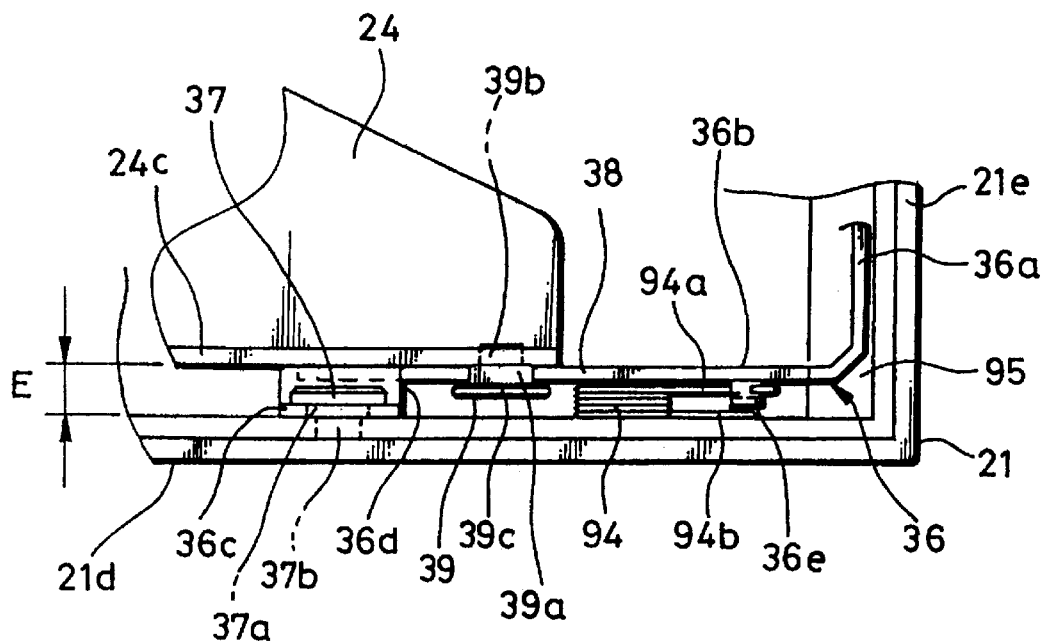
Figure 11B:
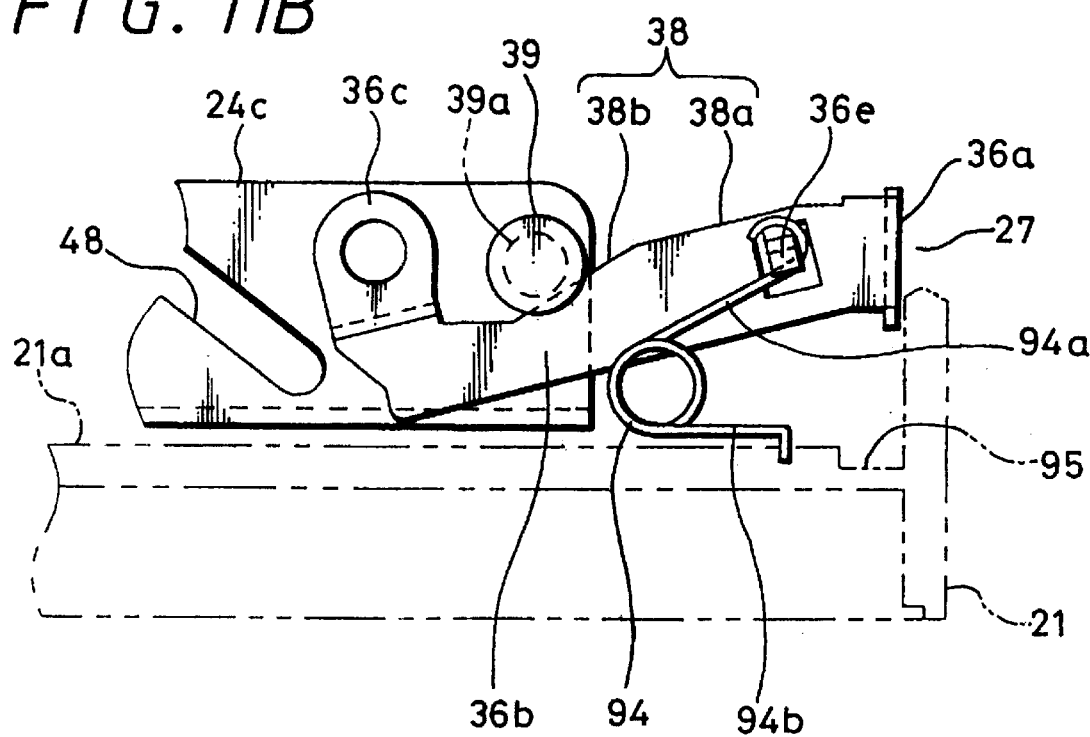
Figure 12:
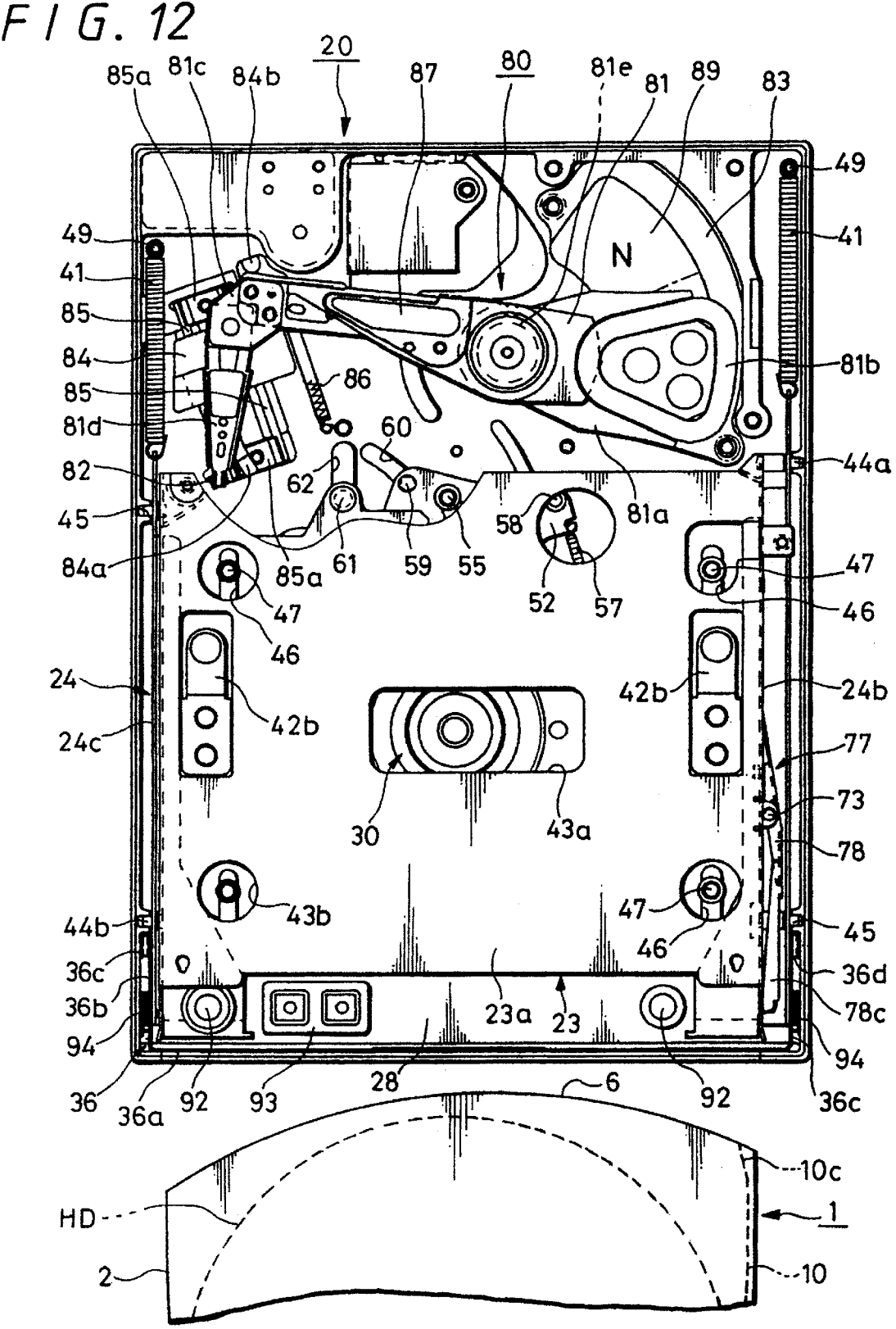
FIG. 12 is a plan view illustrating the state presented before the disk cartridge is loaded onto the disk cartridge loading apparatus of the pop-slot type disk recording and reproducing apparatus according to the first embodiment shown in FIG. 4.
Figure 13:
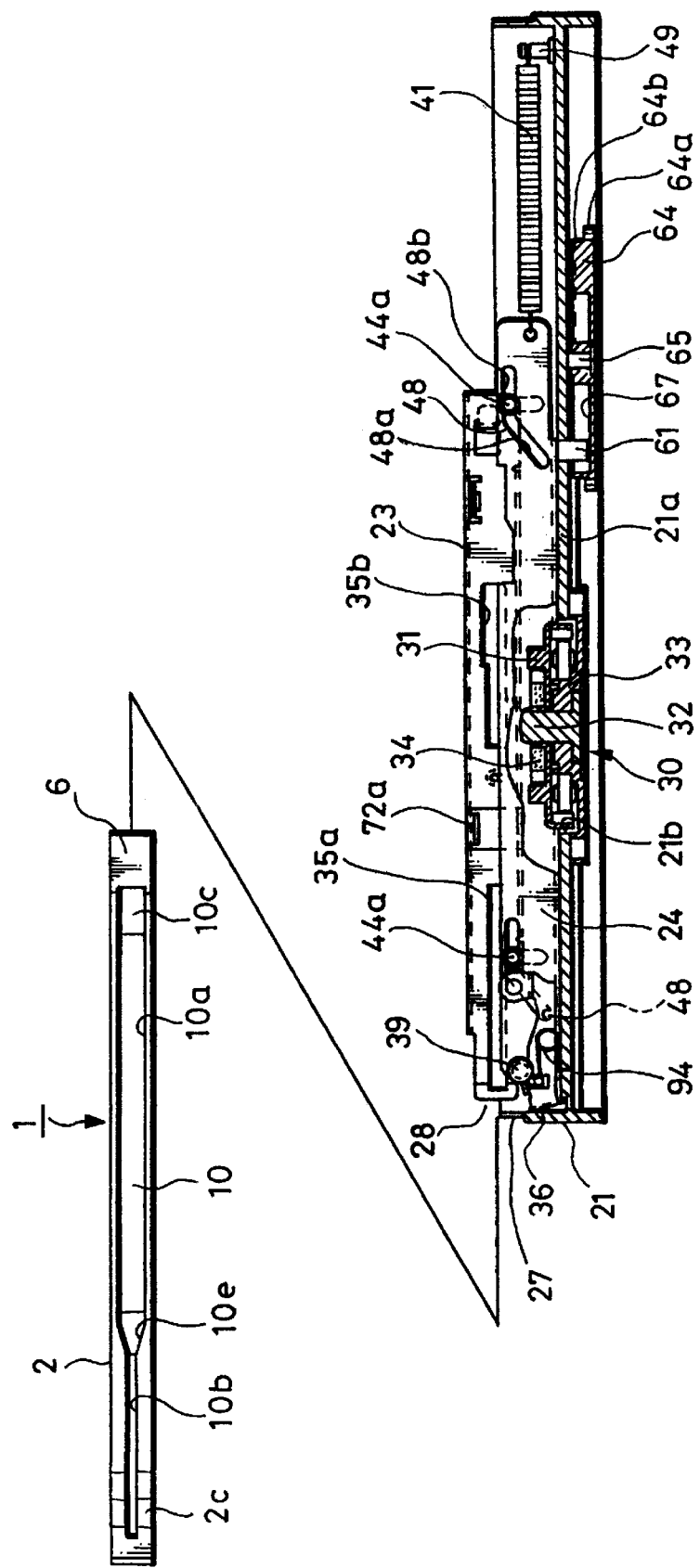
FIG. 13 is a cross-sectional view illustrating the state presented before the disk cartridge is loaded onto the disk cartridge loading apparatus of the pop-slot type disk recording and reproducing apparatus according to the first embodiment shown in FIG. 4.
Figure 14:
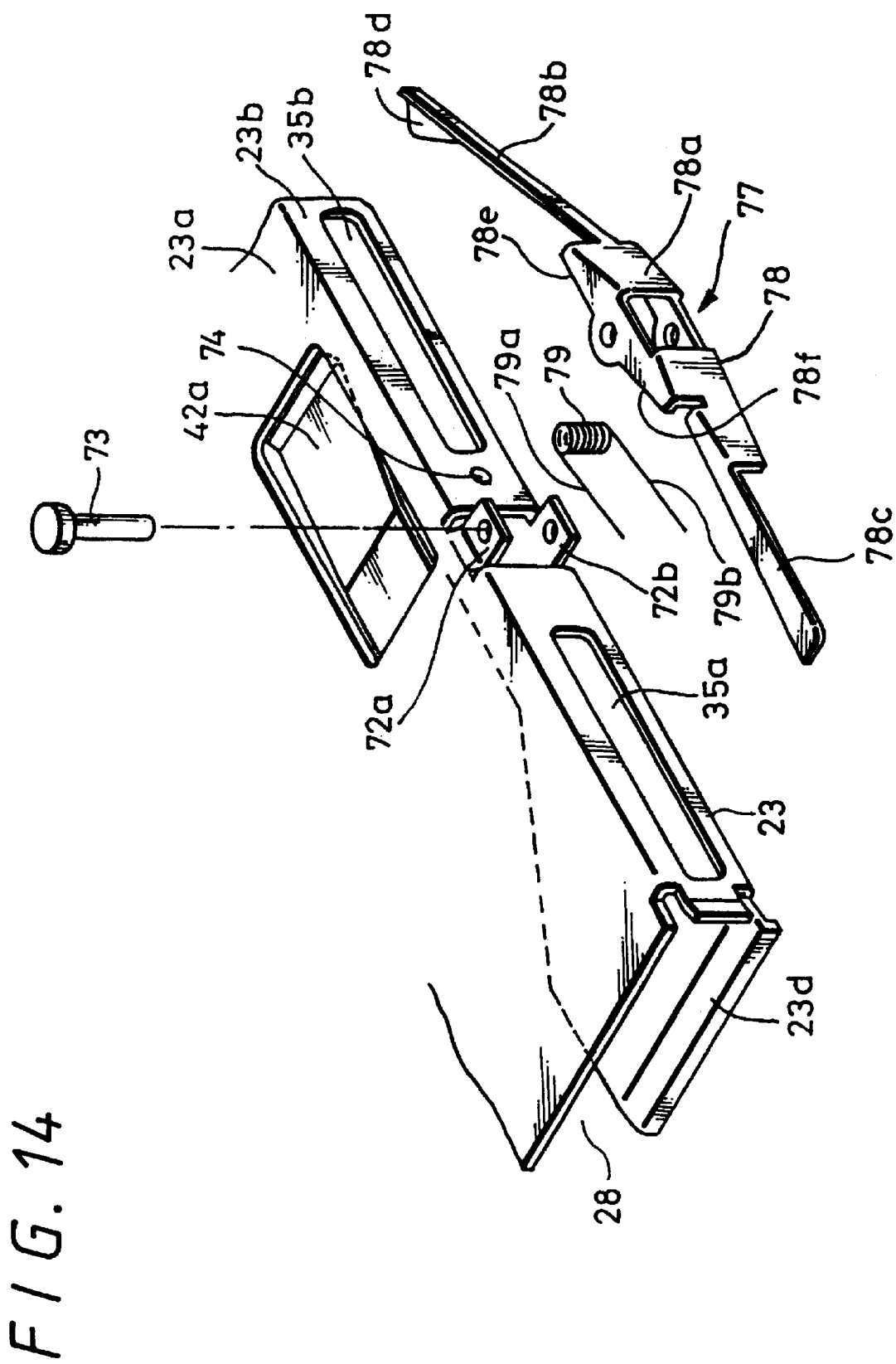
FIG. 14 is an exploded perspective view of a shutter opening mechanism of the disk cartridge loading apparatus of the pop-slot type disk recording and reproducing apparatus according to the first embodiment shown in FIG. 4.
Figure 15:
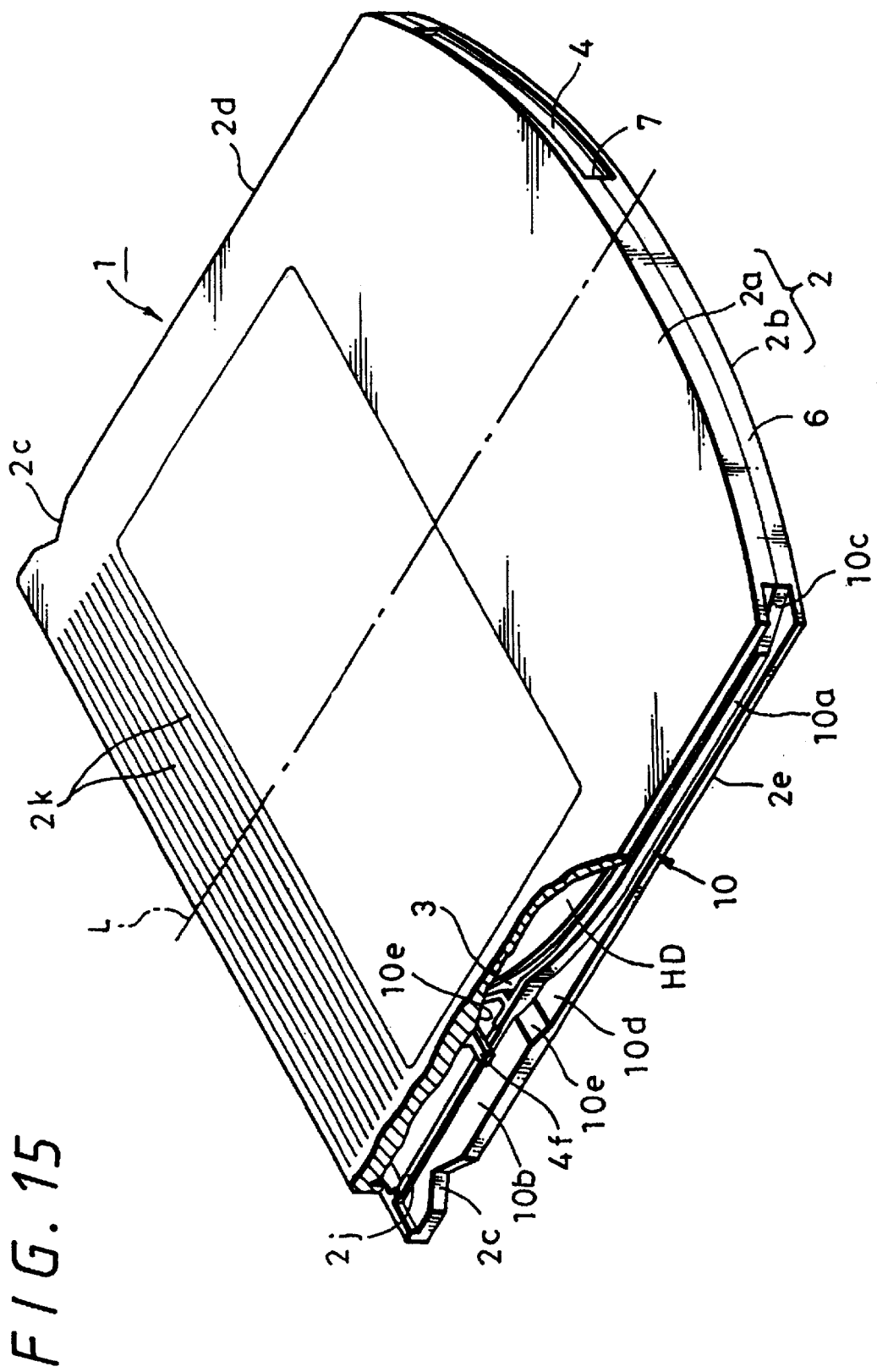
FIG. 15 is a partly cut-away perspective view of the disk cartridge for use with the pop-slot type disk recording and reproducing apparatus according to the first embodiment shown in FIG. 4.
Figure 16:
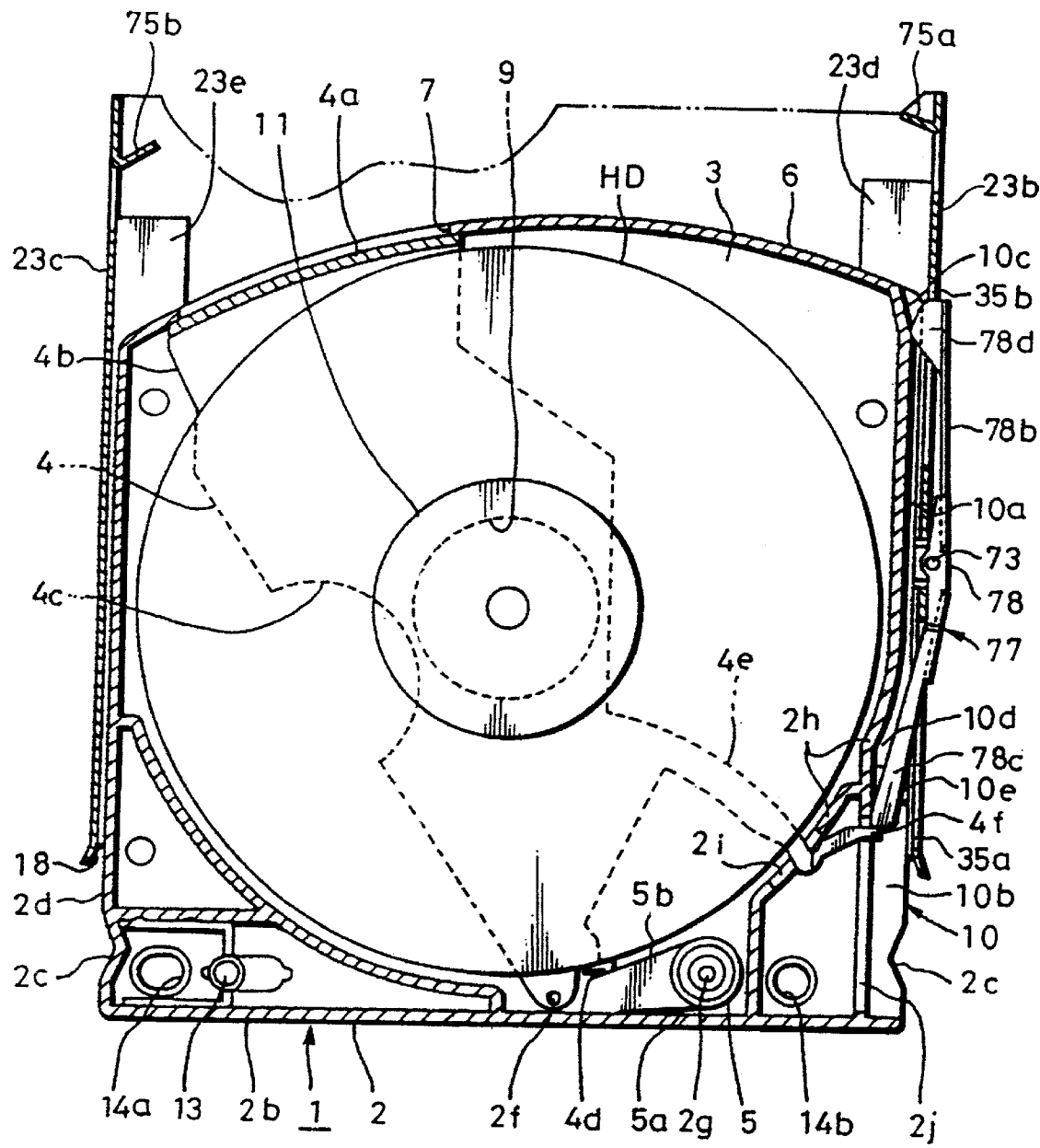
FIG. 16 is a cross-sectional view used to explain an operation of the shutter opening mechanism of the disk cartridge loading apparatus of the pop-slot type disk recording and reproducing apparatus according to the first embodiment shown in FIG. 4.

That is, FIG. 4 is a perspective view showing an outward appearance of a pop-slot type removable disk recording and reproducing apparatus. FIGS. 5A, 5B are schematic diagrams used to explain the operation of the pop-slot type removable disk recording and reproducing apparatus. FIG. 6 is an exploded perspective view of a disk cartridge loading apparatus. FIGS. 7A, 7B are perspective views showing movable doors of the disk cartridge loading apparatus, respectively. FIGS. 8A and 8B are a perspective view and a fragmentary enlarged view showing the state presented before the disk cartridge loading apparatus starts the loading. FIGS. 9A and 9B are a plan view and a side view showing a main portion of the state presented before the disk cartridge loading apparatus starts the loading. FIGS. 10A and 10B are a perspective view and a fragmentary enlarged view showing the state presented after the disk cartridge loading apparatus finishes the loading. FIGS. 11A and 11B are a plan view and a side view showing a main portion of the state presented after the disk cartridge loading apparatus finished the loading. FIG. 12 is a plan view showing the state presented before the disk cartridge is inserted into the disk recording and reproducing apparatus. FIG. 13 is a cross-sectional view showing the state presented before the disk cartridge is inserted into the disk recording and reproducing apparatus. FIG. 14 is an exploded perspective view of a shutter releasing mechanism of the disk cartridge loading apparatus. FIG. 15 is a partly cut-away perspective view of the disk cartridge. FIG. 16 is a cross-sectional view used to explain an operation of the shutter releasing mechanism.

Figure 17:
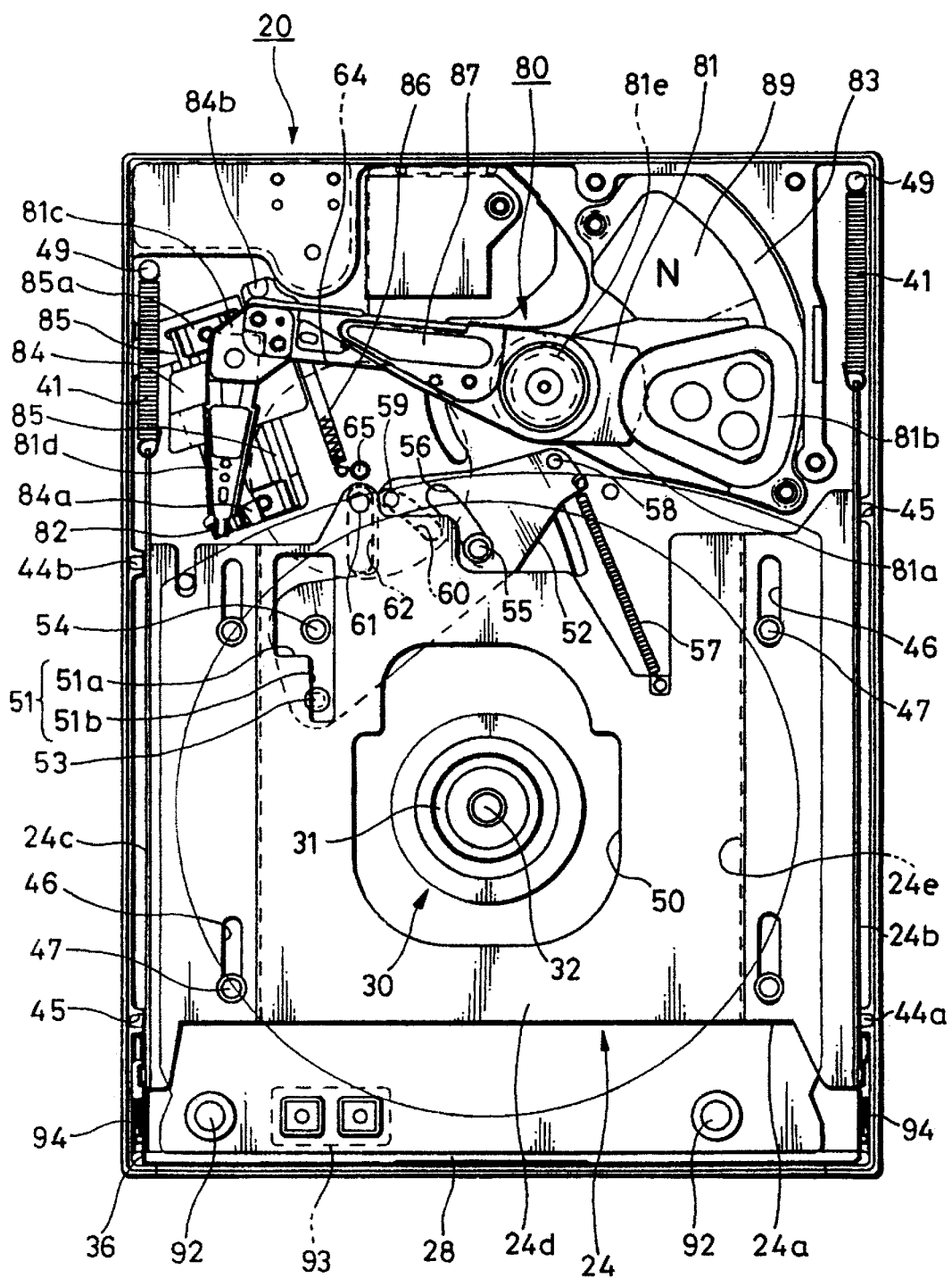
FIG. 17 is a plan view showing the pop-slot type disk recording and reproducing apparatus according to the first embodiment shown in FIG. 1 with its cartridge holder being removed.
Figure 18:
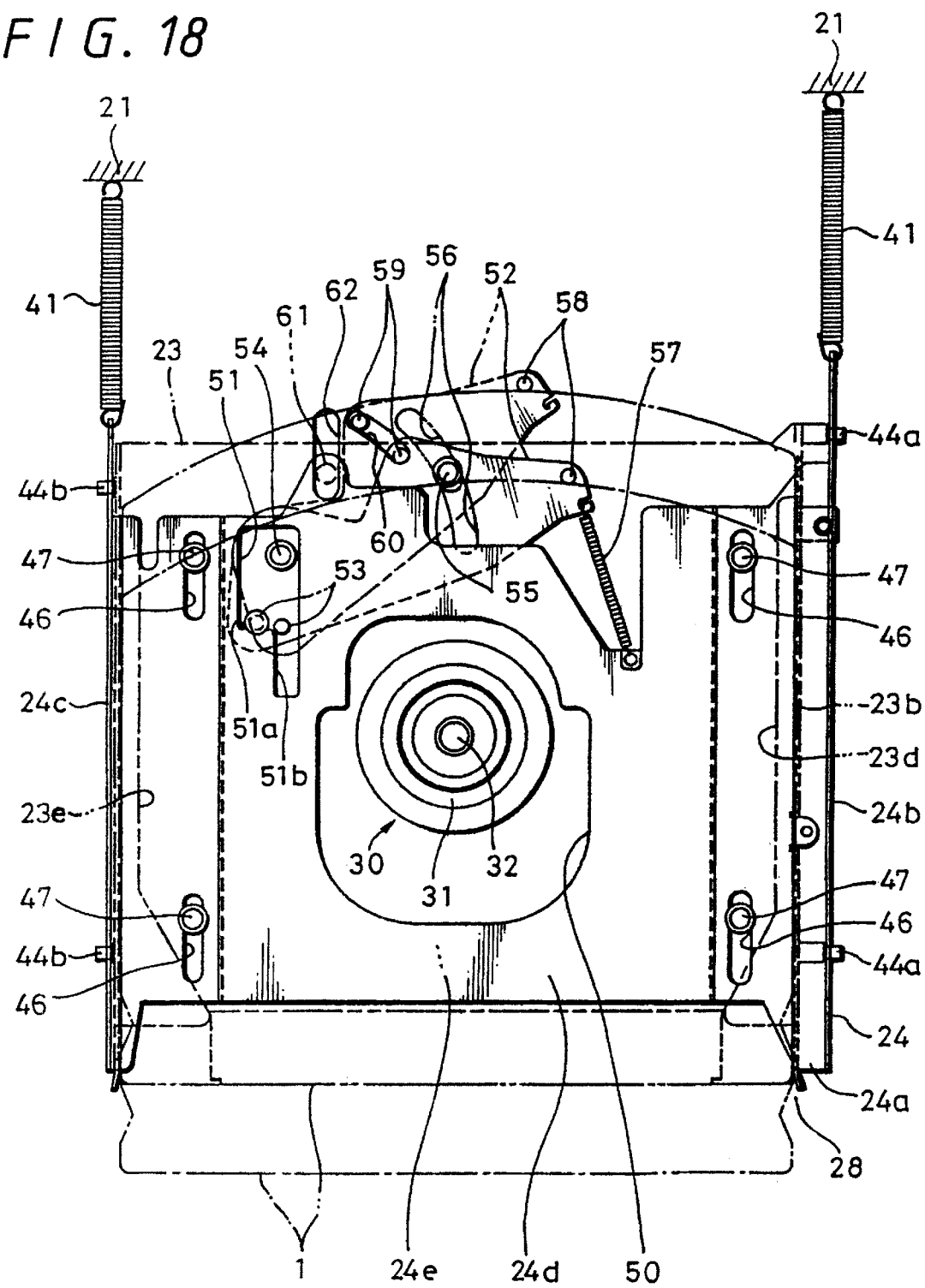
FIG. 18 is a plan view used to explain an operation of the disk cartridge loading apparatus of the pop-slot type disk recording and reproducing apparatus according to the first embodiment shown in FIG. 4.
Figure 20A:
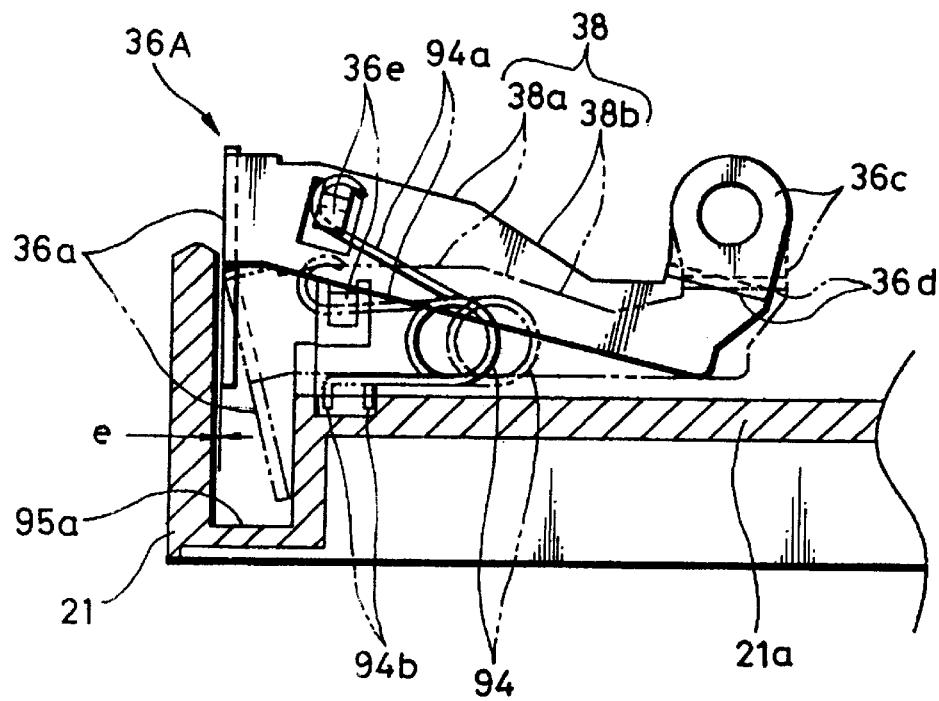
Figure 20B:
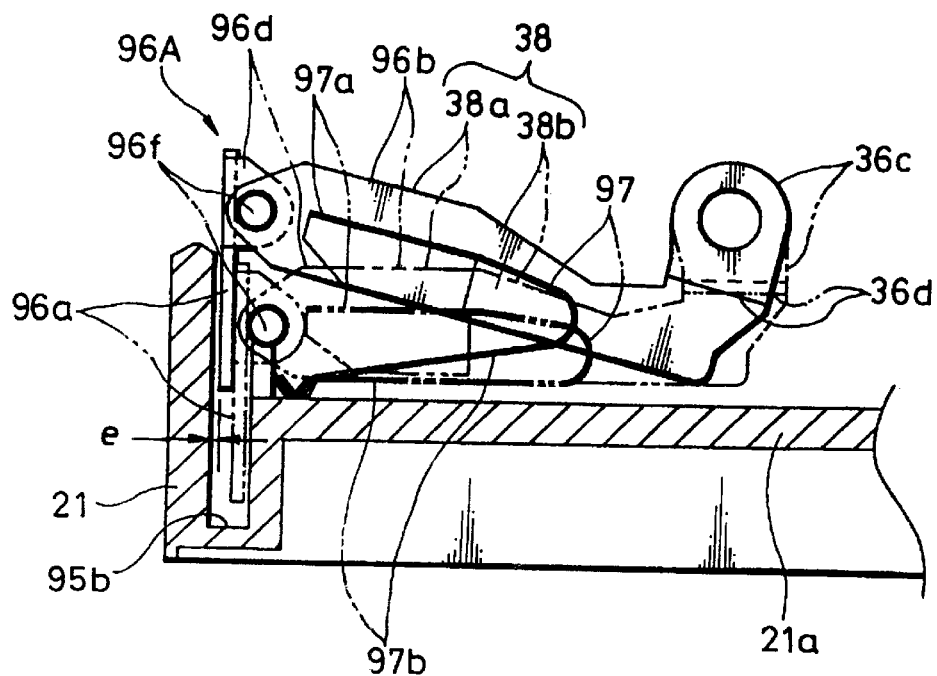
Figure 22A:
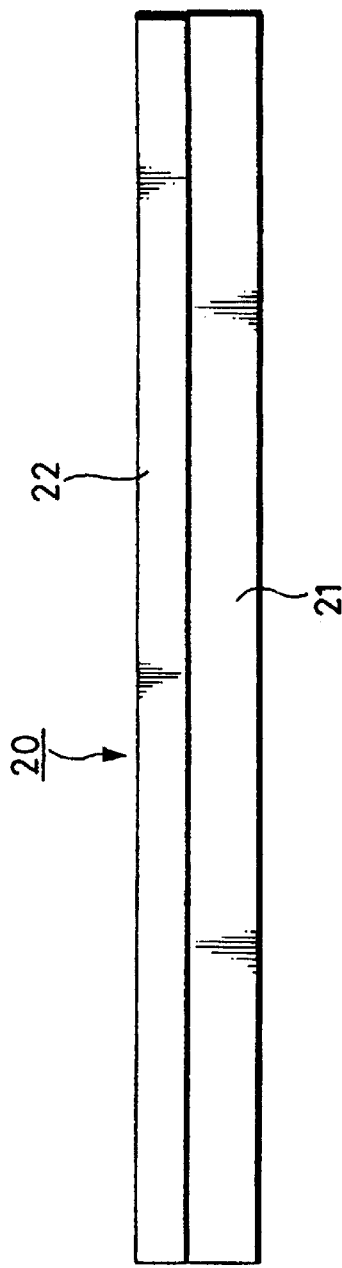
Figure 22B:
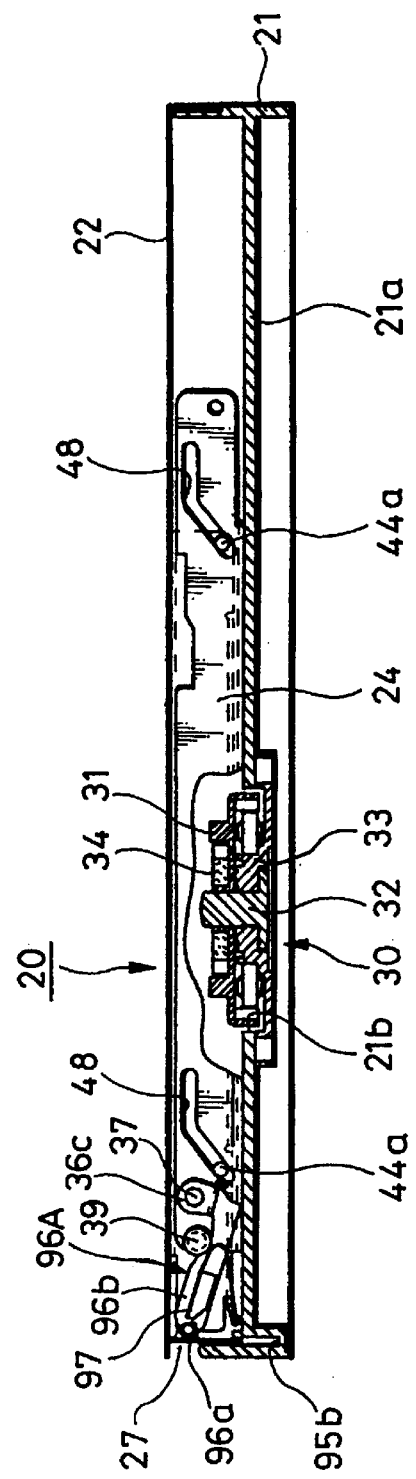

Further, FIG. 17 is a plan view showing the disk recording and reproducing apparatus with the cartridge holder being removed. FIG. 18 is a plan view used to explain an operation of the disk cartridge loading apparatus. FIGS. 19A and 19B are side views used to explain the operation of the disk cartridge loading apparatus. FIGS. 20A and 20B are diagrams used to explain a movable door of the disk storage apparatus according to other embodiment. FIGS. 21A and 21B are a side view and a cross-sectional view showing the state presented before the disk cartridge is loaded onto the disk recording and reproducing apparatus using the movable door shown in FIG. 20B. FIGS. 22A and 22B are a side view and a cross-sectional view showing the state presented after the disk cartridge is loaded onto the disk recording and reproducing apparatus using the movable door shown in FIG. 20B.

Figure 24A:
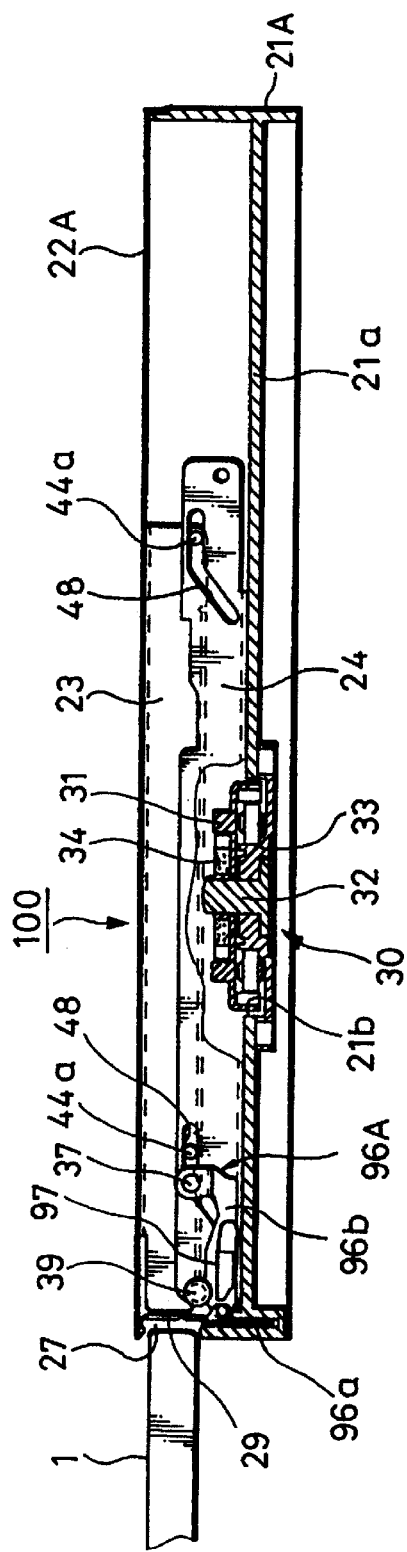
Figure 24B:
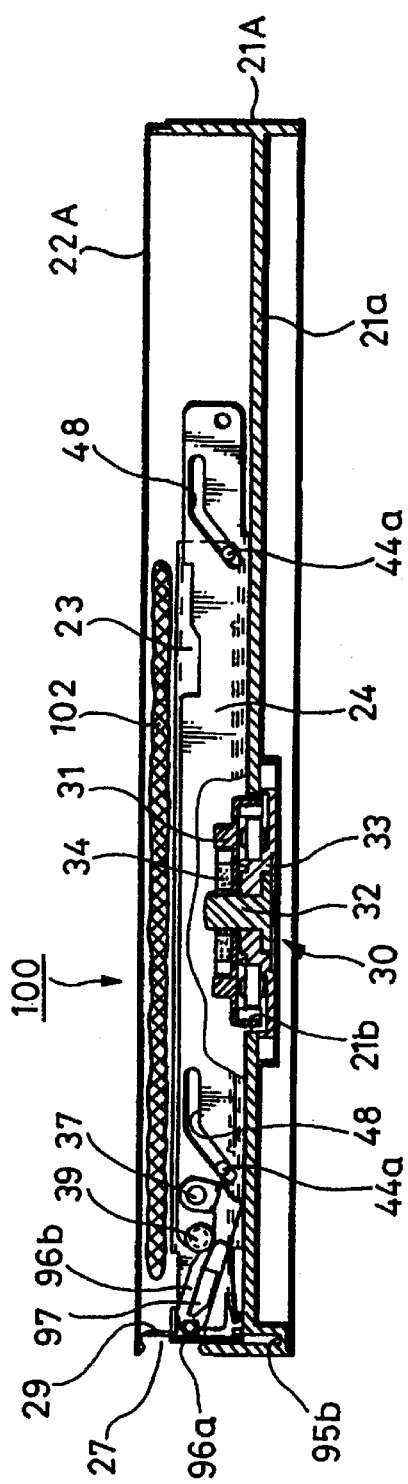
Figure 25A:
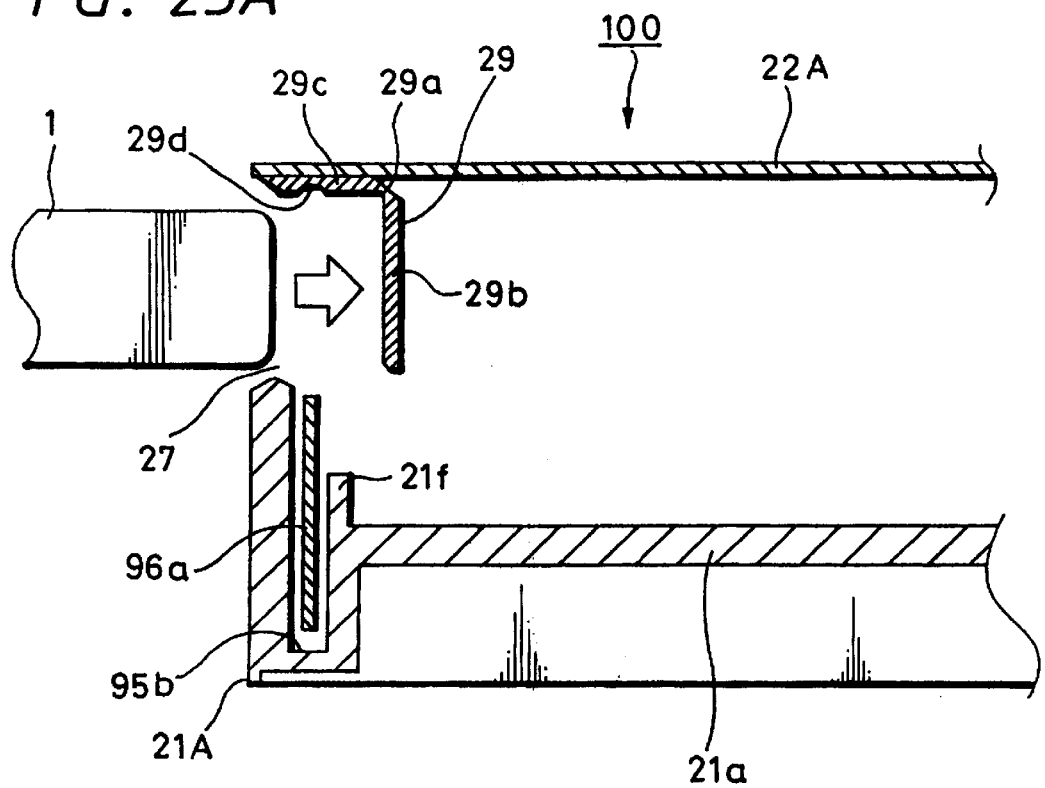
Figure 25B:
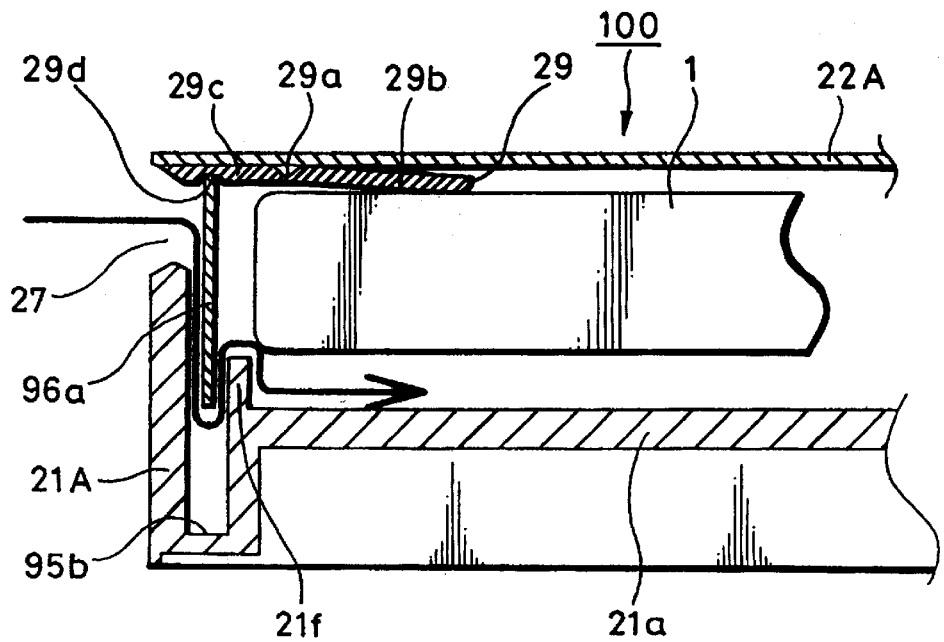

Also, FIGS. 23A, 23B to FIGS. 25A, 25B are diagrams showing a slot-in type removable disk recording and reproducing apparatus of the disk storage apparatus according to a second embodiment of the present invention. FIGS. 23A, 23B are schematic diagrams used to explain an operation of the slot-in type removable disk recording and reproducing apparatus. FIGS. 24A, 24B are cross-sectional views used to explain the states presented before and after the disk cartridge is loaded onto the disk storage apparatus. FIGS. 25A, 25B are cross-sectional views used to explain the labyrinth structure, respectively. Further, FIGS. 26A, 26B are schematic diagrams used to explain the operation of the pop-up type removable disk recording and reproducing apparatus of the disk storage apparatus according to a third embodiment of the present invention.

A pop-up slot type removable disk recording and reproducing apparatus 20 according to the first embodiment is applied to a so-called rewritable disk recording and reproducing apparatus for writing (recording) a new information signal in a hard disk (magnetic disk) HD, which is a specific example of a disk-like information recording medium, or reading (reproducing) an information signal previously recorded on the hard disk, and will be explain in the following sequential order.

[1] Arrangement of disk cartridge (FIGS. 15, 16)
[2] Outward appearance of disk recording and reproducing apparatus (FIGS. 4, 6)
[3] Inside arrangement of disk recording and reproducing apparatus
  (3-1) Rotation drive mechanism (FIG. 13)
  (3-2) Disk cartridge loading apparatus (FIGS. 6 to 11A, 11B, FIGS. 17 to 19A, 19B)
  (3-3) Shutter releasing mechanism (FIGS. 14, 16)
  (3-4) operation of disk recording and reproducing apparatus
[4] Operation of disk recording and reproducing apparatus
  (4-1) Outline of operation (FIGS. 5A, 5B)
  (4-2) State presented before the disk cartridge is loaded (FIGS. 4, 12, 13)
  (4-3) State presented when the disk cartridge is loaded (FIGS. 16 to FIGS. 19A, 19B)
  (4-4) Operation of cartridge holder (FIGS. 8A, 8B to FIGS. 11A, 11B)

[1] Arrangement of Disk Cartridge (FIGS. 15, 16)

As shown in FIGS. 15 and 16, a disk cartridge 1 comprises a disk housing 2 formed of a pair of upper half 2a and lower half 2b, a hard disk (magnetic disk) HD which shows a specific example of a disk-like information storage medium rotatably accommodated within a disk compartment 3 formed within this disk housing 2, a shutter member 4 rotatably housed within the disk compartment 3 and a shutter spring 5 for urging this shutter member 4 against the surface direction of the disk compartment 3 and spring-biasing the shutter member 4 in the direction to close a head insertion slot of the disk housing 2 under spring force. Then, under the condition that the hard disk HD is accommodated within the disk compartment 3, the opening surface sides of the upper half 2a and the lower half 2b are placed one after another and the contact surfaces are fused by a suitable means such as ultrasonic machining or bonded by an adhesive or the upper half 2a and the lower half 2b are fastened by a fixing means such as fixing screws, thereby resulting in the disk cartridge 1 being formed integrally.

The disk housing 2 of this disk cartridge 1 is made of a thin container which is substantially square as seen from the top. At both sides of the rear portion of this disk housing 2, there are provided a grip groove portion 2k held by a user to remove the disk cartridge 1 from the disk recording and reproducing apparatus and a grip recess 2c for changer grip. The grip recess 2c of this disk housing 2 plays a role for assuring the eject operation executed when the disk cartridge 1 is automatically ejected from the disk recording and reproducing apparatus by a cartridge changer apparatus.

At the front portion of the disk housing 2, i.e. at the front portion of the disk cartridge 1 and which serves as the insertion side to a cartridge insertion slot 27 of a disk recording and reproducing apparatus 20, an offset arcuate portion 6 by offsetting the center of the radius of curvature from a center line L of the insertion direction to one side (left-hand side as seen from the cartridge front side in FIG. 15). Thus, the length of one side surface 2d of the disk housing 2 is set to be shorter than that of the other side surface 2e. An oblong head insertion slot 7 which is elongated in the lateral direction is opened by cutting away the offset arcuate portion 6 on this short surface side 2d at the contact portions by a proper amount.

Into and/or from the head insertion slot 7, there are inserted and/or ejected a magnetic head which shows a specific example of an information storage head for writing a new information signal in an information recording portion of the hard disk HD accommodated within the disk housing 2 upon recording and reading an information signal previously-recorded on the information recording portion upon reproduction. As shown in FIG. 16, this head insertion slot 7 can be opened and closed by a shutter plate 4a of an arcuate shape provided at the tip end portion of the shutter member 4 housed within the disk compartment 3. This shutter member 4 includes, in addition to the shutter plate 4a, a core hole opening and closing plate 4b for opening and closing a center core 9 defined at approximately the central portion of the lower half 2b. The shutter plate 4a is integrally formed with one end of the core hole opening and closing plate 4b at a right angle.

A base end portion of the shutter member 4, i.e. the other end of the core opening and closing plate 4b is rotatably pivoted to a supporting point shaft 2f which is deviated from the center of the rear portion of the lower half 2b to the long side surface 2e side. When the shutter member 4 is rotated about this supporting point shaft 2f, the shutter plate 4a is moved along the inner surface of the offset arcuate portion 6 and the core hole opening and closing plate 4b is moved along the inner surface of the disk compartment 3. Then, when the shutter member 4 is placed on the short side surface 2d side, the shutter plate 4a closes the head insertion opening 7, and the core hole opening and closing plate 4b closes the center core hole 9. On the other hand, when the shutter member 4 is moved to the long surface 2e side, the shutter plate 4a opens the head insertion slot 7 and the core hole opening and closing plate 4b opens the center core hole 9. To this end, the core hole opening and closing plate 4b of the shutter member 4 has a shutter recess 4c which can completely open the center core hole 9 when the shutter is opened.

This shutter member 4 is constantly spring-biased in the direction for closing the head insertion slot 7 under spring force of a shutter spring 5 made of a torsion coil spring. In this shutter spring 5, its coil portion is loosely fitted into a supporting shaft 2g that is further displaced from the supporting point shaft 2f of the lower half 2b to the long side surface 2e side. A spring member 5a projected from one end of the coil portion of this shutter spring 5 is engaged with the inner surface of the lower half 2b, and a spring member 5b projected from the other end of the coil portion is engaged with a spring receiving member 4d formed near the base end portion of the core hole opening and closing plate 4b.

Further, the core hole opening and closing plate 4b of the shutter member 4b has provided thereon an operation arm 4e projected in an arcuate fashion to the opposite side of the shutter recess 4c. An operation pawl 4f is integrally formed with the tip end portion of the operation arm 4e. This operation pawl 4f has a stepped portion considering the thickness of the hard disk HD. By this stepped portion, the center of the operation pawl 4f is exposed from the bonded surface of the upper half 2a and the lower half 2b to the outside. Thus, the operation arm 4e of the shutter member 4 is penetrated into a recess 2I defined in an arcuate side wall 2h formed at the rear portion of the lower half 2b, The tip end portion of the operation pawl 4f coupled to the tip end of the operation arm 4e is exposed from the recess 2j defined in the bonded surface of the upper half 2a and the lower half 2b to the inside of a guide groove 10 elongated in the front and rear direction in the long side surface 2e of the disk housing 2.

This guide groove 10 comprises a wide portion 10a which A formed wide in the thickness direction (overlapping direction) set at the front side of the disk housing 2, a narrow portion 10b which is formed narrow in the thickness direction set in the rear side of the disk housing 2, an introducing portion 10c formed at the tip end of the wide portion 10a and which is wide and inwardly inclined and an opening and closing operation portion set between the rear portion of the wide portion 10a and the front portion of the narrow portion 10b. In the opening and closing operation portion 10d of this guide groove 10 from the wide portion 10a to the narrow portion 10b, inclined surfaces 10e are respectively formed on the upper half 2a and the lower half 2b. By the inclined surfaces 10e, a shutter opening lever action member, which will be described later on, is guided so that the action member can be smoothly moved from the wide portion 10a to the narrow portion 10b.

A depth of the narrow portion 10b of this guide groove 10 is sufficiently larger than that of the wide portion 10a, whereby the operation pawl 4f can be prevented from being disengaged considerably from the guide groove 10 to the outside under the condition that the shutter member 4 is opened completely. The side surface of the opening and closing operation portion 10d having such stepped portion is formed by a part of the above-mentioned arcuate side wall 2h, and its outer surface is smooth in an arcuate fashion. The operation pawl 4f of the above-mentioned shutter portion 4 is positioned on the narrow portion 10b of this guide groove 10, and only the tip end portion of the operation pawl 4f is constantly projected into the guide groove 10.

The hard disk HD which is rotatably accommodated within the disk compartment 3 of the disk housing 2 is comprised of a disk-like information recording medium whose upper and lower surfaces are formed as information storage surfaces of the magnetic recording system. This hard disk HD has at its center portion integrally fixed a center core 11 which is attracted by a magnet provided on the turntable of the spindle motor which shows a specific example of the rotation drive mechanism.

The center core 11 opposes the center core hole 9 defined in the lower half 2b. When the center core hole 9 is opened as the core hole opening and closing plate 4b is rotated, the center core 11 is brought in contact with a turntable integral type spindle motor inserted from the center core hole 9. The above-mentioned magnet is fitted into and integrally formed with the turntable of this spindle motor. By the attraction force of this magnet, the hard disk HD is chucked to the turntable, and rotated at a predetermined speed by the spindle motor.

Also, as shown in FIG. 16, on one side of the rear portion of the disk cartridge 1, there is provided a mis-erase preventing tab 13 for switching the existence of the write-inhibit hole. Near the mis-erase preventing tab 13 and near the shutter spring 5 placed at the opposite side, there are formed positioning holes 14a, 14b for properly positioning the disk cartridge 1 at the predetermined position of the disk recording and reproducing apparatus 20.

As the material of the upper half 2a and the lower half 2b thus arranged, there may be suitably used plastic materials such as a polycarbonate (PC). In addition, it is possible to use metals such as aluminum alloy or the like as well as the plastic material. Also, with respect to the material of the shutter member 4, there is used polycarbonate (PC) as the material of the shutter plate 4a, and a stainless steel plate is used as the core hole opening and closing plate. Thus, the shutter member 4 is integrally molded by molding the polycarbonate shutter plate 4a to the tip end portion of the stainless steel plate in a dichromatic molding fashion. However, the present invention is not limited thereto, and the whole of the shutter member 4 may be molded by plastic materials such as polycarbonate. Also, it is needless to say that the whole of the shutter member 4 may be made of metal such as a stainless steel plate.

[2] Outward Appearance of Disk Recording and Reproducing Apparatus (FIGS. 4, 6)

This disk recording and reproducing apparatus 20 is a pop-slot type removable disk storage apparatus in which the cartridge holder 23 with the disk cartridge 1 loaded thereon is moved in the vertical direction perpendicular to the horizontal direction to thereby lift up the disk cartridge 1 while the cartridge holder 23 is held in the horizontal state.

FIG. 4 show an outward of the whole of the apparatus, and FIG. 6 shows main assemblies in an exploded fashion. The storage apparatus body of the disk recording and reproducing apparatus 20 comprises a mechanical chassis 21 of the size large enough to incorporate a holder elevating mechanism, a rotation drive mechanism, a shutter opening mechanism and a recording and reproducing apparatus which will be described later on and of which the upper surface is opened, a top cover 22 serving as an outer cover for covering the upper surface opening portion of this mechanical chassis 21, a cartridge holder 23 fixed to the inside of the top cover 22 and a slide plate 24 slidably supported to the mechanical chassis 21.

As shown in FIG. 6, the mechanical chassis 21 is comprised of a square housing of a relatively shallow bottom in which space portions of proper size are formed in the upper and lower surfaces along a bottom plate 21a serving as an intermediate plate. The top cover 22 is disposed so as to cover the space of the upper surface of this mechanical chassis 21. The top cover 22 is comprised of a square lid material of a relatively low ceiling in which a space portion of a proper size is provided on the lower surface of the upper surface plate 22a. The upper surface plate 22a has defined therein a plurality of through-holes 26a and a plurality of tapped holes 26b.

When this top cover 22 is mounted on the cartridge holder 23 and fastened by a plurality of fixing screws 25, the top cover 22 is fixed to the cartridge holder 23 and thereby elevated and lowered in unison with the cartridge holder 23. The means for fixing the top cover 22, in addition to the above means, there can be applied a variety of fixing means such as fixing by pins and bonding by adhesive. At the central portion of the front surface of the top cover 22, there is defined an oblong opening window 27 a having a width a little larger than the width of the disk cartridge 1. This opening window 27 can be opened and closed by a movable door 36 which will be described later on.

[3] Inside Arrangement of Disk Recording and Reproducing Apparatus (3-1) Rotation Drive Mechanism (FIG. 13)

This disk recording and reproducing apparatus 20 includes a spindle motor 30 having an arrangement shown in FIG. 13 as a rotation drive mechanism. This spindle motor 30 is a turntable integral type motor in which a turntable 31 for chucking the hard disk HD of the disk cartridge 1 is integrally provided with the rotary shaft 32.

This spindle motor30 is fitted into a through-hole 21b bored through the front and rear surfaces of the bottom plate 21 at substantially the central portion of the front side of the mechanical chassis 21. The spindle motor 30 includes a disk-like base member 33 fixed to the rear surface of the bottom plate 21a of the mechanical chassis 21 by a fixing means such as screws. The rotary shaft 32 rotatably supported to the base member 33 is upwardly penetrated into the through-hole 21b and projected in the upper portion of the bottom plate 21a. The turntable 31 fixed to this rotary shaft 32 also is penetrated through the through-hole 21b and is similarly projected in the upper direction of the bottom plate 21a.

To the turntable 31 of this spindle motor 30, there is attached a magnet 34 which attracts the center core 11 of the hard disk HD. When the magnetic force of the magnet 34 attracts the center core 11 to chuck the hard disk HD to the turntable 31, the hard disk HD is provided integrally with the spindle motor 30 and thereby rotated at a predetermined velocity within the storage apparatus body.

(3-2) Disk Cartridge Loading Apparatus (FIG. 6 to FIGS. 11A, 11B, FIG. 17 to FIGS. 19A, 19B)

As shown in FIG. 6 or the like, a holder elevating mechanism 40 of this disk cartridge loading apparatus comprises a cartridge holder 23 into which the disk cartridge 1 can be detachably inserted, a slide plate 24 supported to the mechanical chassis 21 so as to become slidable in the front and rear direction and a movable door 36 for opening and closing the opening window 27 in unison with the operation of this slide plate 24.

As shown in FIGS. 6, 8A, 8B and 10A, 10B, the cartridge holder 23 comprises a square upper plate 23a smaller than the mechanical chassis 21 as seen from the top, side surface plates 23b, 23c coupled to the upper surface plate 23a in the right and left directions and supporting members 23d, 23e bent inwardly in succession to each lower portion of the two side surface plates 23b, 23c. A cartridge insertion slot 28 is set in the front portion of the space portion surrounded by the above-mentioned elements. Accordingly, the inside of the cartridge holder 23 is set to be the space portion of the size matched with the disk cartridge 1, and the disk cartridge 1 can be inserted and ejected from the cartridge insertion slot 28. Then, under the condition that the cartridge holder 23 is holding the disk cartridge 1, the disk cartridge 23 is loaded onto the turntable 31 disposed at the cartridge loading portion.

Further, to the two side portions of the cartridge holder 23, there are attached press leaf springs 42a, 42b which are slightly deviated to the upper portion of holding members 23d, 23e. The press leaf springs 42a, 42b urge the inserted disk cartridge 1 against the holding plates 23d, 23e, thereby positioning the disk cartridge 1 relative to the cartridge holder 23 in the height direction. At the front and rear portions and the central portion of the press leaf springs 42a, 42b of the upper surface plate 23a, there are provided a plurality of inspection holes 43a, 43b which enable the user to visually confirm the inside.

At the front and rear portions of the left and right side surface plates 23b, 23c of the cartridge holder 23, there are provided guide pins 44a, 44b which are projected in the lateral direction. These guide pins 44a, 44b are slidably engaged with vertical grooves 45, 45 which are provided in the left and right side surface plates 21c, 21d of the mechanical chassis 21 and which are vertically elongated in the upper and lower direction, respectively.

As shown in FIG. 6, FIGS. 17 to 19A, 19B, the slide plate 24 includes a lower surface plate 24a of approximately square slightly larger than the cartridge holder 23 as seen from the top and side surface plates 24b, 24c continuously raised at both left and right sides of this lower surface plate 24a. On the lower surface plate 24a of this slide plate 24, there is formed a swollen portion 24d by swelling the inside of the width direction into the upper direction by a predetermined width. Thus, a plate accommodating portion having a predetermined clearance is set under the swollen portion 24d. Further, on the four corners of the lower surface plate 24a, there are respectively formed oblong apertures 46 which are extended in the front and rear direction. Four shaft pins 47 attached to the mechanical chassis 21 are slidably engaged into the respective oblong apertures 46. These shaft pins 47 restrict the slide plate 24 from being moved in the left and right direction with respect to the mechanical chassis 21 so that the slide plate 24 is supported so as to become movable only in the front and rear direction.

On the front and rear of the left and right side surface plates 24b, 24c of this slide plate 24, there are formed cam oblong apertures 48 in an opposing relation to the guide pins 44a, 44b of the cartridge holder 23. The cam oblong aperture 48 comprises a forward-descending inclined portion 48a set at the cartridge insertion slot 28 side and a horizontal portion 48b horizontally extended from the upper portion of this inclined portion 48a to the rearward. The guide pins 44a, 44b penetrate these cam oblong apertures 48 to enable the tip end portions of the respective guide pins 44a, 44b to be engaged with the vertical grooves 45, 45 as described above.

The cam oblong apertures 48, the vertical grooves 45 and the guide pins 44 constitute direction conversion mechanisms. Through the holder elevating mechanism comprised of the four direction conversion mechanisms, the cartridge holder 23 is supported to the slide plate 24 in such a manner that the cartridge holder 23 can be elevated and lowered. When this slide plate 24 is moved in the front and rear direction, the holder elevating mechanism is energized so that the cartridge holder 23 can be elevated and lowered in the vertical direction perpendicular to the horizontal direction under the condition that the cartridge holder 23 is maintained in substantially the horizontal state.

As shown in FIGS. 17 to FIGS. 19A, 19B, at the rear end portions of the left and right side surface plates 24b, 24c of the slide plate 24, there are respectively engaged one ends of a coil spring 41 which shows a specific example of a resilient material. The other ends of the coil spring 41 are respectively engaged with the left and right spring reception pins 49 erected on the mechanical chassis 21. Under spring force of the coil springs 41, 41, the slide plate 24 is constantly spring-biased in the opposite side of the cartridge insertion slot 28.

In the swollen portion 24d of the slide plate 24 slidably supported to the mechanical chassis 21, there are formed a central opening portion into which the upper portion of the spindle motor 30 is penetrated and a cam aperture 51 disposed at the rear portion of the central opening portion 50 in the oblique direction. The cam aperture 51 is formed of an L-like opening portion extended in the front and rear direction, and by using the convex corner portion as the cam in the inside, a stopper portion 51a is formed at the lateral edge which forms one side of the cam. An inclined cam portion 51b is formed on the longitudinal edge extended in the direction crossing the stopper portion 51a. The inclined cam portion 51b of the cam aperture 51 is formed as the inclined surface which results from widening the stopper portion 51a. Accordingly, the corner portion is set at an angle slightly larger than 90 degrees.

As shown in FIGS. 17 and 18, a cam pin 52 erected on the trigger plate 52 is selectively brought in contact with the stopper portion 51a or the inclined cam portion 51b of the cam aperture 51 of this slide plate 24. The trigger plate 52 with the cam pin 53 provided thereon is accommodated within the plate accommodating portion 24e of the slide plate 24 and is rotatably supported to the mechanical chassis 21 by the supporting shaft 54. Then, the rotation amount of the trigger plate 52 is restricted by a stopper pin 55 similarly fixed to the mechanical chassis 21.

Specifically, the trigger plate 52 has an arcuate hole 56 of an arch shape which can be rotated about the supporting shaft 54, and the stopper pin 55 is slidably engaged into this arcuate hole 56. Accordingly, the trigger plate 52 can be rotated within a range in which the stopper pin 55 is moved within the arcuate hole 56. Then, one end of the trigger plate 52 is engaged with the tip end portion of the free end and the other end thereof is constantly spring-biased in the direction approaching the central opening portion 50 by a return spring 57 engaged with the slide plate 24.

Further, on the trigger plate 52, there are integrally provided an operation pin 58 protruded toward the cartridge holder 23 in the tip end portion on the free end side and a trigger pin 59 set in the inside of the radius direction from the arcuate hole 56 and which is projected toward the opposite side of the operation pin 58. One operation pin 58 is projected into the space portion surrounded by the upper surface plate 23a of the cartridge holder 23 or the like and is placed on the movement locus of the disc cartridge 1. Also, the other trigger pin 59 is slidably engaged with a trigger groove 60 of an arcuate shape defined in the mechanical chassis 21, and the tip end portion thereof is inserted into the cam aperture of a mode cam 64. Accordingly, a rotation amount of the trigger plate 52c comprised of a combination of the trigger groove 60 and the trigger pin 59 and a rotation amount of the trigger plate 52 comprised of a combination of the arcuate hole 56 and the supporting shaft 54 are equal to each other.

Also, the slide plate 24 has a cam lock pin 61 integrally erected therewith so as to be protruded in the same direction as that of the trigger pin 59. This cam lock pin 61 is slidably engaged with a lock groove 62 of a rectilinear shape similarly defined in the mechanical chassis 21, and the tip end portion thereof is inserted into a cam concave portion of a mode cam 64. As shown in FIG. 13, the mode cam 64 is provided on the rear surface side of the bottom plate 21a of the mechanical chassis 21, and is rotatably supported to a rotary shaft 65 fixed to the bottom plate 21a by a fixing means such as caulking. Then, the mode can 64 can be prevented from being disengaged by a retaining ring or the like engaged to the free end side of the rotary shaft 65.

This mode cam 64 comprises a gear portion 64a formed of a spur gear in which a large number of teeth are formed over the whole of the outer peripheral surface and a disk-like cam portion 64b integrally formed on one surface side of the gear portion 64a. The mode cam 64 can be freely rotated about a rotary shaft 65 inserted into a through-hole defined at the central portion. The outer circumference surface of the cam portion 64b of this mode cam 64 forms the outer circumference cam surface, and a lock releasing cam recess portion which becomes concaved in the inside of the radius direction is formed on a part of the outer circumference cam surface.

Further, at the end face of the cam portion 64, there is formed a cam concave portion 67 which is opened in the end face side. The above-mentioned trigger pin 59 and the cam lock pin 61 are inserted into the cam concave portion 67. Owing to the cam shape of the cam concave portion 67, the trigger pin 59 is guided and moved by the trigger groove 60 in response to the rotation of the mode cam 64 so that the cam lock pin 61 is guided and moved by the lock groove 62. As the material of this mode cam 64, engineering plastics such as polycarbonate (PC) having a high mechanical strength should be preferably used but aluminum alloy and other metal materials also can be used.

As shown in FIG. 6, a movable door 36 is disposed in the inside of the front surface plate 21e of the mechanical chassis 21. This movable door 36 is rotatably supported to the mechanical chassis 21. FIG. 7A shows the first embodiment of this movable door 36. As shown in FIG.7A, this movable door 36 comprises a door body 36a which is extended in the lateral direction in which the opening window 27 of the storage apparatus body is opened and closed and a pair of left and right arm members integrally formed from respective ends of the longitudinal direction of the door body 36a.

The pair of arm members 36b are parallelly extended in the direction crossing the direction in which the door body 36a is extended at approximately right angle. Bearing members 36c, 36c are formed on the tip end portions of the arm members 36b. The bearing members 36c are projected from the arm members 36b by stepped portions 36d to the outside and are made parallel to each other. The stepped portion 36b sets a predetermined clearance E (see FIGS. 9A and 11A) between the arm members 36b and the respective side surface plates 21c, 21d of the mechanical chassis 21. A rotary shaft portion 37a of the supporting shaft 37 is rotatably fitted into the hole of the bearing member 36c. When a fixed shaft portion of a small diameter elongated from one side of the rotary shaft portion 37a is fitted into each of the side surface plates 21c, 21d of the mechanical chassis 21 with pressure and thereby fixed, the movable door 36 is supported to the mechanical chassis 21 so as to become rotatable in the upper and lower direction.

On the upper edge of each arm member 36b of this movable door 36, there is formed an end edge cam 38 which can elevate and lower the door body 36a. This end edge cam 38 is shaped like a mountain in which an intermediate portion is held at a middle height. A front cam portion 38a, which is close to the door body 36a, is set to be maintained in substantially the horizontal state under the condition that the opening window 27 is opened. A rear cam portion 38b is receded in the rearward. Angle restriction pins 39 attached to the front end portions of the two side surface plates 24b, 24c of the slide plate 24 are slidably contacted with the left and right end edge cams 38.

The angle restriction pin 39 comprises a cam shaft portion 39a which contacts with the end edge cam 38, a fixed shaft portion 39 of a small diameter elongated from one end of the cam shaft portion 39a and a pin head portion 39c of a large diameter elongated from the other end of the cam shaft portion 39a. Then, when the fixed shaft portions 39b are fixed to the side surface plates 24b, 24c by a fixing means such as caulking, the angle restriction pins 39 are attached to the slide plate 24. Incidentally, the pin head portion 39c is used to prevent the arm member 36b from being disengaged.

Further, the end edge cam 38 is constantly urged against the cam shaft portion 39a under spring force of a torsion coil spring 94 which shows a specific example of a resilient member interposed between the mechanical chassis 21 and each arm member 36b. A spring member 94a elongated from one end of the coil portion of the torsion coil spring 94 is engaged with the spring receiving member 36e provided in the arm member 36b, and a spring member 94b elongated from the other end of the coil portion is engaged with the mechanical chassis 21.

Thus, as shown in FIGS. 8A, 8B and FIGS. 9A, 9B, when the slide plate 24 is placed at the withdrawn position, the angle restriction pin 39 is opposed to the rear cam portion 38b of the end edge cam 38, and this rear cam portion 38b is upwardly urged against the cam shaft portion 39a under spring force of a coil spring 94. At that time, the door body 36a placed at the front portion of the pair of arm members 36b is elevated in the upper direction and projected onto the movement locus of the disk cartridge 1, whereby the opening window 27 at the front surface of the recording apparatus body is closed by the movable door 36.

On the other hand, as shown in FIGS. 10A, 10B and FIGS. 11A, 11B, when the slide plate 24 is moved forward and moved at the front position, the pair of angle restriction pins 39 press the end edge cam 38 downwardly against the spring force of the torsion coil spring 94 so that the door body 36a is lowered. As a consequence, the door body 36a is moved from the movement locus of the disk cartridge 1 to the outside of the movement locus, whereby the door body 36a is accommodated within the door accommodating portion 95 provided at the inside of the front surface plate 21e of the mechanical chassis 21. Thus, the opening window 27 defined at the front surface of the recording apparatus body is opened.

As other embodiment of the movable door, there can be used the arrangement shown in FIG. 7B, for example. In this movable door 96, a door body 96a and a pair of supporting arms 96b, 96c are individually made of independent members, and the door body 96a are rotatably supported by a pair of supporting arms 96b, 96c.

A pair of receiving members 96d, 96e which are projected in the rear direction are provided on both ends of the door body 96a. A bearing aperture is defined in one receiving member 96d and a pivot 96f is formed on the other receiving member 96e. On the other hand, the pair of supporting members 96b, 96c are arranged substantially similarly to the arm members 36b of the above-mentioned embodiment and a connected portion to the door body 36a is shaped as a peak portion by cutting. In addition, a pivot 96g which is fitted into the bearing aperture is formed on the tip end portion of one supporting arm 96b, and a bearing portion which is fitted into the pivot 96f is formed at the tip end portion of the other supporting arm 96c.

Then, under the condition that the pivots 96f, 96g are fitted into the respective bearing apertures, when the tip ends of the pivots 96f, 96g are caulked, the door body 36a and the respective supporting arms 96b, 96c are coupled so as to become freely rotatable. A rest of the arrangement of these support arms 96b, 96c is similar to that of the above-mentioned arm member 37b. There are formed the bearing member 36c, the stepped portion 36d and the spring receiving member 36e, and end edge cam 38 is provided on the upper end edge. A plate metal such as a stainless steel plate is suitable as the material of the movable doors 36, 96 but there can be used other materials such as engineering plastics.

Incidentally, as the material of the mechanical chassis 21, there can be used a metal material such as aluminum alloy and stainless steel plate. Also, it is possible to use engineering plastic such as polycarbonate having a high mechanical strength. Further, as the materials of the cartridge holder 23, the slide plate 24 and the trigger plate 52, there may be suitably used metal plate materials such as galvanized sheet iron and stainless steel plate. Also, it is possible to use engineering plastic or the like.

(3-3) Shutter Opening Mechanism (FIGS. 14 and 16)

This shutter opening mechanism 77 is adapted to open the head insertion slot 7 of the disk cartridge 1 loaded onto the cartridge holder 23 by using the disk housing 2 as the trigger. As shown in FIG. 16, this shutter opening mechanism 77 is disposed on one side surface plate 23b of the cartridge holder 23.

As shown in FIG. 14, this shutter opening mechanism 77 comprises a shutter opening lever 78 formed of a ceiling-like arm member and a coil spring 79 for spring-biasing the shutter opening lever 78. The shutter opening lever 78 comprises a lever body 78a having a C-shaped cross-section, an input member 78b serving as a copying end projected from respective side portions of the lever body 78a so as to be spaced apart from each other in the lateral direction and an action member 78c serving as an action end. The input member 78b has on its tip end portion provided a contact portion 78d which is projected on the movement locus of the disk cartridge 1.

In order to attach the shutter opening lever 78 to the cartridge holder 23, a pair of pin supporting members 72a, 72b are formed on the side surface plate 23b of the cartridge holder 23 by folding a part of the front and rear opening portions 35a, 35b in the upper and lower direction. A lever 78a of the shutter opening lever 78 is interposed between these pin supporting members 72a, 72b. When a shaft pin 73 having a head portion at one end is inserted into pin holes defined in the pin supporting members 72a, 72b and a pin hole defined in the lever body 78a and the other end of the shaft pin 73 is caulked, the shutter opening lever 78 is supported to one side of the cartridge holder 23 in such a manner that it can swing in the horizontal direction.

Under this state, the input member 78b of the shutter opening lever 78 is opposed to the rear opening portion 35b of the cartridge holder 23 and the action member 78c is opposed to the front opening portion 35a. A coil portion of a coil spring 79 is loosely fitted into the shaft pin 73 for pivoting this shutter opening lever 78 to the cartridge holder 23, and a spring member 79a elongated from one end of this coil portion is engaged with the side surface plate 23b, and a spring member 79b elongated from the other end of the coil portion is engaged with the lever body 78a. Under spring force of this coil spring 79, the input member 78b of the shutter opening lever 78 is spring-biased in the direction entering the opening portion 35b, and the action member 78c is spring-biased in the direction disengaging from the opening portion 35a as a reaction.

As shown in FIG. 14, on the inner surface of the lever body 78a which limits the rotation amount of the shutter opening lever 78 are set an input side stopper portion 78e which prevents the input member 78b from entering the opening portion 35b by an amount greater than a predetermined amount and an action side stopper portion 78f which prevents the action member 78c from entering the opening portion 35a by an amount greater than a predetermined amount. The input member 78b of the shutter opening lever 78 enters into the wide portion 10a through the introducing portion 10c of the guide groove 10 of the disk cartridge 1, and also the action member 78c enters into the narrow portion 10b through the operation portion 10d of the guide groove 10.

The function of the input member 78b of the shutter opening lever 78 is not limited to the input portion of the operation force but covers the positioning action for positioning the disk cartridge 1 in the horizontal direction. Therefore, the input member 78b of the shutter opening lever 78 is required to have a proper resiliency while a rigidity of a certain amount is maintained. Accordingly, in this embodiment, the input member 78 is formed wide in the width direction of the guide groove 10, and the contact portion 78d is formed by bending the tip end portion in the depth direction of the guide groove 10. Accordingly, the rigidity of the width direction (groove width direction) of the guide groove 10 of the input member 78b is set to be higher than that of the depth direction (groove depth direction) of the guide groove 10 perpendicular thereto. Thus, the input member 78b is made difficult to be deformed in the groove width direction.

On the other hand, since the function of the action member 78c of the shutter opening lever 78 mainly lies in pressing the operation pawl 4f of the shutter member 4, according to this embodiment, the rigidity of the horizontal direction is increased by being the guide groove 10 in the depth direction from the portion near the lever body 78a. Accordingly, since the rigidity of the groove width direction of the action member 78c is lower than that of the groove depth direction, the action member 78c is arranged to be easily deformed with a resilient force with respect to the groove width direction and can follow the fluctuations of the disk cartridge 1 held on the cartridge holder 23 in the upper and lower direction.

A mis-insertion preventing convex portion 74 for preventing the mis-insertion of the disk cartridge 1 is provided on the rear sides of pin supporting members 72a, 72b at the side surface plate 23b of the shutter opening mechanism 77 side of the cartridge holder 23. This mis-insertion preventing convex portion 74 is formed by cylindrically projecting a part of the side surface plate 23b into the inside. This mis-insertion preventing convex portion 74 is opposed to the guide groove 10 of the disk cartridge 1. Thus, only when the guide groove 10 is correctly inserted into this mis-insertion preventing convex portion 74, the disk cartridge 1 can be inserted completely. On the other hand, when they do not agree with each other, the insertion of the disk cartridge 1 is prevented, whereby it is possible to determine whether or not the inserted state of the disk cartridge is approval.

Stopper members 75a, 75b are provided on the rear end portions of the two side surface plates 23b, 23c of the cartridge holder 23 by bending a part thereof into the inside. These stopper members 75a, 75b are used to prevent the disk cartridge from being inserted more than a predetermined insertion amount.

Thus, the operation pawl 4f of the shutter member 4 is positioned at the narrow portion 10b of the guide groove 10 of the disk cartridge 1 and the operation pawl 4f is pressed by the action member 78c of the shutter opening lever 78, whereby the shutter member 4 is rotated against the spring force of the shutter spring 5 to open both the head insertion slot 7 and the center core hole 9.

(3-4) Recording and Reproducing Apparatus (FIGS. 12, 17)

As shown in FIGS. 12 and 17, this recording and reproducing apparatus 80 is disposed at the rear portion of the mechanical chassis 21, and comprises a dogleg-type rotary actuator 81 serving as the rotary supporting member, a pair of upper and lower sliders attached to the tip end portion of the rotary actuator 81 in such a manner that they can be floated and an actuator supporting base 83 for rotatably supporting the rotary actuator 81. The actuator supporting base 83 is mounted on the mechanical chassis 21 and fastened thereto by a fixing means such as attachment screws.

The rotary actuator 81 comprises a rotary arm 81*a* rotatably supported to the actuator supporting base 83 fixed to the mechanical chassis 21, a drive coil 81*b* fixed to one end of the rotary arm 81*a*, a pair of mount plates 81*c* fixed to the other end and a pair of suspensions 81*d* fixed to this mount plate 81*c*. The rotary arm 81*a* of this rotary actuator 81 is rotatably supported to the actuator supporting base 83 through a bearing 81*e*, and a fan-like drive coil 81*b* in which copper wires are wound around is engaged and held at a forked portion formed on one side of the rotary arm 81*a*.

Stepped portions are formed on upper and lower surfaces of the opposite side of the forked portion of the rotary arm 81*a*. When the base end portion of the mount plate 81*c* is fitted into the stepped portion and this base end portion is fixed by spot welding or a fixing means such as caulking or adhesive, a pair of mount plates 81*c* are opposed to each other with a predetermined clearance in the upper and lower direction. The base end portions of the suspension 81*d* are fixed to the inner surfaces of the tip end portions of these mount plates 81*c* by spot welding or a fixing means such as caulking or adhesive, and sliders 82 are respectively attached to the tip end portions of the suspensions 81*d*. As described above, the whole shape of the rotary actuator 81 is shaped as an L-letter as seen from the top and shaped as so-called dogleg by coupling the rotary arm 81*a* disposed in an L-shape and the suspensions 81*d* with the mount plate 81*c*.

The pair of suspensions 8*d* are formed of plate-spring member having a resilience, and a rigidity of the base end portion is set to be low by lowering the rigidity with the opening formed at the center of the base end portion side. When the rigidity of the base end portion of the suspension 81*d* is lowered and a large flexibility is given to the tip end side, the slider 82 attached to the tip end portion can easily be deformed with a flexibility in the upper and lower direction so as to become erected. Between the upper and lower suspensions 81*d*, there is inserted a lamp 84 upon loading and unloading. By this lamp 84, the tip end side of the two suspensions 81*d* are spaced apart from each other in the upper and lower direction so that the upper and lower sliders may be prevented from contacting with upper and lower surfaces of the hard disk HD. Then, at the respective tip end portions of the pair of sliders 82, there are vertically opposed recording and reproducing magnetic heads which show a specific example of the information storage head.

Also, the lamp 84 is disposed near the tip end portion of the rotary actuator 81 on the depth of the mechanical chassis 21. This lamp 84 comprises a lamp arm 84*a* inserted between the upper and lower sliders 82 and a pressing portion 84*b* for pressing the rear surface side of the rotary arm 81*a* to thereby move the slider 82 toward the cartridge side. Further, a pair of linear guide shafts 85, 85 which are made parallel to each other are inserted into the lamp 84 so as to become slidable.

The respective front and rear end portions of the pair of linear guide shafts 85, 85 are supported and fixed by the shaft supporting members 85*a* and thereby supported to the respective ends of the mechanical chassis 21. Accordingly, since the lamp 84 can be advance and withdrawn between the front and rear shaft supporting members 85*a*, 85*a*, the lamp arm 84*a* is disposed above the two linear guide shafts 85, 85. This lamp 84 is constantly spring-biased to the spindle motor 30 side by the coil spring 86 serving as the spring-biasing member. The advance of the lamp arm 84*a* under spring force of the coil spring 86 is restricted by a stopper pin (not shown disposed between the linear guide shafts 85 and which is fixed to the mechanical chassis 21.

Also, at the intermediate portion of the rotary arm 81*a* of the rotary actuator 81, there is attached a flexible printed circuit board 87 so as to cover the upper surface thereof. This flexible printed circuit board 87 is connected through a flexible cable portion 87*a* to a connection instrument fixed to the rear surface of the main wiring base plate. Although not shown, a predetermined wiring pattern is printed on the main wiring base plate by conductors, and this wiring pattern is connected with a microcomputers, Ics, resistors, amplifiers and other electronic assemblies, thereby resulting in an electronic circuit being formed. Thus, there is constructed a control device for controlling the driving of the disk recording and reproducing apparatus.

A flat magnet 89 curved in an arcuate-fashion so as to upwardly oppose the drive coil 81*b* is mounted and fixed to the actuator supporting mount 83. This magnet 89 is magnetized by N poles and S poles in the surface direction (e.g. the side close to the spindle motor 30 is assumed to be S pole and the side distant from the spindle motor 30 is assumed to be N pole). This magnet 89 and the drive coil 81*b* constitute a voice coil motor.

By adjusting the magnitude of a magnetic force acting on the drive coil 81*b* and the magnet 89, the rotation position of the rotary actuator 81 can be automatically controlled within a predetermined area. Then, outside the automatic control area, the voice coil motor of the rotary actuator 81 does not generate a torque and the rotary actuator 81 is rotated by the above-mentioned mode cam 64 and then locked at a predetermined rotation position.

Also, as shown in FIG. 12, a pair of positioning pins 92, 92 for the disk cartridge 1 are provided at the respective front side portions of the mechanical chassis 21. The positioning pins 92 are used to determine the position of the disk cartridge 1 in the height direction, the front and rear direction and in the left and right direction. A pair of positioning holes 14*a*, 14*b* defined in the disk cartridge 1 are fitted into the two positioning pins 92, whereby the position of the disk cartridge 1 relative to the rotary actuator 81 or the like can be determined. Further, a cartridge detection sensor 94 for detecting whether or not the disk cartridge 1 is loaded is disposed between the left and right positioning pins 92. It is determined based on the detection signal outputted from this cartridge detection sensor 93 whether or not the disk cartridge 1 is loaded onto the disk cartridge loading portion.

The disk recording and reproducing apparatus 20 thus arranged can be constructed by assembling and integrating the spindle motor 30 serving as the rotation drive mechanism, the holder elevating mechanism 40, the shutter opening mechanism 77 and the recording and reproducing apparatus 80 or the like to the storage apparatus body.

Initially, the spindle motor 30 is fixed to the mechanical chassis 21 by inserting the turntable 31 into the through-hole 21*b* of the mechanical chassis 21 from the rear surface of the bottom plate 21*a*. To the rear surface of the bottom plate 21*a*, there are attached the mode cam 64 and a cam drive mechanism for driving the mode cam 64. The rotary actuator 81 and the lamp 84 of the recording and reproducing apparatus 80 are attached to the upper surface of the bottom plate 21*a*, and further the trigger plate 53 is attached to the mechanical chassis 21 by the supporting shaft 54.

Then, the shutter opening lever 78 of the shutter opening mechanism 77 is attached to the cartridge holder 23. Then, as shown in FIG. 16, the cartridge holder 23 is disposed on the inside of the slide plate 25, and the four guide pins 44*a*, 44*b* protruded at the four corners are slidably fitted into the cam oblong apertures 48 of the slide plate 24. Thus, there is arranged a holder assembly material in which the cartridge holder 23 and the slide plate 24 can be relatively moved within the range of the cam oblong apertures 48.

Then, this holder assembly material is fitted into the mechanical chassis 21, the four guide pins 44a, 44b are respectively engaged into the vertical grooves 45 defined in the side surface plates 21c, 21d, the shaft pins 47 are respectively inserted into the oblong apertures 46 defined at the four corners of the slide plate 24, and the tip end portions are screwed into the tapped holes of the bottom plate 21a, thereby resulting in the holder assembly material being assembled to the mechanical chassis 21. Then, the cam pins 53 are fitted into the cam apertures 51 of the slide plate 24 and the return spring 57 is extended between the slide plate 24 and the trigger plate 52, thereby resulting in the trigger plate 52 being spring-biased to the spindle motor 30 side under spring force of the return spring 57. Further, a pair of coil springs 41, 41 are extended between the mechanical chassis 21 and the slide plate 24, whereby the slide plate 24 is spring-biased toward the rotary actuator 81 side under spring force of the coil springs 41, 41.

Thus, the slide plate 24 is supported to the mechanical chassis 21 so as to become slidable in the front and rear direction. Also, the cartridge holder 23 is supported to the slide plate 24 so as to be elevated and lowered in the upper and lower direction. Accordingly, the cartridge holder 23 can be moved in the upper and lower direction relative to the mechanical chassis 21 through the slide plate 24. Thus, the cartridge holder 23 can be elevated and lowered in the vertical direction perpendicular to the horizontal direction as the slide plate 24 is moved forward and backward under the condition that it is maintained in substantially the horizontal state.

Thereafter, the top cover 22 is attached to the upper surface of the cartridge holder 23, whereby the pop-slot type removable disk recording and reproducing apparatus 20 according to this embodiment can be arranged.

[4] Operation of the Disk Recording and Reproducing Apparatus

FIG. 5A shows the schematic arrangement presented before the disk cartridge 1 is loaded. FIG. 5B shows the schematic arrangement presented after the disk cartridge 1 is loaded. As shown in FIG. 5A, before the disk cartridge 1 is loaded, the upper portion of the cartridge holder 23 to which the top cover 22 is attached is upwardly projected from the upper surface of the mechanical chassis 21 by approximately the half thereof. Under this state, the movable door 36 is downwardly moved from the movement locus of the disk cartridge 1 to the outside of the movement locus so that both of the opening window 27 defined at the front surface of the storage apparatus body and the cartridge insertion slot 28 of the cartridge holder 23 are opened.

At that time, assuming that T1 is the thickness of the storage apparatus body presented after the disk cartridge 1 is loaded, T2 is the thickness of the storage apparatus body presented when the disk cartridge 2 is inserted and ejected and that T3 is the thickness of the disk cartridge 1, then the following relation is established among these thicknesses T1, T2 and T3:

$$T2-T1<T3$$

On the other hand, as shown in FIG. 5B, after the disk cartridge 1 is loaded, the cartridge holder 23 is completely inserted into the mechanical chassis 1 and the opening portion of the upper surface of the mechanical chassis 21 is closed by the top cover 22, and hence the thickness of the storage apparatus body becomes T1. In this state, the movable door 36 is moved from the outside of the movement locus of the disk cartridge 1 to the movement locus so that the opening window 27 of the storage apparatus body and the cartridge insertion slot 28 of the cartridge holder 23 are both closed.

(4-2) State Presented Before the Disk Cartridge is Loaded

As shown in FIGS. 4, 12 and 13, before the disk cartridge 1 is loaded on the disk recording and reproducing apparatus 20, the cartridge holder 23 is elevated in its horizontal state, and the top cover 22 fixed to the upper surface of the cartridge holder 23 also is elevated similarly. At that time, the opening window 27 is defined in the front surface of the top cover 22, and the cartridge insertion slot 28 of the cartridge holder 23 is coincident with the opening window 27 in the horizontal direction.

Further, since the slide plate 24 is moved toward the cartridge insertion slot 28 side against the spring force of the coil spring 41, the left and right angle restriction pins 39 are also moved to the front cam portions 38a of the end edge cams 38 to thereby downwardly press the left and right arm members 36b against the spring force of the torsion coil spring 94. Therefore, the door body 36a is moved to the outside of the movement locus of the disk cartridge 1 and the opening window 27 and the cartridge insertion slot 28 are both opened, thereby making it possible to insert the disk cartridge 1.

At that time, since the cartridge holder 23 to which the top cover 22 is attached is upwardly projected from the upper surface of the mechanical chassis 2 by approximately the half thereof, as compared with the prior-art pop-slot type disk recording and reproducing apparatus 220 shown in FIGS. 3A, 3B, the thickness of the storage apparatus body presented when the disk cartridge 1 is inserted (or ejected) can be reduced, and hence the thickness of the whole of the disk recording and reproducing apparatus can be reduced.

Incidentally, the trigger plate 52 is spring-biased to the spindle motor 30 side under spring force of the return spring 57. Further, the rotary actuator 81 is placed at the withdrawn position in such a manner that the slider 82 becomes distant from the spindle motor 30.

(4-3) State Presented When the Disk Cartridge is Loaded

When the disk cartridge 1 is loaded, as shown in FIGS. 16 to 19A, 19B, the disk cartridge 1 is inserted into the cartridge insertion slot 28 of the cartridge holder 23 through the opening window 27 from the offset arcuate portion 6 side. At that time, as shown in FIG. 16, in the shutter opening lever 78 of the shutter opening mechanism 77 provided on the side surface portion of the cartridge holder 23, the tip end portion of the input member 78b is largely inserted into the opening portion 35b under spring force of the coil spring 79, and the action member 78c is slightly inserted into the opening portion 35b as its reaction. Then, the contact portion 78d formed at the tip end of the input member 78b of the shutter opening lever 78 is positioned at the front of the movement locus of the guide groove 10 defined at the side surface portion of the cartridge holder 23.

In this state, when the disk cartridge 1 is inserted with pressure, the contact portion 78d of the shutter opening lever 78 greatly inserted into the cartridge holder 23 comes in contact with the introducing portion 10c of the guide groove 10 and is urged against the inclined surface of this introducing portion 10c so that the shutter opening lever 78 is rotated in the clockwise direction of FIG. 16 against the spring force of the coil spring 79. Thus, the contact portion 78d of the shutter opening lever 78 is inserted into the wide portion 10a of the guide groove 10 and the action member 78c of the shutter opening lever 78 is inserted into the operation portion 10d of the guide groove 10. Then, the action member 78c is guided by the upper or lower inclined surface 10e and introduced into the narrow portion 10b, deeply inserted into the narrow portion 10b and brought in contact with the operation pawl 4f of the shutter member 4 placed at the front side of the narrow portion 10b.

Then, when the disk cartridge 1 is further inserted into the predetermined position with pressure, the movement of the disk cartridge 1 is restricted by the left and right stopper members 39a, 39b of the cartridge holder 23 so that the hard disk HD accommodated within the disk compartment 3 is opposed to the upper portion of the spindle motor 30. At that time, when the operation pawl 4f of the shutter member 4 is pressed by the action member 78c of the shutter opening lever 78 and moved to the rear end portion of the narrow portion 10b of the guide groove 10, the shutter member 4 is rotated about the supporting point shaft 2f in the clockwise direction in FIG. 16.

As a consequence, since the shutter plate 4a and the core opening and closing plate 4b of the shutter member 4 are moved in the same direction, the head insertion slot 7 that has been closed by the shutter plate 4a and the center core hole 9 that has been closed by the core opening and closing plate 4b are opened. Thus, the insertion operation of the disk cartridge 1 into the cartridge holder 23 is completed.

In that case, the disk cartridge 1 is moved to the front of the predetermined position, as shown in FIGS. 18 and 19A, whereby the offset arcuate portion 6 formed at the tip end of the disk housing 2 is brought in contact with the operation pin 58 projected on the movement locus. Then, the operation pin 58 is further inserted with pressure against the spring force of the return spring 57 and the trigger plate 52 is rotated about the supporting shaft 54 in the counter-clockwise direction in FIG. 18, whereby the disk cartridge 1 is inserted from the front position shown by dot-and-dash line to the predetermined position shown by two-dot chain in FIG. 18. Thus, since the cam pin 53 placed on the opposite side of the operation pin 58 of the trigger plate 52 is similarly rotated in the counter-clockwise direction, the cam pin 53 is slid along the stopper portion 51a of the cam aperture 51 and moved to the inclined cam portion 51b side.

At that time, when then cam pin 53 is detached from the stopper portion 51a of the cam aperture 51, since the slide plate 24 is constantly spring-biased toward the rotary actuator 81 side under spring force of the pair of coil springs 41, the slide plate 24 is moved to the rotary actuator 81 side. Thus, the guide pins 44a, 44b that had been placed at the horizontal portion 48b in the cam oblong aperture 48 of the slide plate 24 are entered into the inclined portion 48a in accordance with the movement of the cam oblong aperture 48. on the other hand, the movement of the horizontal direction of the guide pins 44a, 44b is restricted by the vertical groove 45 and the guide pins 44a, 44b can be moved only in the vertical (upper and lower) direction so that the guide pins 44a, 44b are guided by the vertical groove 45 and moved toward the mechanical chassis 21 side.

As a consequence, the cartridge holder 23 is moved in the direction approaching the slide plate 24 so that the state shown Therefore, even though the elevating amount (T2-T1) of the cartridge holder 23 is made smaller than the thickness T4 of the disk cartridge 1, the cartridge insertion slot 28 can be opened completely.

Thus, the movement amount of the cartridge holder 23 can be suppressed to be as small as possible. At the same time, the turntable 31 of the spindle motor 30 is moved to the outside of the cartridge holder 23 so that the turntable 31 can be prevented from interfering with the disk cartridge 1 when the disk cartridge 1 is inserted (or ejected). As a consequence, the disk cartridge 1 can be reliably inserted into or ejected from the cartridge holder 23. Accordingly, it is possible to reduce the thickness of the disk recording and reproducing apparatus 20 when the disk cartridge 1 is inserted (or exchanged).

In addition, until the disk cartridge 1 is inserted into the cartridge holder 23, as shown in FIG. 5A or the like, the cartridge holder 23 is elevated and the apparatus is thick comparatively. However, once the disk cartridge 1 is inserted into the cartridge holder 23, as shown in FIG. 5B, the cartridge holder 23 is lowered so that the whole of the apparatus is approximately as thin as the mechanical chassis 21. Accordingly, the whole of the disk recording and reproducing apparatus 20 presented other cases when the disk cartridge 1 is inserted and ejected can be reduced in thickness. Further, the loading procedure of the disk cartridge 1 is equivalent to that of the slot-type and only one insertion operation is required. Therefore, it is possible to provide a removable disk storage apparatus which is excellent in operability.

In this embodiment, when the movable door is the integrated-type movable door 36 comprising the door body 36a and the pair of arm members 36b as shown in FIG. 7A, the strength can be increased by increasing the rigidity of the whole of the door and in addition, the door can be manufactured inexpensively. On the other hand, when the movable door is the separate-type movable door 96 comprising the door body 96A and the pair of supporting arms 96b, 96c as shown in FIG. 7B, the door can be prevented from interfering with any contact of other assemblies during the door is operated. Thus, the door can be opened and closed smoothly. In addition, since the posture of the door body 96a is constantly set in the upper and lower direction regardless of the inclined positions of the supporting arms 96b, 96c, as compared with the movable door 36 shown in FIG. 7A, the accommodation space required when the door is lowered can be reduced.

In the embodiment shown in FIGS. 20A, 20B, 23A, 23B, movable doors 36A, 96A are formed by slightly modifying the movable doors 36, 96 of the above-mentioned embodiments. Also, door accommodation portions 95a, 95b for these movable doors 36A, 96A are formed deep as compared with the above-mentioned door accommodation portion 95. Then, these movable doors 36A, 96A and the mechanical chassis 22 constitute a labyrinth structure. These movable doors 36A, 96A differ from the movable doors 36, 96 in that the lower portions of the door bodies 36, 96 are elongated in the lower direction to thereby form wide door bodies 36a, 96a.

The movable door 36A shown in FIG. 20A comprises an oblong door body 36a and arm members 36b, 36b integrally formed from the respective ends of the door body 36a. Each arm member 36b includes a bearing member 36c provided at the tip end and a stepped portion 36d. A spring receiving member 36e is formed at the base portion. On the upper end edge of each arm member 36a, there is formed a mountain-shaped end edge cam 38 comprising a front cam portion 38a and a rear cam portion 38b.

A torsion coil spring 94 is interposed between the spring receiving member 36e of the movable door 36a and the bottom plate 21a of the mechanical chassis 21. One spring member 94a is engaged with the spring receiving member 36e and the other spring member 94b is engaged with the concave portion of the bottom plate 21a. The movable door 36A is constantly spring-biased in the upper direction under spring force of the torsion coil spring 94 so that the movable door 36A can selectively take the state in which the movable door 36A is slightly lifted as shown by a solid line and the state in which the movable door 36A is lowered in the lower direction as shown by a dot-and-dash line. This door body 36a and the door accommodating portion 95a constitute a labyrinth structure so that the clearance e formed between the front surface of the door body 36a and the front inner surface of the door accommodating portion 95 can increase the pressure load to suppress the flow of air, thereby suppressing the entrance of dusts.

Also, a movable door 96A shown in FIG. 20B comprises an oblong door body 96a and a pair of supporting arms 96b made of different members rotatably coupled to both ends of this movable door 96a. The door body 96a includes a pair of receiving members 96d provided at both ends of the longitudinal direction and pivots 96f provided on the respective receiving members 96d. Also, each supporting arm 96b includes the bearing member 36c and the stepped portion 36d similarly, and a bearing aperture which is rotatably fitted into the pivot 96f is formed at the base portion. Then, on the upper end edge of each supporting arm 36b, there is formed a mountain-like end edge cam 38 comprising the front cam portion 38a and the rear cam portion 38b similarly.

To each supporting arm 96b of this movable door 96A, there is coupled and fixed one end of a leaf spring 97 which shows the resilient material according to the second embodiment. This leaf spring 97 includes two spring member 97a, 97b which are formed by curving a ribbon-like spring material in a U-letter fashion. One spring member 97a is bent in L-shape in the width direction, and one spring member 97a is fixed to the side surface of the supporting arm 96b by fusing or other fixing means such as adhesive, thereby being integrally formed. On the tip end of the other spring member 97, there is formed an arcuate sliding portion. When this sliding portion comes in contact with the bottom plate 21a, it is possible to suppress the increase of friction resistance generated upon sliding.

Owing to the spring force of the leaf spring 97, the movable door 96A can selectively take the state in which it is slightly elevated as shown by a solid line and the approximately horizontal state in which it is lowered in the lower direction as shown by a dot-and-dash line. This door body 96a and the door accommodating portion 95b constitute a labyrinth structure so that the clearance e formed between the front surface of the door body 96a and the front inner surface of the door accommodating portion 95b can increase the pressure load to suppress the flow of air, thereby suppressing the entrance of dusts. In this embodiment, since the movement amount of the door body 96a in the forward and backward directions relative to the rotation amount of the movable door 96A is small so that the accommodating space of the door accommodating portion 95b can be reduced.

In the above-mentioned embodiments, the reason that the movable doors 36, 36A, 96, 96A are constantly spring-biased in the upper direction under spring force of the resilient material is as follows: Firstly, it is necessary to maintain a dust-proof property of the disk recording and reproducing apparatus 20 upon recording or reproducing, Secondly, even when the door is forced to be lowered by an external force upon recording or reproduction, if such external force is lost, then the door can be naturally returned to the original closed state. Thus, dusts and smudges can be prevented from entering the storage apparatus body so that the disk recording and reproducing apparatus 20 can be made highly reliable.

FIGS. 21A, 21B and 22A, 22B show the disk recording and reproducing apparatus 20 using this movable door 96A shown in FIG. 20B. FIGS. 21A, 21B show the state presented before the disk cartridge 1 is loaded, i.e. the top cover 22 and the cartridge holder 23 are elevated while the movable door 96A is moved to the opposite side and accommodated within the door accommodating portion 95b outside the movement locus. As a consequence, the opening window 27 is opened to be large enough into which the disk cartridge 1 can be inserted. The cartridge insertion slot 28 of the cartridge holder 23 is opposed to the rear portion of the opening window 27.

FIGS. 22A, 22B show the state presented after the disk cartridge 1 is loaded. In this case, while the top cover 22 and the cartridge holder 23 are lowered, the movable door 96A is elevated and moved on the movement locus to close the opening window 27. As a consequence, while approximately the half of the opening window 27 is closed, the cartridge insertion slot 28 of the cartridge holder 23 located at the rear portion of the opening window 27 is completely closed by the movable door 96A, thereby making it impossible to insert the disk cartridge 1.

FIGS. 23A, 23B to FIGS. 25A, 25B show a disk storage apparatus according to a second embodiment of the present invention. In this case, the present invention is applied to a slot-in type disk recording and reproducing apparatus 100. That is, FIGS. 23A, 23B show the slot-in type disk recording and reproducing apparatus 100. FIG. 23A shows the state presented before the disk cartridge 1 is loaded, and FIG. 23B shows the state presented after the disk cartridge 1 is loaded, respectively. Further, FIGS. 24A, 24B show specifically the slot-in type disk recording and reproducing apparatus. FIG. 24A shows the state presented before the disk cartridge 1 is loaded, and FIG. 24B shows the state presented after the disk cartridge 1 is loaded, respectively. FIGS. 25A, 25B are diagrams used to explain the labyrinth structure of the disk recording and reproducing apparatus according to this embodiment. FIG. 25A shows the state presented before the disk cartridge 1 is loaded, and FIG. 25B shows the state presented after the disk cartridge 1 is loaded, respectively.

A storage apparatus body of the disk recording and reproducing apparatus 100 according to this embodiment comprises a mechanical chassis 21A opened to the upper surface and a top cover 22A attached so as to cover the upper opening surface of this mechanical chassis 21A. This top cover 22A is fixed to the mechanical chassis 21A and thereby integrally formed therewith. Accordingly, the thickness T1 of the storage apparatus body obtained when the disk cartridge 1 is loaded and the thickness T2 of the storage apparatus body obtained when the disk cartridge 1 is inserted (or ejected) are the same (T1=T2).

On a bottom plate 221a of the mechanical chassis 21A of this storage apparatus body is mounted and fixed the spindle motor 30 serving as the rotation drive means above which the cartridge holder 23 that can be elevated by the holder elevating mechanism is disposed. The elevation amount of this cartridge holder 23 is set to be smaller than the thickness T3 of the disk cartridge 1. In correspondence therewith, on the front surface of the mechanical chassis 21A and the front surface of the top cover 22A, there is defined the opening window 27 for inserting or ejecting the disk cartridge 1. This opening window 27 is opened and closed by the movable door 96A which was described so far with reference to FIG. 20B.

On the inside of the opening window 27, there is disposed an inner door 29 that is attached to the inner surface of the top cover 22A. This inner door 29 is comprised of a ribbon-shaped oblong plate member, and forms a door member 29b and a fixed member 29c at both sides of a thin portion 29a by forming the thin portion 29a extended in the longitudinal direction at the intermediate portion of the width direction. Since the rigidity is lowered as compared with the rigidity of other portions by the thin portion 29a, the inner door 29 can be folded by two in the width direction. The fixed member 29c of the inner door 29 is fixed to the inside of the opening window 27 of the top cover 22 by a fixing means such as screws and adhesive, whereby the door member 29b is bent by the thin portion 29a to cover the opening window 27 from the inside due to its own tare.

Further, on the surface of the fixed member 29c, there is provided an engagement groove 29d elongated in the longitudinal direction in order to enhance the labyrinth effect. As the material of this inner door 29, there can be suitably used plastic materials such as ABS resin and polypropylene. A rest of the arrangement is similar to that of the embodiment that has been described so far with reference to FIGS. 21A, 21B and FIGS. 22A, 22B.

According to the disk recording and reproducing apparatus 100 of this embodiment, since the surrounding portion of the disk cartridge loading apparatus is covered with the top cover 22A having the opening window 27, the present invention can be developed to the pure slot-in type disk storage apparatus. This means that, if the disk cartridge loading apparatus according to this embodiment is used as it is and only the top cover 22A and the inner door 29 are newly prepared, then the pop-slot type disk recording and reproducing apparatus can be applied to the slot-in type disk recording and reproducing apparatus.

Therefore, according to this embodiment, only by a simple change, the present invention can be applied to disk storage apparatus of different kinds so that a variation of the arrangement of this kind of disk storage apparatus can be widened and there can be produced a variety of drive apparatus. Also in this case, even though the movement amount of the cartridge holder 23A is smaller than the thickness of the disk cartridge 1, the engagement between the cartridge holder 23A and the spindle motor 30 can be released reliably so that the disk cartridge 1 can be prevented from interfering with the turntable 31. Thus, the disk cartridge 1 can be inserted and ejected reliably.

In the case of this embodiment, as shown by reference numeral 102 in FIG. 24B, when the disk cartridge 1 is loaded, a dead space is generated in the upper portion of the cartridge holder 23.

Also, according to the labyrinth structure of this embodiment, the labyrinth structure is comprised of the door body 96a of the movable door 96A and a projected portion 21f formed on the edge of the door accommodating portion 95b of the mechanical chassis 21, and this labyrinth structure urges the air to flow as shown by an arrow in FIG. 25B. Accordingly, the pressure load within the storage apparatus body increases so that air becomes difficult to flow into the storage apparatus body from the outside. As a result, dusts and smudges can be suppressed from entering the storage apparatus body so that the reliability of the disk recording and reproducing apparatus 20 can be maintained.

FIGS. 26A, 26B show a disk storage apparatus according to a third embodiment of the present invention in which case the present invention is applied to the pop-up disk recording and reproducing apparatus 110. FIGS. 26A, 26B show the pop-up disk recording and reproducing apparatus 110. FIG. 26A shows the state presented before the disk cartridge 1 is loaded, and FIG. 26B shows the state presented after the disk cartridge 1 is loaded, respectively.

The storage apparatus body of the disk recording and reproducing apparatus 110 according to this embodiment includes a mechanical chassis 21B opened in the upper surface and a cartridge holder 23A supported within this mechanical chassis 21B so as to become tiltable. The rear end portion of the cartridge holder 23A is rotatably supported by the mechanical chassis 21B. Accordingly, as compared with the thickness T1 of the storage apparatus body obtained when the disk cartridge 1 is loaded, the thickness T1 of the storage apparatus body obtained when the disk cartridge 1 is inserted (or ejected) is slightly large (T1<T2). However, a difference T2–T1 of the thickness of this storage apparatus body is smaller than the thickness T3 of the disk cartridge 1 (T2–T<T3).

On the mechanical chassis 21B of this storage apparatus body, there is fixed and mounted the spindle motor 30 serving as the rotation drive means above which the cartridge holder 23A is disposed so as to become tiltable. The inclination angle of this cartridge holder 23A is set to be smaller than the thickness T3 of the disk cartridge 1. In correspondence therewith, on the front surface of the mechanical chassis 21B, there is defined the recess as the opening window 27 for inserting or ejecting the disk cartridge 1. On the inside of this opening window 27, there is disposed the movable door 96B having the above-mentioned arrangement. The opening window 27 can be opened and closed by this movable door 96B.

As seen in the third embodiment, the present invention can also be applied to the pop-up type disk storage apparatus. According to this pop-up type disk storage apparatus, the inclination amount of the cartridge holder 23A can be made smaller than the thickness T3 of the disk cartridge 1 at the minimum so that it is possible to realize the highly-reliable disk storage apparatus having excellent dust-proof property. In addition, since the inclination amount of the cartridge holder 23A is large enough to avoid the cartridge holder 23A from interfering with the spindle motor 30, the turntable 31 can be prevented from disturbing the insertion or ejection of the disk cartridge 1. Therefore, the disk cartridge 1 can be changed reliably.

While the present invention has been described so far, the present invention is not limited to the above-mentioned embodiments and the following variant is also possible. For example, while the disk storage apparatus for recording and/or reproducing information on and/or from the upper and lower surfaces of the disk-like information recording medium by the upper and lower magnetic heads has been described so far in the above-mentioned embodiments, it is needless to say that the present invention can be applied to a disk storage apparatus for recording and/or reproducing information on and/or from any one of lower and upper surfaces of the disk-like information recording medium. Further, while the present invention is applied to then disk recording and reproducing apparatus capable of reproducing information previously-recorded on the disk-like information recording medium and recording new information as described above, it is needless to say that the present invention can be applied to a disk storage apparatus which is able to either record or reproduce information.

Also, while the magnetic head is used as the information storage head as described above, it is needless to say that the present invention can be applied to a disk storage apparatus using an optical pickup device capable of optically recording and/or reproducing information by using an optical head. As specific apparatus to which the disk storage apparatus according to the present invention can be applied, there can be enumerated a variety of apparatus such as digital camcoders, digital multi-cameras, portable AV equipment, portable information terminal devices, removable storage devices and storage relating to personal AV or PC which are increasingly made light-weight and thin.

Further, whole the torsion spring 94 and the leaf spring 97 are described as the specific examples of the resilient material as described above, the present invention is not limited thereto, and it is needless to say that spring members of other types (e.g. tension spring, compression spring, etc.) may be used. Also, spring members such as rubber-like resilient materials can of course be applied to the present invention. As described above, the present invention can be variously modified without departing from the gist of the present invention.

As described above, according to the disk cartridge loading apparatus claimed in claim 1 of the present invention, since the movement amount of the cartridge holder is set to be smaller than the thickness of the disk cartridge and is also set to be the amount in which the disk cartridge can be prevented from interfering with the rotation drive mechanism when the disk cartridge is inserted or ejected, it is possible to provide a disk cartridge apparatus in which the movement amount of the cartridge holder can be decreased as much as possible and in which the apparatus can be reduced in thickness when the disk cartridge is loaded.

According to the disk cartridge loading apparatus of claim 2 of the present invention, since the movable door is moved along the movement locus of the disk cartridge and out of the movement locus of the disk cartridge in unison with the movement operation of the cartridge holder, it is possible to provide a disk cartridge apparatus in which this movable door can be prevented from becoming a trouble when the disk cartridge is inserted or ejected and in which it is possible to prevent or suppress dusts from entering into the apparatus from the outside.

According to the disk cartridge loading apparatus of claim 3 of the present invention, since the movable door comprises the door body for opening and closing the opening window defined in the storage apparatus body and a pair of arm members, it is possible to provide a disk cartridge apparatus including a door having a high rigidity that can be manufactured inexpensively.

According to the disk cartridge loading apparatus of claim 4 of the present invention, since the movable door comprises the door body for opening and closing an opening window defined in the storage apparatus body and a pair of supporting arms for rotatably supporting the door body, it is possible to provide a disk loading apparatus in which the door can be prevented from interfering with other assemblies such as in a contact so that the door can be operated smoothly and in which an accommodating space required when the door is lowered can be reduced.

According to the disk cartridge loading apparatus claimed in claim 5 of the present invention, since the movable door is spring-biased in the direction closing an opening window defined in the storage apparatus body by a resilient member, it is possible to provide a disk cartridge loading apparatus in which the opening window can be closed tightly so that the airtight state of the apparatus can be maintained.

According to the disk cartridge loading apparatus as claimed in claim 6 of the present invention, since the cartridge holder is reliably elevated and lowered while the horizontal state of the cartridge holder is maintained, it is possible to provide a disk cartridge apparatus in which the disk cartridge can be inserted or ejected reliably and in which the thickness of the storage apparatus body required when the disk cartridge is loaded can be reduced as much as possible.

According to the disk cartridge loading apparatus as claimed in claim 7 of the present invention, since the cartridge holder is elevated and lowered through the holder elevating mechanism as the slide plate is moved in the front and rear direction and the opening window is opened and closed when the angle restriction pin restricts the movement amount of the movable door in unison therewith, it is possible to provide a disk cartridge loading apparatus in which the movable door can be moved reliably.

According to the disk cartridge loading apparatus as claimed in claim 8 of the present invention, it is possible to provide a disk cartridge loading apparatus in which the disk cartridge can be reliably inserted or ejected by tilting the cartridge holder and in which the thickness of the storage apparatus body required when the disk cartridge is loaded can be reduced as much as possible.

According to the disk storage apparatus as claimed in claim 9 of the present invention, it is possible to provide a disk storage apparatus in which the movement amount of the cartridge holder can be made small and the movement amount of the cartridge holder can be reduced as much as possible and in which the whole of the apparatus can be made thin.

According to the disk storage apparatus as claimed in claim 10 of the present invention, since the movable door is moved along the movement locus of the disk cartridge and out of the movement locus of the disk cartridge in unison with the movement operation of the cartridge holder, it is possible to provide a disk storage apparatus in which this movable door can be prevented from becoming a trouble when the disk cartridge is inserted or ejected and in which it is possible to prevent or suppress dusts from entering into the apparatus from the outside.

According to the disk storage apparatus as claimed in claim 11 of the present invention, since the movable door comprises the door body for opening and closing the opening window and a pair of arm members, it is possible to provide a disk storage apparatus in which a door having a high rigidity can be manufactured inexpensively.

According to the disk storage apparatus as claimed in claim 12 of the present invention, since the movable door comprises the door body opening and closing an opening window defined in the storage apparatus body and a pair of supporting arms for rotatably supporting the door body, it is possible to provide a disk storage apparatus in which the door can be prevented from interfering with other assemblies such as in a contact so that the door can be operated smoothly and in which an accommodating space required when the door is lowered can be reduced.

According to the disk storage apparatus as claimed in claim 13 of the present invention, since the movable door is spring-biased in the direction closing an opening window defined in the storage apparatus body by a resilient member, it is possible to provide a disk storage apparatus in which the opening window can be closed tightly so that the airtight state of the apparatus can be maintained.

According to the disk storage apparatus as claimed in claim 14 of the present invention, since the cartridge holder is reliably elevated and lowered while the horizontal state of the cartridge holder is maintained, the disk cartridge can be inserted or ejected reliably and in which the thickness of the storage apparatus body required when the disk cartridge is loaded can be reduced as much as possible.

According to the disk storage apparatus as claimed in claim 15 of the present invention, since the cartridge holder is elevated and lowered through the holder elevating mechanism as the slide plate is moved in the front and rear direction and the opening window is opened and closed when the angle restriction pin restricts the movement amount of the movable door in unison therewith, it is possible to provide a disk storage apparatus in which the movable door can be moved reliably.

According to the disk storage apparatus as claimed in claim 16 of the present invention, it is possible to provide a disk storage apparatus in which the disk cartridge can be reliably inserted or ejected by tilting the cartridge holder and in which the thickness of the storage apparatus body required when the disk cartridge is loaded can be reduced as much as possible.

According to the disk storage apparatus as claimed in claim 17 of the present invention, since the outer cover is moved together with the cartridge holder so that the thickness of the storage apparatus body can be reduced, it is possible to provide a disk storage apparatus in which when the disk cartridge is loaded or unloaded, the disk cartridge can be loaded or unloaded with ease by increasing the thickness of the storage apparatus body and in which when the disk cartridge is loaded, the thickness of the disk storage apparatus can be reduced by reducing the thickness of the storage apparatus body.

According to the disk storage apparatus of claim 18 of the present invention, since the storage apparatus body is covered with the outer cover and thereby made constant in thickness, it is possible to provide a disk storage apparatus in which the present invention can be developed to a pure slot-in type disk storage apparatus and hence there can be provided a variety of types of apparatus.

According to the disk storage apparatus of claim 19 of the present invention, since the labyrinth structure is formed in the opening window by the movable door and the storage apparatus body, it is possible to provide a disk storage apparatus in which a flow of air can be restricted by increasing a pressure load within the storage apparatus body and dusts or the like can be effectively suppressed from entering from the opening window into the storage apparatus body.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disk cartridge loading apparatus comprising:
    a cartridge holder rotatably housing a disk cartridge of a defined thickness which is loaded therein and unloaded therefrom, said disk cartridge having a disk-like information recording medium including at least one read/write surface; and
    a rotation drive mechanism mounted on a memory apparatus body for movably supporting said cartridge holder and to which said disk cartridge information recording medium housed in said cartridge holder is detachably loaded in accordance with a movement of said cartridge holder and wherein said cartridge holder is movable in the disk cartridge loading apparatus between a first position, wherein the disk cartridge is loaded into/unloaded from the cartridge holder, and a second position, wherein said disk cartridge is loaded on said rotation drive mechanism of said disk cartridge loading apparatus, said cartridge holder having a movement amount between its said first and second positions which is set to be smaller than the thickness of said disk cartridge and also prevents said cartridge holder from interfering with said rotation drive mechanism when said disk cartridge is loaded and unloaded.

2. A disk cartridge loading apparatus according to claim 1, further comprising a movable door which is moved along a movement locus of said disk cartridge and out of said movement locus of said disk cartridge in unison with a movement operation of said cartridge holder.

3. A disk cartridge loading apparatus according to claim 2, wherein said movable door comprises a door body for opening and closing an opening window defined in said storage apparatus body and a pair of arm members integrally formed with respective ends of said door body and respective end portions are rotatably supported to said storage apparatus body.

4. A disk cartridge loading apparatus according to claim 2, wherein said movable door comprises a door body for opening and closing an opening window defined in said storage apparatus body and a pair of supporting arms integrally formed with respective ends of said door body and respective end portions are rotatably supported to said storage apparatus body.

5. A disk cartridge loading apparatus as claimed in claim 2, wherein said movable door is spring-biased in the direction closing an opening window defined in said storage apparatus body by a resilient member interposed between said opening window and said storage apparatus body.

6. A disk cartridge loading apparatus as claimed in claim 1, wherein said cartridge holder is supported to said storage apparatus body so as to be elevated and lowered by a holder elevating mechanism for elevating and lowering said cartridge holder while the horizontal state of said cartridge holder is maintained.

7. A disk cartridge loading apparatus as claimed in claim 6, wherein said holder elevating mechanism includes a slide plate supported to said storage apparatus body so as to become slidable in the horizontal direction and which elevates and lowers said cartridge holder when it is slid in the horizontal direction and said slide plate includes an angle restriction pin for restricting a movement amount of said movable door.

8. A disk cartridge loading apparatus as claimed in claim 1, wherein said cartridge holder is supported to said storage apparatus body so as to become tiltable in such a manner that an inclination angle of said cartridge holder can be changed.

9. A disk storage apparatus comprising:
    a cartridge holder rotatably housing a disk cartridge of a deformed thickness which is loaded thereinto and unloaded therefrom, said cartridge holder having a disk like information recording medium; and
    a rotation drive mechanism mounted on a memory apparatus body for movably supporting said cartridge holder and to which said disk cartridge information recording medium housed in said cartridge holder is detachably loaded in accordance with a movement of said cartridge holder; and
    a recording and reproducing apparatus having an information storage head disposed outside said rotation drive mechanism and which is opposed to said information storage medium rotated by said rotation drive mechanism and reading and/or writing information by inserting said information storage head into said disk cartridge and wherein said cartridge holder is movable in the disk storage apparatus between a first position, wherein the disk cartridge is loaded into/unloaded from the cartridge holder, and a second position, wherein said disk cartridge is loaded on said rotation drive mechanism of said disk storage apparatus, said cartridge holder having a movement amount between its said first and second positions which is set to be smaller than the thickness of said disk cartridge and also prevents said cartridge holder from interfering with said rotation drive mechanism when said disk cartridge is loaded and unloaded.

10. A disk storage apparatus according to claim 9, further comprising a movable door which is moved along a movement locus of said disk cartridge and out of said movement locus of said disk cartridge in unison with a movement operation of said cartridge holder.

11. A disk storage apparatus as claimed in claim 10, wherein said movable door comprises a door body for opening and closing an opening window defined in said storage apparatus body and a pair of arm members integrally formed with respective ends of said door body and respective end portions are rotatably supported to said storage apparatus body.

12. A disk storage apparatus according to claim 10, wherein said movable door comprises a door body for opening and closing an opening window defined in said storage apparatus body and a pair or supporting arms integrally formed with respective ends of said door body and respective end portions are rotatably supported to said storage apparatus body.

13. A disk storage apparatus as claimed in claim 10, wherein said movable door is spring-biased in the direction closing an opening window defined in said storage apparatus body by a resilient member interposed between said opening window and said storage apparatus body.

14. A disk storage apparatus as claimed in claim 9, wherein said cartridge holder is supported to said storage apparatus body so as to be elevated and lowered by a holder elevating mechanism for elevating and lowering said cartridge holder while the horizontal state of said cartridge holder is maintained.

15. A disk storage apparatus as claimed in claim 14, wherein said holder elevating mechanism includes a slide plate supported to said storage apparatus body so as to become slidable in the horizontal direction and which elevates and lowers said cartridge holder when it is slid in the horizontal direction and said slide plate includes an angle restriction pin for restricting a movement amount of said movable door.

16. A disk storage apparatus as claimed in claim 9, wherein said cartridge holder is supported to said storage apparatus body so as to become tiltable in such a manner that an inclination angle of said cartridge holder is changed.

17. A disk storage apparatus as claimed in claim 9, wherein said cartridge holder has an outer cover fixed thereto so that, when said disk cartridge is loaded on and unloaded from said cartridge holder, the thickness of said storage apparatus body increases and that, when said disk cartridge is loaded onto said rotation drive mechanism, the thickness of said storage apparatus body decreases.

18. A disk storage apparatus as claimed in claim 9, wherein said cartridge holder has its periphery covered with an outer cover so that, when said disk cartridge is loaded and unloaded and loaded, the thickness of the storage apparatus body is made constant.

19. A disk storage apparatus as claimed in claim 10, wherein said movable door forms a labyrinth structure between it and said storage apparatus body when an opening window defined in said storage apparatus body is closed.

* * * * *